United States Patent
Kusama et al.

(10) Patent No.: US 9,945,990 B2
(45) Date of Patent: Apr. 17, 2018

(54) LIGHT DIFFUSION FILM AND LIGHT DIFFUSION FILM MANUFACTURING METHOD

(71) Applicant: LINTEC Corporation, Itabashi-Ku, Tokyo (JP)

(72) Inventors: Kentaro Kusama, Tokyo (JP); Baku Katagiri, Tokyo (JP); Tomoo Orui, Tokyo (JP); Satoru Shoshi, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 14/775,522

(22) PCT Filed: Feb. 25, 2014

(86) PCT No.: PCT/JP2014/054397
§ 371 (c)(1),
(2) Date: Sep. 11, 2015

(87) PCT Pub. No.: WO2014/156421
PCT Pub. Date: Oct. 2, 2014

(65) Prior Publication Data
US 2016/0047952 A1  Feb. 18, 2016

(30) Foreign Application Priority Data

Mar. 29, 2013 (JP) ................................. 2013-074260

(51) Int. Cl.
*G02B 1/04* (2006.01)
*C09D 133/14* (2006.01)
(Continued)

(52) U.S. Cl.
CPC .......... *G02B 5/0278* (2013.01); *B05D 3/067* (2013.01); *C08F 220/30* (2013.01);
(Continued)

(58) Field of Classification Search
CPC ...... G02B 5/0278; G02B 1/04; G02B 5/0236; G02B 5/0263; G02B 5/0268; G02B 6/0051; B05D 3/067; C09D 133/14
(Continued)

(56) References Cited

U.S. PATENT DOCUMENTS

2014/0340752 A1  11/2014  Kusama et al.
2014/0340753 A1  11/2014  Kusama et al.
(Continued)

FOREIGN PATENT DOCUMENTS

CN    101025512 A    8/2007
CN    102565894 A    7/2012
(Continued)

*Primary Examiner* — Bijan Ahvazi
(74) *Attorney, Agent, or Firm* — Renner, Kenner; Arthur M. Reginelli

(57) ABSTRACT

A light diffusion film in which the angle of aperture of diffused light has been expanded effectively by forming, within the film, a predetermined columnar structure composed of pillar-shaped objects having a bent part and a region having a relatively low refractive index, and a method for manufacturing the light diffusion film are provided. Disclosed is a light diffusion film having a columnar structure in which plural pillar-shaped objects having a relatively high refractive index are arranged to stand close together in the film thickness direction in a region having a relatively low refractive index, and the plural pillar-shaped objects having a relatively high refractive index have a bent part in the middle of the pillar-shaped objects.

4 Claims, 50 Drawing Sheets

(51) Int. Cl.
*G02B 5/02* (2006.01)
*C08F 299/06* (2006.01)
*C08F 220/30* (2006.01)
*C08G 18/48* (2006.01)
*C08G 18/67* (2006.01)
*C08G 18/75* (2006.01)
*C08F 283/00* (2006.01)
*C08F 290/14* (2006.01)
*B05D 3/06* (2006.01)
*G02F 1/1335* (2006.01)

(52) U.S. Cl.
CPC ...... *C08F 283/006* (2013.01); *C08F 290/147* (2013.01); *C08F 299/06* (2013.01); *C08G 18/4825* (2013.01); *C08G 18/672* (2013.01); *C08G 18/755* (2013.01); *C09D 133/14* (2013.01); *G02B 5/0236* (2013.01); *G02B 5/0257* (2013.01); *G02B 1/04* (2013.01); *G02B 2207/123* (2013.01); *G02F 1/133504* (2013.01); *G02F 1/133553* (2013.01)

(58) Field of Classification Search
USPC .................. 252/582; 359/599; 362/97.1; 427/517.551; 428/220; 522/33
See application file for complete search history.

(56) References Cited

U.S. PATENT DOCUMENTS

| | | |
|---|---|---|
| 2015/0355390 A1 | 12/2015 | Katagiri et al. |
| 2016/0018571 A1 | 1/2016 | Kusama et al. |
| 2016/0025907 A1 | 1/2016 | Kusama et al. |
| 2016/0033692 A1 | 2/2016 | Kusama et al. |
| 2016/0047952 A1 | 2/2016 | Kusama et al. |
| 2016/0070035 A1* | 3/2016 | Kusama ............ G02F 1/133504 362/97.1 |
| 2016/0077246 A1 | 3/2016 | Kusama et al. |
| 2017/0293054 A1 | 10/2017 | Kusama et al. |

FOREIGN PATENT DOCUMENTS

| | | | | |
|---|---|---|---|---|
| JP | 2005-227566 | * | 8/2005 | ......... G02B 1/13357 |
| JP | 2005-227566 A | | 8/2005 | |
| JP | 2005-326824 A | | 11/2005 | |
| JP | 2007249181 A | | 9/2007 | |
| JP | 2012-141591 A | | 7/2012 | |
| JP | 2012-141592 A | | 7/2012 | |
| JP | 2012-141593 | * | 7/2012 | ............... G02B 5/02 |
| JP | 2012-141593 A | | 7/2012 | |
| JP | 2013-019988 | * | 1/2013 | ............... G02B 5/92 |
| JP | 2013-019988 A | | 1/2013 | |
| JP | 2013117702 A | | 6/2013 | |
| JP | 2013117703 A | | 6/2013 | |
| JP | 2013148712 A | | 8/2013 | |
| JP | 2013210408 A | | 10/2013 | |
| JP | 2013210409 A | | 10/2013 | |
| JP | 2014002186 A | | 1/2014 | |
| JP | 2014002187 A | | 1/2014 | |
| JP | 2014002188 A | | 1/2014 | |
| JP | 2014126749 A | | 7/2014 | |
| JP | 2014126750 A | | 7/2014 | |
| JP | 2014126771 A | | 7/2014 | |
| JP | 2014191340 A | | 10/2014 | |
| JP | 2016048290 A | | 4/2016 | |

* cited by examiner

LIGHT DIFFUSION INCIDENT ANGLE REGION

Fig.5(a)
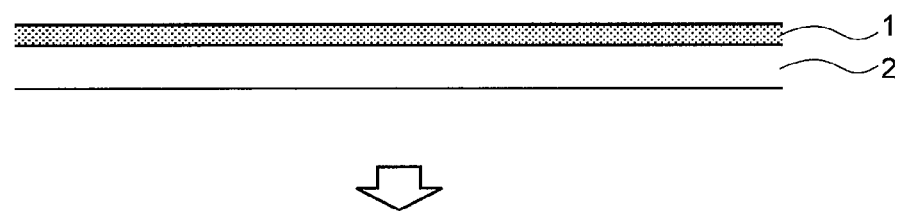
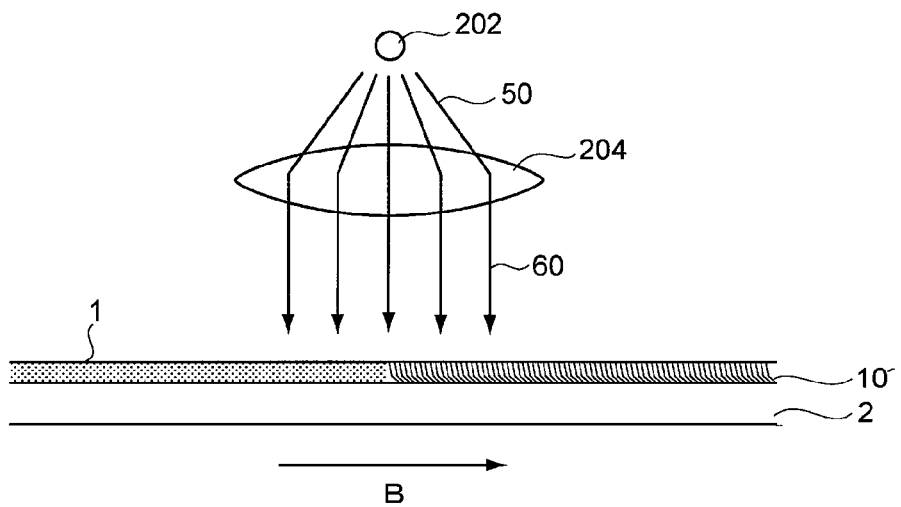
Fig.5(b)

Example 1 (θ1=0°)

Example 1 (θ1=5°)

Example 1 (θ1=10°)

Example 1 (θ1=15°)

Example 2 (θ1=0°)

Example 2 (θ1=5°)

Example 2 (θ1=10°)

Example 2 (θ1=15°)

Example 3 (θ1=0°)

Example 3 (θ1=5°)

Example 3 (θ1=10°)

Example 3 (θ1=15°)

Comparative Example 1 (θ1=0°)

Comparative Example 1 (θ1=5°)

Comparative Example 1 (θ1=10°)

Comparative Example 1 (θ1=15°)

Example1 (θ1=20°)

Example1 (θ1=25°)

Example1 (θ1=30°)

Example1 (θ1=35°)

Example2 (θ1=20°)

Example2 (θ1=25°)

Example2 (θ1=30°)

Example2 (θ1=35°)

Example3 (θ1=20°)

Example3 (θ1=25°)

Example23 θ1=30°)

Example3 (θ1=35°)

Comparative Example 1
(θ1=20°)

Comparative Example 1
(θ1=25°)

Comparative Example 1
(θ1=30°)

Comparative Example 1
(θ1=35°)

Example1 (θ1=40°)

Example1 (θ1=45°)

Example1 (θ1=50°)

Example1 (θ1=55°)

Example2 (θ1=40°)

Example2 (θ1=45°)

Example2 (θ1=50°)

Example2 (θ1=55°)

Example3 (θ1=40°)

Example3 (θ1=45°)

Example3 (θ1=50°)

Example3 (θ1=55°)

Comparative Example 1 (θ1=40°)

Comparative Example 1 (θ1=45°)

Comparative Example 1 (θ1=50°)

Comparative Example 1 (θ1=55°)

Example4
($\theta 1=0°$)

Example4
($\theta 1=5°$)

Example4
($\theta 1=10°$)

Example4
($\theta 1=15°$)

Example5
($\theta 1=0°$)

Example5
($\theta 1=5°$)

Example5
($\theta 1=10°$)

Example5
($\theta 1=15°$)

Comparative Example1
($\theta 1=0°$)

Comparative Example1
($\theta 1=5°$)

Comparative Example1
($\theta 1=10°$)

Comparative Example1
($\theta 1=15°$)

Example4
($\theta 1=20°$)

Example4
($\theta 1=25°$)

Example4
($\theta 1=30°$)

Example4
($\theta 1=35°$)

Example5
($\theta 1=20°$)

Example5
($\theta 1=25°$)

Example5
($\theta 1=30°$)

Example5
($\theta 1=35°$)

Comparative Example1
($\theta 1=20°$)

Comparative Example1
($\theta 1=25°$)

Comparative Example1
($\theta 1=30°$)

Comparative Example1
($\theta 1=35°$)

Example4
($\theta 1=40°$)

Example4
($\theta 1=45°$)

Example4
($\theta 1=50°$)

Example4
($\theta 1=55°$)

Example5
($\theta 1=40°$)

Example5
($\theta 1=45°$)

Example5
($\theta 1=50°$)

Example5
($\theta 1=55°$)

Comparative Example1
($\theta 1=40°$)

Comparative Example1
($\theta 1=45°$)

Comparative Example1
($\theta 1=50°$)

Comparative Example1
($\theta 1=55°$)

Example6
($\theta 1=0°$)

Example6
($\theta 1=5°$)

Example6
($\theta 1=10°$)

Example6
($\theta 1=15°$)

Example7
($\theta 1=0°$)

Example7
($\theta 1=5°$)

Example7
($\theta 1=10°$)

Example7
($\theta 1=15°$)

Comparative Example1
($\theta 1=0°$)

Comparative Example1
($\theta 1=5°$)

Comparative Example1
($\theta 1=10°$)

Comparative Example1
($\theta 1=15°$)

Example6
($\theta 1=20°$)

Example6
($\theta 1=25°$)

Example6
($\theta 1=30°$)

Example6
($\theta 1=35°$)

Example7
($\theta 1=20°$)

Example7
($\theta 1=25°$)

Example7
($\theta 1=30°$)

Example7
($\theta 1=35°$)

Comparative Example1
($\theta 1=20°$)

Comparative Example1
($\theta 1=25°$)

Comparative Example1
($\theta 1=30°$)

Comparative Example1
($\theta 1=35°$)

Example6
($\theta 1=40°$)

Example6
($\theta 1=45°$)

Example6
($\theta 1=50°$)

Example6
($\theta 1=55°$)

Example7
($\theta 1=40°$)

Example7
($\theta 1=45°$)

Example7
($\theta 1=50°$)

Example7
($\theta 1=55°$)

Comparative Example1
($\theta 1=40°$)

Comparative Example1
($\theta 1=45°$)

Comparative Example1
($\theta 1=50°$)

Comparative Example1
($\theta 1=55°$)

Example8
($\theta 1=0°$)

Example8
($\theta 1=5°$)

Example8
($\theta 1=10°$)

Example8
($\theta 1=15°$)

Example1
($\theta 1=0°$)

Example1
($\theta 1=5°$)

Example1
($\theta 1=10°$)

Example1
($\theta 1=15°$)

Comparative Example1
($\theta 1=0°$)

Comparative Example1
($\theta 1=5°$)

Comparative Example1
($\theta 1=10°$)

Comparative Example1
($\theta 1=15°$)

Example8
($\theta 1=20°$)

Example8
($\theta 1=25°$)

Example8
($\theta 1=30°$)

Example8
($\theta 1=35°$)

Example1
($\theta 1=20°$)

Example1
($\theta 1=25°$)

Example1
($\theta 1=30°$)

Example1
($\theta 1=35°$)

Comparative Example1
($\theta 1=20°$)

Comparative Example1
($\theta 1=25°$)

Comparative Example1
($\theta 1=30°$)

Comparative Example1
($\theta 1=35°$)

Fig.41(a)   Fig.41(b)   Fig.41(c)   Fig.41(d)
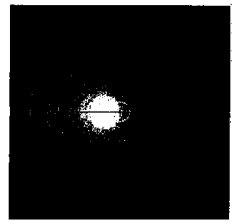 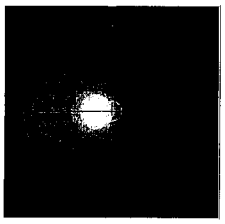 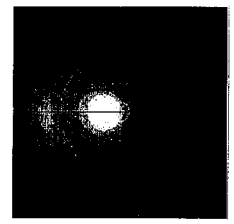 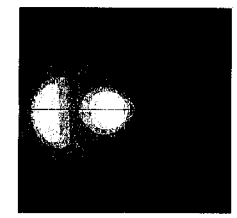
Example8    Example8    Example8    Example8
(θ1=40°)    (θ1=45°)    (θ1=50°)    (θ1=55°)
Fig.41(e)   Fig.41(f)   Fig.41(g)   Fig.41(h)
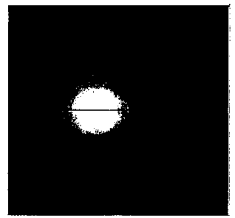 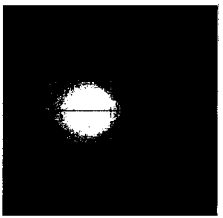 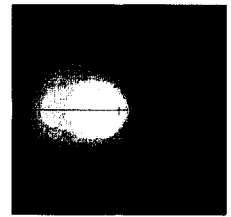 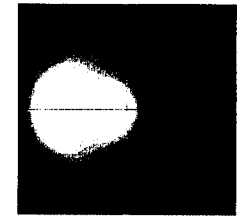
Example1    Example1    Example1    Example1
(θ1=40°)    (θ1=45°)    (θ1=50°)    (θ1=55°)
Fig.41(i)   Fig.41(j)   Fig.41(k)   Fig.41(l)
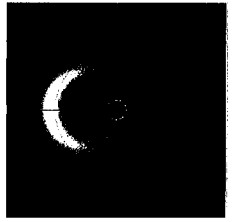 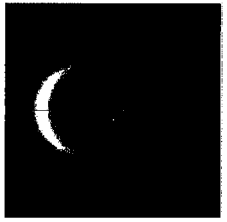 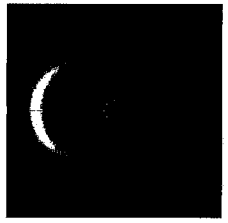 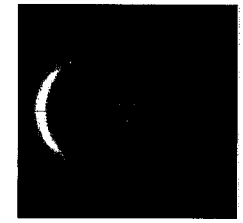
Comparative Example1  Comparative Example1  Comparative Example1  Comparative Example1
(θ1=40°)    (θ1=45°)    (θ1=50°)    (θ1=55°)

Comparative Example3 ($\theta 1=0°$)

Comparative Example3 ($\theta 1=5°$)

Comparative Example3 ($\theta 1=10°$)

Comparative Example3 ($\theta 1=15°$)

Example1 ($\theta 1=0°$)

Example1 ($\theta 1=5°$)

Example1 ($\theta 1=10°$)

Example1 ($\theta 1=15°$)

Comparative Example1 ($\theta 1=0°$)

Comparative Example1 ($\theta 1=5°$)

Comparative Example1 ($\theta 1=10°$)

Comparative Example1 ($\theta 1=15°$)

Comparative Example3 ($\theta 1=20°$)  Comparative Example3 ($\theta 1=25°$)  Comparative Example3 ($\theta 1=30°$)  Comparative Example3 ($\theta 1=35°$)

Example1 ($\theta 1=20°$)  Example1 ($\theta 1=25°$)  Example1 ($\theta 1=30°$)  Example1 ($\theta 1=35°$)

Comparative Example1 ($\theta 1=20°$)  Comparative Example1 ($\theta 1=25°$)  Comparative Example1 ($\theta 1=30°$)  Comparative Example1 ($\theta 1=35°$)

Comparative Example3
($\theta 1=40°$)

Comparative Example3
($\theta 1=45°$)

Comparative Example3
($\theta 1=50°$)

Comparative Example3
($\theta 1=55°$)

Example1
($\theta 1=40°$)

Example1
($\theta 1=45°$)

Example1
($\theta 1=50°$)

Example1
($\theta 1=55°$)

Comparative Example1
($\theta 1=40°$)

Comparative Example1
($\theta 1=45°$)

Comparative Example1
($\theta 1=50°$)

Comparative Example1
($\theta 1=55°$)

Reference example1
($\theta 1=10°$)

Reference example1
($\theta 1=20°$)

Reference example1
($\theta 1=30°$)

Example1
($\theta 1=10°$)

Example1
($\theta 1=20°$)

Example1
($\theta 1=30°$)

Reference example1
($\theta 1=40°$)

Reference example1
($\theta 1=50°$)

Example1
($\theta 1=40°$)

Example1
($\theta 1=50°$)

LIGHT DIFFUSION FILM AND LIGHT DIFFUSION FILM MANUFACTURING METHOD

TECHNICAL FIELD

The present invention relates to a light diffusion film and a method for manufacturing a light diffusion film.

More particularly, the present invention relates to a light diffusion film in which the angle of aperture of diffused light has been expanded effectively by having, within the film, a predetermined columnar structure formed from pillar-shaped objects having a bent part, and to a method for manufacturing a light diffusion film.

BACKGROUND ART

Conventionally, for example, in the field of optical technology to which liquid crystal display devices and the like belong, it has been suggested to use a light diffusion film which can diffuse an incident light coming from a particular direction into particular directions, while transmitting straight an incident light coming from any other directions.

A variety of forms of such a light diffusion film are known; however, in particular, a light diffusion film having, within the film, a louver structure in which plural plate-shaped regions having different refractive indices are alternately arranged in one arbitrary direction along the film plane (meaning a plane other than a cross-section of the film; hereinafter, the same applies), has been widely used.

Furthermore, regarding another type of light diffusion film, a light diffusion film having, within the film, a columnar structure in which plural pillar-shaped objects having a relatively high refractive index are arranged to stand close together in a region having a relatively low refractive index, has been widely used.

Meanwhile, it is known that such a light diffusion film having a louver structure or a columnar structure is obtained by irradiating a coating layer that is formed by applying a composition for light diffusion film containing two or more kinds of polymerizable compounds having different refractive indices into a film form, with active energy radiation by a predetermined method.

That is, a light diffusion film having a predetermined internal structure can be obtained by curing the coating layer while subjecting the two or more kinds of polymerizable compounds in the coating layer to phase separation, by irradiating the coating layer with predetermined active energy radiation having a controlled direction of propagation or controlled parallelism.

Therefore, in order to obtain a high quality light diffusion film having a more well-defined internal structure and having satisfactory incident angle dependency in transmission and diffusion of light, there has been suggested a composition for light diffusion film in which two or more kinds of polymerizable compounds can be subjected to phase separation more efficiently and can be photocured more stably (for example, Patent Documents 1 and 2).

That is, Patent Document 1 discloses a composition for anisotropic light diffusion film, including a biphenyl compound represented by the following Formula (11) as component (A), and a polymerizable compound having a weight average molecular weight within the range of 3,000 to 20,000 as component (B), characterized in that the content of the component (A) is adjusted to a value within the range of 25 parts to 400 parts by weight relative to 100 parts by weight of the component (B):

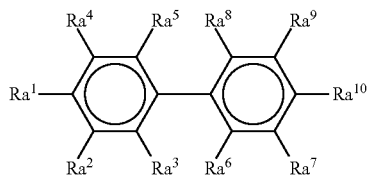

wherein in Formula (11), $Ra^1$ to $Ra^{10}$ are respectively independent of one another; and at least one of $Ra^1$ to $Ra^{10}$ represents a substituent represented by the following Formula (12), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

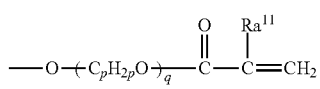

wherein in Formula (12), $Ra^{11}$ represents a hydrogen atom or a methyl group; the number of carbon atoms p represents an integer from 1 to 4; and the number of repetitions q represents an integer from 1 to 10.

Furthermore, Patent Document 2 discloses a composition for anisotropic light diffusion film, including a (meth)acrylic acid ester containing plural aromatic rings as component (A), and a urethane (meth)acrylate having a weight average molecular weight value within the range of 3,000 to 20,000 as component (B), characterized in that the urethane (meth)acrylate as the component (B) is a compound originating from the following components (a) to (c) as constituent components and constituted at a molar ratio of component (a):component (b):component (c)=1 to 5:1:1 to 5, and the content of the component (A) is adjusted to a value within the range of 25 parts to 400 parts by weight relative to 100 parts by weight of the component (B):

(a) a compound containing two isocyanate groups through an aliphatic ring;
(b) a polyalkylene glycol; and
(c) a hydroxyalkyl (meth)acrylate.

CITATION LIST

Patent Document

Patent Document 1: JP 2012-141591 A (Claims)
Patent Document 2: JP 2012-141592 A (Claims)

DISCLOSURE OF THE INVENTION

Problem to be Solved by the Invention

However, the anisotropic light diffusion films formed by photocuring the compositions for anisotropic light diffusion film described in Patent Documents 1 and 2 are characterized by anisotropic light diffusion caused by a louver structure; however, there is a problem that sharp switching in the diffusion condition of light occurs between a light diffusion incident angle region and a non-light diffusion incident angle region.

On the other hand, it has been confirmed that when the compositions for anisotropic light diffusion film described in Patent Documents 1 and 2 are irradiated with active energy radiation by a predetermined method, isotropic light diffusion films having a columnar structure may be obtained.

Therefore, even with the compositions for anisotropic light diffusion film described in Patent Documents 1 and 2, when isotropic light diffusion films having a columnar structure are formed, the above-described problem of sharp switching in the diffusion condition of light between a light diffusion incident angle region and a non-light diffusion incident angle region can be solved.

However, even in this case, although the angle of aperture of diffused light may be dependent on the weight average molecular weight of the urethane (meth)acrylate as the component (B), or the temperature of the coating layer, there is a problem that the angle of aperture of diffused light in the light diffusion film thus obtainable may be insufficient.

Thus, the inventors of the present invention conducted a thorough investigation in view of such circumstances as described above, and they found that the angle of aperture of diffused light can be expanded effectively by forming a predetermined columnar structure formed from pillar-shaped objects having a bent part within the film, thus completing the present invention.

That is, an object of the present invention is to provide a light diffusion film which has the angle of aperture of diffused light expanded effectively by having, within the film, a predetermined columnar structure composed of pillar-shaped objects having a bent part, and a method for manufacturing the light diffusion film.

Means for Solving Problem

According to an aspect of the present invention, there is provided a light diffusion film having a columnar structure in which plural pillar-shaped objects having a relatively high refractive index are arranged to stand close together in the film thickness direction in a region having a relatively low refractive index, characterized in that the plural pillar-shaped objects having a relatively high refractive index has a bent part in the middle of the pillar-shaped objects, and the problems described above can be solved.

That is, since the light diffusion film of the present invention has, within the film, a predetermined columnar structure composed of pillar-shaped objects and the like having a bent part (hereinafter, may be referred to as bent columnar structure), the angle of aperture of diffused light can be expanded effectively.

Furthermore, the problem that sharp switching in the diffusion condition of light occurs between a light diffusion incident angle region and a non-light diffusion incident angle region, which is characteristic of a light diffusion film having a louver structure in the film, can also be fundamentally solved.

Meanwhile, the "angle of aperture of diffused light" as used in the present invention means the width of the angle range of diffused light (hereinafter, may be referred to as "light diffusion angle region") obtainable when a point light source is fixed at an angle at which incident light is diffused most in a light diffusion film.

Furthermore, according to the present invention, the "light diffusion incident angle region" means the angle range of incident light corresponding to the emission of diffused light when the angle of incident light emitted from a point light source is changed in the light diffusion film.

Furthermore, on the occasion of configuring the light diffusion film of the present invention, it is preferable that the angle of inclination $\theta a$ of the pillar-shaped objects with respect to the normal line of the film plane in the upper portion above the bent part in the columnar structure is adjusted to a value within the range of 0° to 30°, and also, the angle of inclination $\theta b$ of the pillar-shaped objects with respect to the normal line of the film plane in the lower portion below the bent part is adjusted to a value within the range of 1° to 60°.

When such a configuration is adopted, the angle of aperture of diffused light can be expanded more efficiently.

Meanwhile, the "upper portion above the bent part" means the portion on the side where active energy radiation is irradiated when a light diffusion film is produced, and the "lower portion below the bent portion" means the portion on the opposite side.

Furthermore, on the occasion of configuring the light diffusion film of the present invention, it is preferable that the angles of inclination $\theta a$ and $\theta b$ satisfy the following relationship expression (1):

$$1 \le |\theta b - \theta a| \le 30 \qquad (1)$$

When such a configuration is adopted, the angle of aperture of diffused light can be expanded more efficiently.

Furthermore, on the occasion of configuring the light diffusion film of the present invention, it is preferable that the thickness L of the columnar structure is adjusted to a value within the range of 50 to 700 µm.

When such a configuration is adopted, the uniformity of the intensity of diffused light within the light diffusion angle region can be enhanced.

Furthermore, on the occasion of configuring the light diffusion film of the present invention, it is preferable that a length La of the pillar-shaped objects in the upper portion above the bent part in the columnar structure is adjusted to a value within the range of 5 to 200 µm, and also, a length Lb of the pillar-shaped objects in the lower portion below the bent part is adjusted to a value within the range of 20 to 400 µm.

When such a configuration is adopted, the uniformity of the intensity of diffused light in the light diffusion angle region can be enhanced while the angle of aperture of diffused light is expanded more efficiently.

Furthermore, on the occasion of configuring the light diffusion film of the present invention, it is preferable that the lengths La and Lb satisfy the following relationship expression (2):

$$0.01 \le La/Lb \le 10 \qquad (2)$$

When such a configuration is adopted, the uniformity of the intensity of diffused light in the light diffusion angle region can be enhanced while the angle of aperture of diffused light is expanded more efficiently.

Furthermore, according to another aspect of the present invention, there is provided a method for manufacturing a light diffusion film having a columnar structure in which plural pillar-shaped objects having a relatively high refractive index are arranged to stand close together in the film thickness direction in a region having a relatively low refractive index, and in which the plural pillar-shaped objects having a relatively high refractive index have a bent part in the middle of the pillar-shaped objects, the method including the following steps (a) to (c):

(a) a step of preparing a composition for light diffusion film which includes a (meth)acrylic acid ester containing plural aromatic rings as component (A); a urethane (meth)

acrylate as component (B); a photopolymerization initiator as component (C); and an ultraviolet absorber as component (D), and in which the content of the component (A) is adjusted to a value within the range of 25 parts to 400 parts by weight relative to the 100 parts by weight of the component (B), the content of the component (C) is adjusted to a value within the range of 0.2 parts to 20 parts by weight relative to the total amount (100 parts by weight) of the component (A) and the component (B), and the content of the component (D) is adjusted to a value of below 2 parts by weight (provided that 0 parts by weight is excluded) relative to the total amount (100 parts by weight) of the component (A) and the component (B);

(b) a step of applying the composition for light diffusion film on a process sheet, and forming a coating layer; and (c) a step of irradiating the coating layer with active energy radiation.

That is, when the method for manufacturing a light diffusion film of the present invention is used, a bent columnar structure can be formed easily and stably in the film by irradiating a coating layer formed from a predetermined composition for light diffusion film with active energy radiation.

Furthermore, on the occasion of performing the method for manufacturing a light diffusion film of the present invention, it is preferable that an ultraviolet absorber having an absorption peak for a light having a wavelength of 330 nm to 380 nm is used as the component (D).

When the method is carried out as such, a more well-defined bent columnar structure can be formed.

Furthermore, on the occasion of performing the method for manufacturing a light diffusion film of the present invention, it is preferable to use at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber, as the component (D).

When the method is carried out as such, a more well-defined bent columnar structure can be formed.

BRIEF DESCRIPTION OF DRAWINGS

FIGS. 5(a) and 5(b) are diagrams provided to explain the various steps for the method for manufacturing a light diffusion film.

FIGS. 41(a) to 41(l) are still other photographs provided to compare the light diffusion characteristics of the light diffusion films of Example 8, Example 1, and Comparative Example 1.

MODE(S) FOR CARRYING OUT THE INVENTION

First Embodiment

A first embodiment relates to a light diffusion film having a columnar structure in which plural pillar-shaped objects having a relatively high refractive index are arranged to stand close together in the film thickness direction in a region having a relatively low refractive index, characterized in that the plural pillar-shaped objects having a relatively high refractive index have a bent part in the middle of the pillar-shaped objects.

Hereinafter, the first embodiment of the present invention will be explained specifically with appropriate reference to the drawings, and in order to facilitate understanding of such explanations, first, the fundamental principle of light diffusion in a light diffusion film will be explained.

1. Basic Principles of Light Diffusion in Light Diffusion Film

First of all, the basic principles of light diffusion in a light diffusion film will be explained using FIGS. 1 and 2.

Figure 1A:
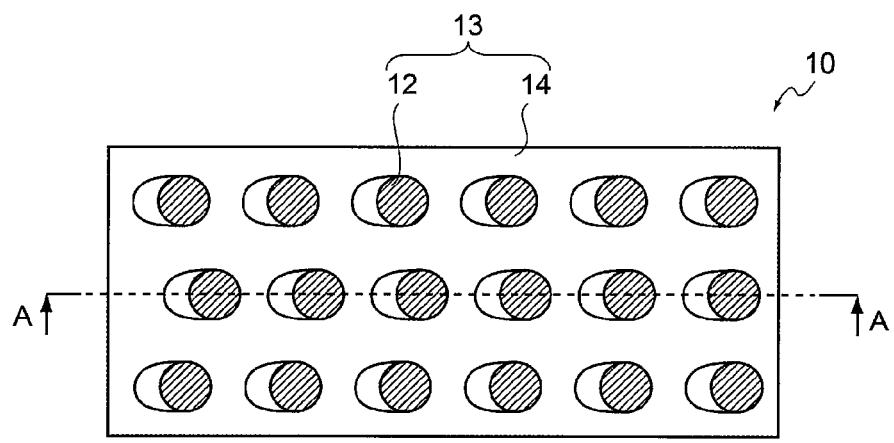
FIGS. 1(a) and 1(b) are diagrams provided to explain an outline of the light diffusion film having a columnar structure in the film.
Figure 1B:
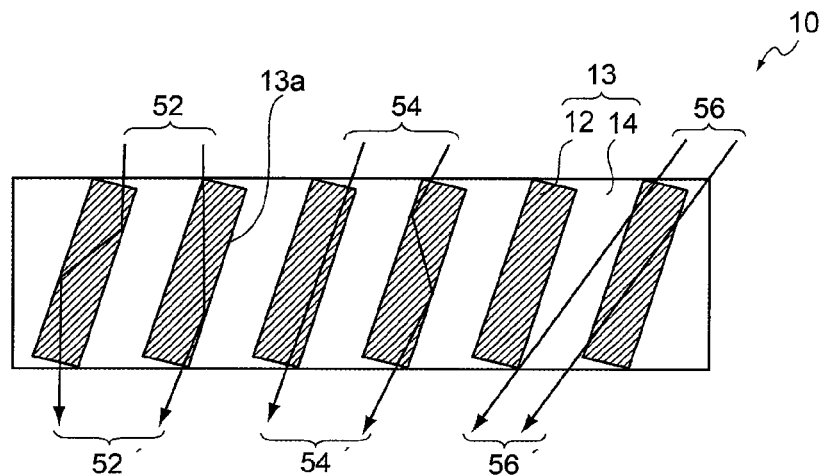

First, FIG. 1(a) shows a top view (plan view) of a light diffusion film 10, and FIG. 1(b) shows a cross-sectional view of the light diffusion film 10 in a case in which the light diffusion film 10 shown in FIG. 1(a) is cut in a perpendicular direction along the dotted line A-A, and the cut surface is viewed from the direction indicated by the arrow.

Figure 2A:
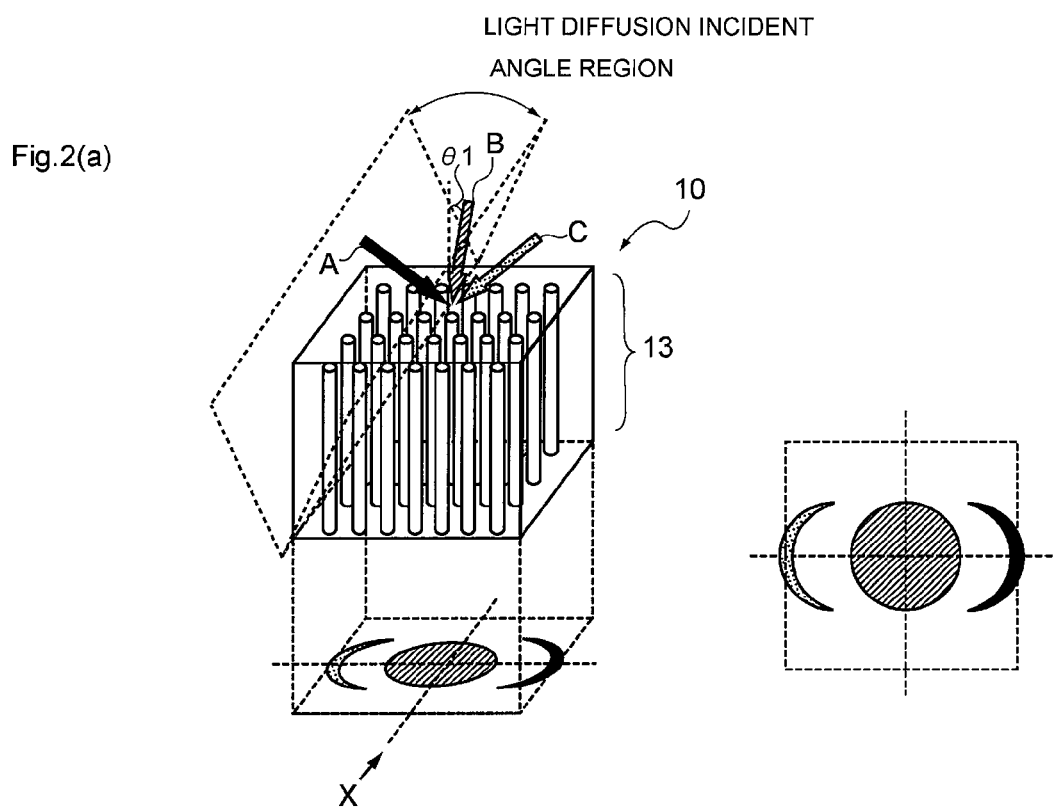
FIGS. 2(a) and 2(b) are diagrams provided to explain the incident angle dependency and isotropic light diffusion in a light diffusion film having a columnar structure in the film.
Figure 2B:
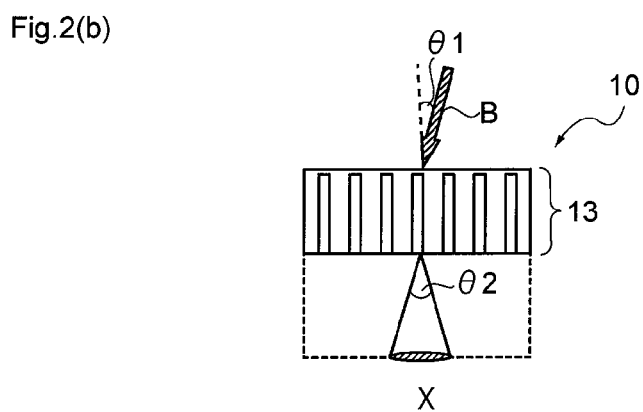

Furthermore, FIG. 2(a) shows an overall view of the light diffusion film 10, and FIG. 2(b) shows a cross-sectional view in the case of viewing the light diffusion film 10 in FIG. 2(a) from the X-direction.

As illustrated in such a plan view of FIG. 1(a), the light diffusion film 10 has a columnar structure 13 composed of pillar-shaped objects having a relatively high refractive index 12, and a region having a relatively low refractive index 14.

Furthermore, as illustrated in the cross-sectional view of FIG. 1(b), in the vertical direction of the light diffusion film 10, the pillar-shaped objects having a relatively high refractive index 12 and the region having a relatively low refractive index 14 respectively have a predetermined width, and are thereby in a state of being alternately arranged.

Thereby, as illustrated in FIG. 2(a), it is speculated that when the incident angle is within the light diffusion incident angle region, incident light is diffused by the light diffusion film 10.

That is, as illustrated in FIG. 1(b), it is speculated that when the incident angle of incident light with respect to the light diffusion film 10 has a value from parallel to a predetermined angle range, that is, a value within the light diffusion incident angle region, with respect to the boundary surface 13a of the columnar structure 13, the incident light (52, 54) escapes from the interior of the pillar-shaped objects 12 having a relatively high refractive index in the columnar structure, along the film thickness direction while changing its direction, and thus the direction of propagation of light from the light exit surface side is not uniform.

As a result, when the incident angle is within the light diffusion incident angle region, incident light is diffused by the light diffusion film 10 and becomes diffused light (52', 54').

On the other hand, in a case in which the incident angle of light entering the light diffusion film 10 is shifted away from the light diffusion incident angle region, it is speculated that, as illustrated in FIG. 1(b), incident light 56 directly transmitted by the light diffusion film 10, without being diffused by the light diffusion film, and becomes transmitted light 56'.

Meanwhile, in the present invention, the term "light diffusion incident angle region" means, with respect to the light diffusion film, the range of angles of incident light corresponding to the emission of a diffused light, when the angle of incident light is changed from a point light source as shown in FIG. 2(a).

Also, such a "light diffusion incident angle region" is an angle region determined for each light diffusion film as shown in FIG. 2(a), based on the difference in refractive index, the angle of inclination and the like of columnar structures in the light diffusion film.

Owing to the basic principles described above, the light diffusion film 10 having a columnar structure 13 can exhibit, for example, incident angle dependency in transmission and diffusion of light, as illustrated in FIG. 2(a).

Furthermore, as illustrated in FIG. 1 and FIG. 2, a light diffusion film having the columnar structure 13 usually exhibits "isotropy".

Here, the term "isotropy" as used in the present invention means that, as illustrated in FIG. 2(a), when incident light is diffused by a film, the diffusion condition (shape of spreading of diffused light) of the emitted light that has been diffused in a plane parallel to the film (meaning a plane parallel to any plane other than a cross-section of the film; hereinafter, the same applies) has a property of not varying with the direction in the same plane.

More specifically, as illustrated in FIG. 2(a), when incident light is diffused by the film, the diffusion condition of emitted light that has been diffused is circular in a plane parallel to the film.

Also, as illustrated in FIG. 2(b), when the term "incident angle $\theta_1$" of incident light is used in the present invention, the incident angle $\theta_1$ means the angle) (° obtainable in a case in which the angle of the normal line to the incident side surface of the light diffusion film is designated as 0°.

Furthermore, in the present invention, the "light diffusion angle region" means the range of angles of the diffused light obtained by fixing a point light source at an angle for which the incident light is the most diffused.

Furthermore, according to the present invention, the term "angle of aperture of diffused light" is the width of angle)(°) of the "light diffusion angle region" described above, and as illustrated in FIG. 2(b), means the angle of aperture of diffused light $\theta_2$ in a case in which a cross-section of the film is viewed from the direction indicated by the arrow X.

Meanwhile, it has been recognized that the width of angle)(°) of the light diffusion angle region and the width of the light diffusion incident angle region are approximately equal.

Furthermore, as illustrated in FIG. 2(a), in a light diffusion film, when incident angles of incident light are included in the light diffusion incident angle region, even if the incident angles are different, almost the same light diffusion can be achieved in the light exist surface side.

Therefore, it can be said that the resulting light diffusion film has a light-converging effect of concentrating light into a predetermined site.

Meanwhile, regarding the change of direction of incident light in the interior of the pillar-shaped objects 12, the case in which the change of direction is of step-index type, with the direction being changed from a straight line form to a zigzag form due to total reflection as illustrated in FIG. 1(b), as well as the case in which the change of direction is of gradient-index type, with the direction being changed to a curved from, may be considered.

Furthermore, in FIGS. 1(a) and 1(b), the boundary surface between the pillar-shaped objects having a relatively high refractive index 12 and the region having a relatively low refractive index 14 is indicated with a straight line for the purpose of simplicity; however, in reality, the interface is slightly meandering, and each of the pillar-shaped objects forms a complicated refractive index distribution structure accompanied by branching or disappearance.

As a result, it is speculated that a non-even distribution of optical characteristics increases light diffusibility.

2. Basic Configuration

Next, the basic configuration of the light diffusion film of the present invention will be explained using the drawings.

Figure 3A:
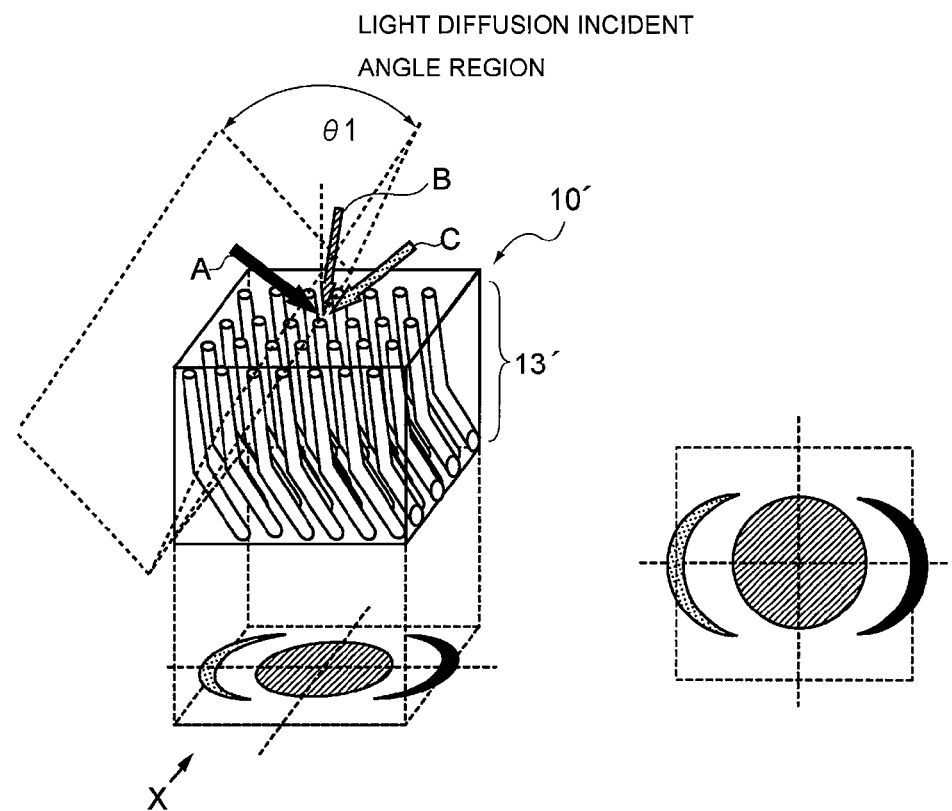
FIGS. 3(a) and 3(b) are diagrams provided to explain the incident angle dependency and isotropic light diffusion in a light diffusion film having a bent columnar structure in the film.
Figure 3B:
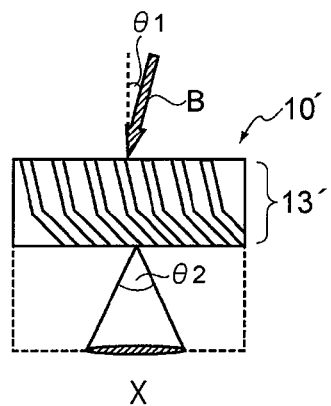

As illustrated in FIGS. 3(a) and 3(b), the light diffusion film 10' of the present invention is a light diffusion film 10' having a columnar structure 13' in which plural pillar-shaped objects having a relatively high refractive index are arranged to stand close together in the film thickness direction in a region having a relatively low refractive index, characterized in that the plural pillar-shaped objects having a relatively high refractive index have a bent part in the middle of the pillar-shaped objects.

That is, the light diffusion film 10' of the present invention is characterized by having a bent columnar structure 13' within the film.

Here, FIG. 3(a) presents an overall view of the light diffusion film 10' of the present invention, and FIG. 3(b) presents a cross-sectional view in the case in which the light diffusion film 10' of FIG. 3(a) is viewed from the X-direction.

A light diffusion film 10' having such a bent columnar structure 13' has incident angle dependency and isotropy as its light diffusion characteristics, based on the same principle as in the case of a light diffusion film having a conventional columnar structure that does not have a bending.

However, in the light diffusion film 10' having a bent columnar structure 13', as illustrated in FIG. 3(b), the angle of aperture $\theta_2$ of diffused light becomes larger, compared to a light diffusion film having a conventional columnar structure.

This is because it can be construed that a bent columnar structure has two kinds of columnar structures having different angles of inclination of the pillar-shaped objects within one sheet of film, with the bent part serving as the boundary.

Therefore, it is because light that has entered is diffused by the columnar structure present in the upper part, and the light diffused thereby is further diffused by the columnar structure present in the lower part, and thereby the angle of aperture $\theta_2$ of diffused light is expanded.

3. Bent Columnar Structure

The internal structure of the light diffusion film of the present invention is characterized by being the bent columnar structure described above.

Meanwhile, the light diffusion film of the present invention has, as will be described below, a bent columnar structure formed within a single-layered film originating from a single coating layer, and such a bent columnar structure is formed by a single irradiation of active energy radiation.

Hereinafter, the bent columnar structure will be explained specifically.

(1) Refractive Index

In regard to the bent columnar structure, it is preferable that the difference between the refractive index of the pillar-shaped objects having a relatively high refractive index and the refractive index of the region having a relatively low refractive index is adjusted to a value of 0.01 or more.

The reason for this is that when such a difference in the refractive index is adjusted to a value of 0.01 or more, incident light can be reflected stably within the bent columnar structure, the incident angle dependency originating from the bent columnar structure can be further increased, and the distinction between a light diffusion incident angle region and a non-light diffusion incident angle region can be controlled in a well-defined manner.

More specifically, it is because if such a difference in the refractive index has a value of below 0.01, the angle range of total reflection of incident light within the bent columnar structure is narrowed, and therefore, the incident angle dependency may be excessively decreased.

Therefore, it is more preferable that the difference between the refractive index of the pillar-shaped objects having a relatively high refractive index and the refractive index of the region having a relatively low refractive index in the bent columnar structure is adjusted to a value of 0.05 or more, and even more preferably to a value of 0.1 or more.

Meanwhile, it is more preferable as the difference between the refractive index of the pillar-shaped objects having a relatively high refractive index and the refractive index of the region having a relatively low refractive index is larger; however, from the viewpoint of appropriately selecting materials capable of forming the bent columnar structure, a difference of about 0.3 is considered as the upper limit.

(2) Maximum Diameter

Figure 4A:
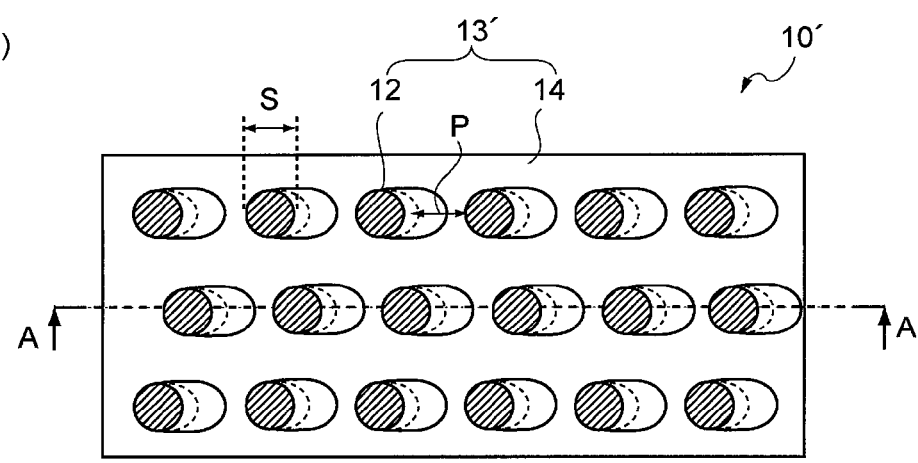
FIGS. 4(a) and 4(b) are diagrams provided to explain a bent columnar structure.

Furthermore, as illustrated in FIG. 4(a), it is preferable that the maximum diameter S in a cross-section of a pillar-shape object in the bent columnar structure is adjusted to a value within the range of 0.1 to 15 μm.

The reason for this is that, when such a maximum diameter is adjusted to a value within the range of 0.1 to 15 μm, incident light can be reflected more stably in the bent columnar structure, and the incident angle dependency originating from the bent columnar structure can be enhanced more effectively.

That is, it is because if such a maximum diameter has a value of below 0.1 μm, it may be difficult to exhibit light diffusibility irrespective of the incident angle of incident light. On the other hand, it is because if such a maximum diameter has a value of above 15 μm, the amount of light that propagates straight through the bent columnar structure increases, and the uniformity of diffused light may be deteriorated.

Therefore, in regard to the bent columnar structure, it is more preferable that the maximum diameter in a cross-section of the pillar-shaped object is adjusted to a value within the range of 0.5 to 10 μm, and even more preferably to a value within the range of 1 to 5 μm.

Meanwhile, the cross-sectional shape of the pillar-shaped object is not particularly limited; however, it is preferable to use, for example, a circular shape, an elliptical shape, a polygonal shape, or an irregular shape.

Furthermore, a cross-section of the pillar-shaped object means a cross-section cut by a plane that is parallel to the film surface.

Meanwhile, the maximum diameter, length and the like of the pillar-shaped object can be measured by making an observation with an opto-digital microscope.

(3) Distance Between Pillar-Shaped Objects

Furthermore, as illustrated in FIG. 4(a), it is preferable for the bent columnar structure that the distance between the pillar-shaped objects, that is, the space P for adjacent pillar-shaped objects, is adjusted to a value within the range of 0.1 to 15 μm.

The reason for this is that, when such a distance is adjusted to a value within the range of 0.1 to 15 μm, incident light can be reflected more stably in the bent columnar structure, and the incident angle dependency originating from the bent columnar structure can be further enhanced.

That is, it is because if such a distance has a value of below 0.1 μm, it may be difficult to show light diffusibility irrespective of the incident angle of incident light. On the other hand, it is because if such a distance has a value of above 15 μm, the amount of light that propagates straight through the bent columnar structure increases, and the uniformity of diffused light may be deteriorated.

Therefore, in regard to the bent columnar structure, it is more preferable that the distance between the pillar-shaped objects has a value within the range of 0.5 to 10 μm, and even more preferably to a value within the range of 1 to 5 μm.

(4) Thickness

Figure 4B:
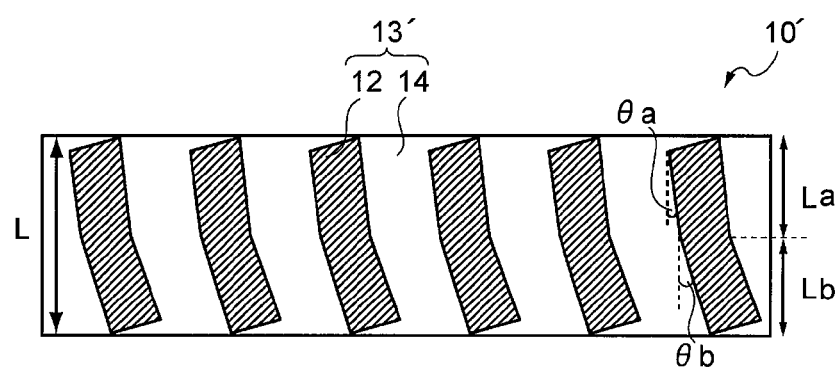

Furthermore, it is preferable that the thickness of the bent columnar structure, that is, as illustrated in FIG. 4(b), the length L of the pillar-shaped objects in the normal line direction of the film plane has a value within the range of 50 to 700 μm.

The reason for this is that, when the thickness of the bent columnar structure has a value within such a range, the length of the pillar-shaped objects along the film thickness direction can be secured stably, the incident light can be reflected more stably in the bent columnar structure region, and the uniformity of the intensity of diffused light in the light diffusion angle region originating from the bent columnar structure can be further enhanced.

That is, it is because if the thickness L of such a bent columnar structure has a value of below 50 μm, the length of the pillar-shaped objects is insufficient, the amount of incident light that propagates straight through the bent columnar structure increases, and it may be difficult to obtain uniformity of the intensity of diffused light in the light diffusion angle region. On the other hand, it is because if the thickness L of such a bent columnar structure has a value of above 700 μm, when the bent columnar structure is formed by irradiating a composition for light diffusion film with active energy radiation, the direction of progress of photo-polymerization is diffused by the columnar structure initially formed, and it may be difficult to form a desired bent columnar structure.

Therefore, it is more preferable that the thickness L of the bent columnar structure has a value within the range of 70 to 300 μm, and even more preferably to a value within the range of 80 to 200 μm.

Furthermore, the light diffusion film of the present invention may have, as illustrated in FIG. 4(b), a bent columnar structure (film thickness direction length L) formed over the entire film thickness direction, or may have a columnar structure-unformed portion on at least any one of the upper end and the lower end of the film.

Furthermore, as illustrated in FIG. 4(b), it is preferable that the length La of the pillar-shaped objects in the upper portion above the bent part in the bent columnar structure 13' (portion on the side where active energy radiation is irradiated when the light diffusion film is produced) is adjusted to a value within the range of 5 to 200 μm.

The reason for this is that, when the length La is adjusted to a value within such a range, the uniformity of the intensity of diffused light in the light diffusion angle region can be enhanced while the angle of aperture of diffused light is expanded more efficiently.

That is, if the length La has a value of below 5 μm, the diffusion originating from the columnar structure of the upper portion becomes too weak, and it may be difficult to expand the angle of aperture of diffused light effectively.

Meanwhile, as the content of the ultraviolet absorber in the composition for light diffusion film increases, the length La tends to be shortened. Therefore, in other words, when the length La is excessively shortened, the content of the ultraviolet absorber becomes very large, and in that case, when the composition for light diffusion film is photocured, the possibility for the occurrence of contraction wrinkles of the film increases so that the control becomes difficult.

On the other hand, if the length La has a value of above 200 μm, diffusion originating from the columnar structure of the upper portion can be obtained sufficiently. However, as the content of the ultraviolet absorber in the composition for light diffusion film is smaller, the length La tends to increase. Therefore, in other words, when the length La becomes excessively long, the content of the ultraviolet absorber becomes very small, and in that case, the columnar structure of the lower portion is not formed sufficiently, and there is a possibility that the effect of expanding the angle of aperture of diffused light may not be sufficiently obtained.

Therefore, it is more preferable that the length La of the pillar-shaped objects in the upper portion above the bent part in the bent columnar structure is adjusted to a value within the range of 10 to 170 μm, and even more preferably to a value within the range of 20 to 140 μm.

Furthermore, as illustrated in FIG. 4(b), it is preferable that the length Lb of the pillar-shaped objects in the lower portion below the bent part in the bent columnar structure $13'$ is adjusted to a value within the range of 20 to 400 μm.

The reason for this is that, when the length Lb is adjusted to a value within such a range, the uniformity of the intensity of diffused light in the light diffusion angle region can be enhanced, while the angle of aperture of diffused light is expanded more efficiently.

That is, it is because if the length Lb has a value of below 20 μm, diffusion originating from the columnar structure in the lower portion becomes excessively weak, and it may be difficult to expand the angle of aperture of diffused light effectively. On the other hand, it is because if the length Lb has a value of above 400 μm, diffusion originating from the columnar structure in the lower portion can be obtained sufficiently; however, the film thickness of the light diffusion film becomes excessively thick, and it may be difficult to apply the light diffusion film for display applications.

Therefore, it is more preferable that the length Lb of the pillar-shaped objects in the lower portion below the bent part in the bent columnar structure is adjusted to a value within the range of 30 to 300 μm, and even more preferably to a value within the range of 40 to 200 μm.

Furthermore, it is preferable that the lengths La and Lb described above satisfy the following relationship expression (2):

$$0.01 \leq La/Lb \leq 10 \tag{2}$$

The reason for this is that when the relationship expression involving the lengths La and Lb is satisfied, the uniformity of the intensity of diffused light in the light diffusion angle region can be enhanced while the angle of aperture of diffused light is expanded more efficiently.

That is, it is because if the ratio La/Lb has a value of below 0.01, the length La becomes excessively short, and the effect of expanding the angle of aperture of diffused light caused by bending of the columnar structure may not be sufficiently obtained. On the other hand, it is because if the ratio La/Lb has a value of above 10, the length Lb becomes excessively short, and the effect of expanding the angle of aperture of diffused light caused by bending of the columnar structure may not be sufficiently obtained.

Therefore, it is more preferable that the lengths La and Lb satisfy the following relationship expression (2'), and it is even more preferable that the lengths satisfy the following relation expression (2"):

$$0.1 \leq La/Lb \leq 8 \tag{2'}$$

$$0.2 \leq La/Lb \leq 6 \tag{2''}$$

(5) Angle of Inclination

Furthermore, as illustrated in FIG. 4(b), in regard to the bent columnar structure, it is preferable that the pillar-shaped objects 12 are arranged to stand close together at a constant angle of inclination with respect to the film thickness direction.

The reason for this is that, when the angle of inclination of the pillar-shaped objects is made constant, incident light in the bent columnar structure can be reflected more stably, and the incident angle dependency originating from the bent columnar structure can be further enhanced.

More specifically, as illustrated in FIG. 4(b), it is preferable that the angle of inclination θa of the pillar-shaped objects with respect to the normal line of the film plane in the upper portion above the bent part in the bent columnar structure $13'$ is adjusted to a value within the range of 0° to 30°.

The reason for this is that when the angle of inclination θa is adjusted to a value within such a range, the angle of aperture of diffused light can be expanded more efficiently.

That is, it is because when the angle of inclination θa has a value of above 30°, since the absolute value of the incident angle of active energy radiation increases accordingly, the proportion of reflection of the active energy radiation at the interface between air and the coating layer increases, and on the occasion of forming the bent column structure, it is necessary to irradiate an active energy radiation of a higher illuminance. On the other hand, when the active energy radiation enters actually at 0°, the direction in which bending occurs may not be determined, and as a result, there is a possibility that bending may not occur.

Therefore, it is more preferable that the angle of inclination θa of the pillar-shaped objects in the upper portion above the bent part in the bent columnar structure is adjusted to a value within the range of 0.5° to 25°, and even more preferably to a value within the range of 1° to 20°.

Meanwhile, the angle of inclination θa means the angle of inclination)(°) of the pillar-shaped objects in the upper portion above the bent part obtainable when the angle of the normal line with respect to the film surface measured at a cross-section in the case in which the film is cut by a plane that is a plane perpendicular to the film surface and cuts one whole pillar-shaped object into two along the axial line, is designated as 0°.

More specifically, as illustrated in FIG. 4(b), the angle of inclination θa means the narrower angle between the angles formed by the normal line of the upper end surface of the bent columnar structure and the top of the pillar-shaped objects in the upper portion above the bent part.

Furthermore, as illustrated in FIG. 4(b), the angle of inclination in the case in which the pillar-shaped objects are inclined to the left side is taken as the reference, and the angle of inclination in the case in which the pillar-shaped objects are inclined to the right side is described with a minus sign.

Furthermore, as illustrated in FIG. 4(b), it is preferable that the angle of inclination θb of the pillar-shaped objects with respect to the normal line of the film plane in the lower portion below the bent part in the bent columnar structure 13' is adjusted to a value within the range of 1° to 60°.

The reasons for this is that when the angle of inclination θb is adjusted to a value within such a range, the angle of aperture of diffused light can be expanded more efficiently.

That is, it is because if the angle of inclination Ob has a value of below 1°, even if the synergistic effect with the columnar structure in the upper portion is considered, it may be difficult to sufficiently obtain the effect of expanding the angle of aperture of diffused light. On the other hand, it is because if the angle of inclination θb has a value of above 60°, since the absolute value of the incident angle of the active energy radiation increases accordingly, the proportion of reflection of the active energy radiation at the interface between air and the coating layer increases, and on the occasion of forming of the bent columnar structure, it is necessary to irradiate active energy radiation of a higher illuminance. Furthermore, it is because when the synergistic effect with the columnar structure of the upper portion is considered, the angle of inclination the angle of aperture of diffused light may not be expanded sufficiently, without using a larger angle of inclination.

Therefore, it is more preferable that the angle of inclination θb of the pillar-shaped objects in the lower portion below the bent part in the bent columnar structure is adjusted to a value within the range of 3° to 55°, and even more preferably to a value within the range of 5° to 50°.

Meanwhile, the definition of the angle of inclination θb is basically the same as that of the angle of inclination θa.

However, the angle of inclination θb means the narrower angle between the angles formed by the normal line of the bent surface of the bent columnar structure and the pillar-shaped objects in the lower portion below the bent part.

Furthermore, it is preferable that the angles of inclination θa and θb described above satisfy the following relationship expression (1):

$$1 \le |\theta b - \theta a| \le 30 \quad (1)$$

The reason for this is that when the angles of inclination θa and θb satisfy such a relationship expression, the angle of aperture of diffused light can be expanded more efficiently.

That is, it is because if $|\theta b - \theta a|$ has a value of below 1°, it may be difficult to obtain the effect of expanding the angle of inclination of diffused light, similarly to the case of not having a bending in the columnar structure. On the other hand, it is because if $|\theta b - \theta a|$ has a value of above 30°, the diffusion regions respectively originating from the columnar structure of the upper portion and the columnar structure of the lower portion are separated too distantly, and it may be rather difficult to obtain the effect of expanding the angle of aperture of diffused light.

Therefore, it is more preferable that the angles of inclination θa and θb satisfy the following relationship expression (1'), and it is even more preferable that the angles of inclination satisfy the following relationship expression (1''):

$$3 \le |\theta b - \theta a| \le 25 \quad (1')$$

$$5 \le |\theta b - \theta a| \le 20 \quad (1'')$$

4. Film Thickness

Furthermore, it is preferable that the film thickness of the light diffusion film of the present invention is adjusted to a value within the range of 60 to 700 μm.

The reason for this is that, if the film thickness of the light diffusion film has a value of below 60 μm, the amount of incident light that propagates straight through the bent columnar structure increases, and it may be difficult to manifest light diffusion. On the other hand, it is because if the film thickness of the light diffusion film has a value of above 700 μm, when a bent columnar structure is formed by irradiating a composition for light diffusion film with active energy radiation, the direction of progress of photopolymerization is diffused by the columnar structure initially formed, and it may be difficult to form a desired bent columnar structure.

Therefore, it is more preferable that the film thickness of the light diffusion film is adjusted to a value within the range of 90 to 450 μm, and even more preferably to a value within the range of 120 to 250 μm.

5. Angle of Aperture of Diffused Light

Furthermore, it is preferable for the light diffusion film of the present invention that the angle of aperture of diffused light is adjusted to a value of 45° or more.

The reason for this is that even if the columnar structure does not have a bending, light diffusion can be achieved with an angle of aperture of diffused light of below 45°.

That is, it is because if the angle of aperture of diffused light has a value of below 45°, when the light diffusion film is applied to a display, since the angle of aperture of diffused light is insufficient, sufficient performance may not be obtained with one sheet of light diffusion film, and there is a need to use plural sheets of light diffusion films. On the other hand, it is because if the angle of aperture of diffused light becomes excessively large, when the light diffusion is used in applications such as a reflective type liquid crystal display or a projection screen, the image display light may become generally dark due to excessive spreading of diffused light.

Therefore, it is more preferable that the angle of aperture of diffused light in the light diffusion film of the present invention is adjusted to a value within the range of 5° to 90°, and even more preferably to a value within the range of 55° to 80°.

6. Adhesive Layer

Furthermore, the light diffusion film of the present invention may also include an adhesive layer to be laminated onto an adherend, on one surface or both surfaces of the light diffusion film.

The adhesive that constitutes such an adhesive layer is not particularly limited, and any conventionally known acrylic, silicone-based, urethane-based, or rubber-based adhesive can be used.

Second Embodiment

A second embodiment of the present invention relates to a method for manufacturing a light diffusion film having a columnar structure in which plural pillar-shaped objects having a relatively high refractive index are arranged to stand close together in the film thickness direction in a region having a relatively low refractive index, and the plural pillar-shaped objects having a relatively high refractive index have a bent part in the middle of the pillar-shaped objects, the method including the following steps (a) to (c):

(a) a step of preparing a composition for light diffusion which includes a (meth)acrylic acid ester containing plural aromatic rings as component (A); a urethane (meth)acrylate as component (B); a photopolymerization initiator as a component (C); and an ultraviolet absorber as component (D), and in which the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount (100 parts by weight) of the component (A) and the component (B), and the content of the component (D) is adjusted to a value within the range of below 2 parts by weight (provided that 0 parts by weight is excluded) relative to the total amount (100 parts by weight) of the component (A) and the component (B);

(b) a step of applying the composition for light diffusion film on a process sheet, and forming a coating layer; and (c) a step of irradiating the coating layer with active energy radiation.

Hereinafter, the second embodiment of the present invention will be explained specifically with reference to the drawings, based mainly on the differences between the second embodiment and the first embodiment.

1. Step (a): Light Diffusion Film Preparing Step

Such a step is a step of preparing a predetermined composition for light diffusion film.

More specifically, the step is a step of mixing the components (A) to (D) and other additives as desired.

Furthermore, when mixing, the mixture may be stirred at room temperature but, from the viewpoint of improving uniformity, for example, it is preferable to stir the mixture under heating conditions at 40° C. to 80° C. to obtain a uniform liquid mixture.

Furthermore, in order to attain a desired viscosity suitable for coating, it is also preferable to further add a diluent solvent.

Hereinafter, the composition for light diffusion film will be explained more specifically.

(1) Component (A)

(1)-1 Kind

The composition for light diffusion film according to the present invention is characterized by including a (meth)acrylic acid ester containing plural aromatic rings as component (A).

The reason for this is that when the composition includes a particular (meth)acrylic acid ester as component (A), it is speculated that the polymerization rate of the component (A) can be made faster than the polymerization rate of the component (B), a predetermined difference in the polymerization rate is generated between these components, and thus copolymerizability of the two components can be decreased effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed efficiently.

Furthermore, it is speculated that when the composition includes a particular (meth)acrylic acid ester as the component (A), the component (A) has sufficient compatibility with the component (B) in the stage of existing as a monomer, while having the compatibility with the component (B) decreased to a predetermined range in the stage of existing as plural monomer molecules connected in the course of polymerization, and the columnar structure region can be formed more efficiently.

Furthermore, when the composition includes a particular (meth)acrylic acid ester as the component (A), the refractive index of the regions originating from the component (A) in the columnar structure region can be increased, and the difference in the refractive index between the regions originating from the component (A) and the regions originating from the component (B) can be regulated to a value more than or equal to a predetermined value.

Therefore, when the composition for light diffusion film includes a particular (meth)acrylic acid ester as the component (A), a columnar structure region in which plural pillar-shaped objects originating from the component (A) and having a relatively high refractive index are arranged to stand close together in a region originating from the component (B) and having a relatively low refractive index can be obtained efficiently, together with the characteristics of the component (B) that will be described below.

Meanwhile, the term "(meth)acrylic ester containing a plurality of aromatic rings" means a compound having a plurality of aromatic rings in the ester residue moiety of the (meth)acrylic ester.

Furthermore, "(meth)acrylic" means both acrylic and methacrylic.

Furthermore, examples of a (meth)acrylic ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate and the like, or compounds in which some of hydrogen atoms on the aromatic ring have been substituted by halogen, alkyl, alkoxy, halogenated alkyl, or the like.

Furthermore, as the (meth)acrylic ester containing a plurality of aromatic rings as the component (A), it is preferable for the composition for light diffusion film to contain a compound containing a biphenyl ring, and it is particularly preferable for the composition to contain a biphenyl compound represented by the following Formula (1):

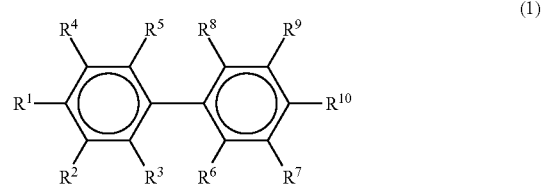

(1)

wherein in Formula (1), $R^1$ to $R^{10}$ are respectively independent of one another; and at least one of $R^1$ to $R^{10}$ represents a substituent represented by the following Formula (2), while the others each represent any one substituent selected from a hydrogen atom, a hydroxyl group, a carboxyl group, an alkyl group, an alkoxy group, a halogenated alkyl group other than fluorine, a hydroxyalkyl group, a carboxyalkyl group, and a halogen atom other than fluorine;

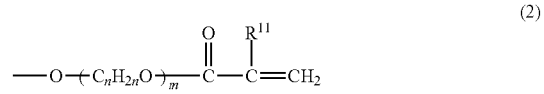

(2)

wherein in Formula (2), $R^{11}$ represents a hydrogen atom or a methyl group; the number of carbon atoms n represents an integer from 1 to 4; and the number of repetitions m represents an integer from 1 to 10.

The reason for this is that, when the composition includes a biphenyl compound having a particular structure as the component (A), it is speculated that a predetermined difference between the polymerization rates of the component (A) and the component (B) is produced, compatibility between the component (A) and the component (B) is decreased to a predetermined range, and thereby copolymerizability between the two components can be further decreased.

Furthermore, the refractive index of the regions originating from the component (A) in the columnar structure region can be increased, and the difference between the refractive index of the regions originating from the component (A) and the refractive index of the regions originating from the component (B) can be more easily regulated to a value more than or equal to a predetermined value.

Furthermore, when $R^1$ to $R^{10}$ in Formula (1) includes any one of an alkyl group, an alkoxy group, a halogenated alkyl group, a hydroxyalkyl group and a carboxyalkyl group, it is preferable to adjust the number of carbon atoms of the alkyl moiety to a value within the range of 1 to 4.

The reason for this is that, if such a number of carbon atoms has a value of above 4, the polymerization rate of the component (A) may be decreased, or the refractive index of the regions originating from the component (A) may be excessively lowered, and it may be difficult to form the columnar structure efficiently.

Therefore, when $R^1$ to $R^{10}$ in Formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value within the range of 1 to 3, and even more preferably to a value within the range of 1 to 2.

Furthermore, it is preferable that $R^1$ to $R^{10}$ in Formula (1) each represent a substituent other than a halogenated alkyl group or a halogen atom, that is, a substituent that does not contain halogen.

The reason for this is that when the light diffusion film is incinerated or the like, generation of dioxin is prevented, and it is preferable from the viewpoint of environmental protection.

Meanwhile, in regard to the conventional light diffusion films, it has been general to perform halogen substitution on the monomer components on the occasion of obtaining a predetermined columnar structure, for the purpose of increasing the refractive indices of the monomer components.

In this regard, when a biphenyl compound represented by Formula (1) is used, even if halogen substitution is not performed, a high refractive index can be obtained.

Therefore, if a light diffusion film formed by photocuring the composition for light diffusion film according to the present invention is used, it can exhibit satisfactory incident angle dependency, even without a compound containing halogen.

Furthermore, it is preferable that any one of $R^2$ to $R^9$ in Formula (1) be a substituent represented by Formula (2).

The reason for this is that, when the position of the substituent represented by Formula (2) is set to a position other than the position of $R^1$ and the position of $R^{10}$, the molecules of the component (A) can be effectively prevented from aligning and crystallizing in a stage prior to photocuring.

Furthermore, the compound is liquid at the monomer stage prior to photocuring, and the compound can be apparently uniformly mixed with the component (B) even if a diluent solvent or the like is not used.

It is because thereby, in the stage of photocuring, aggregation and phase separation at a fine level of the component (A) and the component (B) are enabled, and a light diffusion film having a columnar structure can be obtained more efficiently.

Furthermore, from the same viewpoint, it is particularly preferable that any one of $R^3$, $R^5$, $R^6$ and $R^8$ in Formula (1) be a substituent represented by Formula (2).

Furthermore, it is usually preferable that the number of repetitions m in the substituent represented by Formula (2) be defined as an integer from 1 to 10.

The reason for this is that, if the number of repetitions m has a value exceeding 10, the oxyalkylene chain that links the polymerization site and the biphenyl ring becomes too long, and polymerization of the molecules of the component (A) at the polymerization site may thereby be inhibited.

Therefore, it is more preferable that the number of repetitions m for the substituent represented by Formula (2) be defined as an integer from 1 to 4, and particularly preferable that it be defined as an integer from 1 to 2.

Meanwhile, from the same viewpoint, it is usually preferable that the number of carbon atoms n for the substituent represented by Formula (2) be defined as an integer from 1 to 4.

Furthermore, upon considering the case in which the position of a polymerizable carbon-carbon double bond serving as a polymerization site is so close to the biphenyl ring that the biphenyl ring imposes steric hindrance, and the polymerization rate of the component (A) is decreased, it is more preferable that the number of carbon atoms n for the substituent represented by Formula (2) be defined as an integer from 2 to 4, and particularly preferable that it be defined as an integer from 2 to 3.

Furthermore, specific preferred examples of the biphenyl compound represented by Formula (1) include compounds represented by the following formulas (3) and (4):

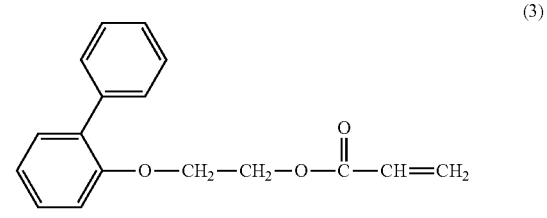

(3)

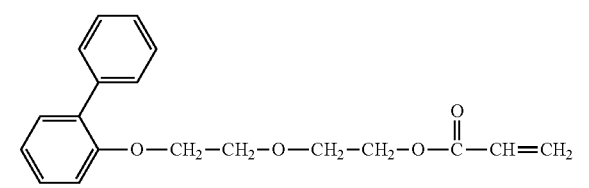

(4)

(1)-2 Molecular Weight

Furthermore, it is preferable to adjust the molecular weight of the component (A) to a value within the range of 200 to 2,500.

The reason for this is that, by adjusting the molecular weight of the component (A) to a value in a predetermined range, it is presumed that the polymerization rate of the component (A) can be made faster, and copolymerizability of the component (A) and the component (B) can be decreased more effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed more efficiently.

That is, it is because, if the molecular weight of the component (A) has a value of below 200, it is speculated that copolymerization of the component (A) with the component (B) occurs more easily because the steric hindrance is diminished, and as a result, it may be difficult to form the columnar structure efficiently. On the other hand, it is because, if the molecular weight of the component (A) has a value of above 2,500, it is speculated that as the difference between the molecular weight of the component (A) and the molecular weight of the component (B) is smaller, the polymerization rate of the component (A) is decreased and approaches the polymerization rate of the component (B), copolymerization with the component (B) more easily occurs, and as a result, it may be difficult to form the columnar structure efficiently.

Therefore, it is more preferable to adjust the molecular weight of the component (A) to a value within the range of 240 to 1,500, and even more preferably to a value within the range of 260 to 1,000.

Meanwhile, the molecular weight of the component (A) can be determined from the calculated value obtainable from the composition of the molecule and the atomic weights of the constituent atoms.

(1)-3 Single Use

Furthermore, the composition for light diffusion film according to the present invention is characterized by including the component (A) as a monomer component that forms the regions having a relatively high refractive index in the columnar structure; however, it is preferable that the component (A) is composed of a single component.

The reason for this is that, when such a configuration is adopted, fluctuation in the refractive index in the regions originating from the component (A) is effectively suppressed, and thereby a light diffusion film having a columnar structure can be obtained more efficiently.

That is, when the compatibility of the component (A) with the component (B) is low, for example, when the component (A) is a halogen-based compound or the like, another component (A) (for example, a non-halogen-based compound) may be used jointly as a third component for making the component (A) compatible with the component (B).

However, in that case, the refractive index in the region with comparatively high refractive index, originating from the component (A), may fluctuate or may become prone to decrease, due to the influence of such a third component.

As a result, the difference in refractive index with the region with comparatively low refractive index, originating from the component (B), may become non-uniform, or may be prone to decrease excessively.

Therefore, it is preferable to select a high refractive index monomer component having compatibility with the component (B), and use that monomer component as a single component (A).

Meanwhile, for example, since a biphenyl compound represented by Formula (3) as the component (A) has a low viscosity, the biphenyl compound can be used as a single component (A) in order to have compatibility with the component (B).

(1)-4 Refractive Index

Furthermore, it is preferable that the refractive index of the component (A) is adjusted to a value within the range of 1.5 to 1.65.

The reason for this is that, when the refractive index of the component (A) is adjusted to a value within such a range, the difference between the refractive index of the regions originating from the component (A) and the refractive index of the region originating from the component (B) can be regulated more easily, and thereby a light diffusion film having a columnar structure can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, it is because if the refractive index of the component (A) has a value of above 1.65, the difference between the refractive index of the component (A) and the refractive index of the component (B) becomes larger, but it may be difficult to form even an apparently compatible state between the component (A) and the component (B).

Therefore, it is more preferable to adjust the refractive index of the component (A) to a value within the range of 1.52 to 1.62 and even more preferable to a value within the range of 1.56 to 1.6.

Meanwhile, the refractive index of the component (A) means the refractive index of the component (A) prior to photocuring.

Furthermore, the refractive index can be measured according to JIS K0062.

(1)-5 Content

Furthermore, the composition for light diffusion film is characterized in that the content of the component (A) is adjusted to a value within the range of 25 parts to 400 parts by weight relative to 100 parts by weight of the component (B) that will be described below.

The reason for this is that, if the content of the component (A) has a value of below 25 parts by weight, the existence ratio of the component (A) to the component (B) decreases, the width of the portion originating from the component (A) in the columnar structure illustrated in the cross-sectional view of FIG. 1(b) becomes excessively smaller compared to the width of the portion originating from the component (B), and it may be difficult to obtain a columnar structure having a sufficient angle of aperture of diffused light even if a bending has been formed. On the other hand, it is because if the content of the component (A) has a value of above 400 parts by weight, the existence ratio of the component (A) to the component (B) increases, the width of the portions originating from the component (A) in the columnar structure becomes excessively larger compared to the width of the portions originating from the component (B), and it may be difficult to obtain a columnar structure having a sufficient angle of aperture of diffused light even if a bending has been formed.

Therefore, it is more preferable to adjust the amount of component (A) to a value within the range of 40 parts to 300 parts by weight, and even more preferably to a value within the range of 50 parts to 200 parts by weight, relative to 100 parts by weight of the component (B).

(2) Component (B)

(2)-1 Kind

The composition for light diffusion film according to the present invention is characterized by including a urethane (meth)acrylate as component (B).

The reason for this is that when a urethane (meth)acrylate is used, the difference between the refractive index of the regions originating from the component (A) and the refractive index originating from the region originating from the component (B) can be regulated more easily, fluctuation in the refractive index of the region originating from the component (B) is suppressed effectively, and a light diffusion film having a columnar structure can be obtained more efficiently.

Meanwhile, (meth)acrylate means both acrylate and methacrylate.

First, urethane (meth)acrylate is formed from (B1) a compound containing at least two isocyanate groups; (B2) a polyol compound, preferably a diol compound, and particularly preferably polyalkylene glycol; and (B3) hydroxyalkyl (meth)acrylate.

Meanwhile, the component (B) is intended to include an oligomer having a repeating unit of urethane bond.

Among these, examples for the component (B1), the compound containing at least two isocyanate groups, include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds and the like such as ethylene glycol, propylene glycol, neopentyl glycol, trimethylolpropane, and castor oil (for example, xylylene diisocyanate-based trifunctional adduct).

Furthermore, among the compounds described above, it is particularly preferable to have an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the reactions of the component (B1) with only the component (B2), or the component (B1) with only the component (B3) can be inhibited, and the component (B1) can react reliably with the component (B2) and the component (B3), so that generation of excess byproducts can be prevented.

As a result, the fluctuation in the refractive index of the region originating from the component (B), that is, the low-refractive index region, in the columnar structure can be suppressed effectively.

Furthermore, when an alicyclic polyisocyanate is used, the resulting compatibility between the component (B) and the component (A) can be decreased to a predetermined range, and a columnar structure can be formed more efficiently, as compared with an aromatic polyisocyanate.

Furthermore, when an alicyclic polyisocyanate is used, since the refractive index of the component (B) thus obtainable can be made small compared to an aromatic polyisocyanate, the difference between the refractive index of the component (B) and the refractive index of the component (A) is increased, light diffusibility can be manifested more reliably, and also, a columnar structure having high uniformity of diffused light in the light diffusion angle region can be formed even more efficiently.

Furthermore, among these alicyclic polyisocyanates, a compound containing two isocyanate groups linked via an aliphatic ring is preferred.

The reason for this is that when such an alicyclic diisocyanate is used, the compound reacts quantitatively with the component (B2) and the component (B3), and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components that form a urethane (meth)acrylate, examples of the polyalkylene glycol as the component (B2) include polyethylene glycol, polypropylene glycol, polybutylene glycol, and polyhexylene glycol, and among them, it is particularly preferable that the polyalkylene glycol is polypropylene glycol.

The reason for this is that, when polypropylene glycol is used, when the component (B) is cured, polypropylene glycol becomes a satisfactory soft segment in the cured product, and can effectively enhance handleability or mountability of the light diffusion film.

Meanwhile, the weight average molecular weight of the component (B) can be adjusted mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components forming urethane (meth)acrylate, for the component (B3), examples of hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate and the like.

Furthermore, from the viewpoint of decreasing the polymerization rate of the resulting urethane (meth)acrylate and forming a columnar structure more efficiently, particularly, a hydroxyalkyl methacrylate is more preferred, and 2-hydroxyethyl methacrylate is even more preferred.

Furthermore, synthesis of the urethane (meth)acrylate based on the components (B1) to (B3) can be carried out by a conventional method.

In this case, it is preferable to adjust the mixing ratio of the components (B1) to (B3) to a mole ratio of component (B1):component (B2):component (B3)=1 to 5:1:1 to 5.

The reason for this is that, with such a mixing ratio, a urethane (meth)acrylate can be efficiently synthesized, in which each one of the isocyanate groups carried by the components (B1) has reacted with the two hydroxyl groups carried by the component (B2) and bonded thereto, and the hydroxyl groups carried by the component (B3) have reacted with the other isocyanate group respectively carried by the two components (B1) and bonded thereto.

Therefore, it is more preferable to adjust the mixing ratio of the components (B1) to (B3) to a molar ratio of component (B1):component (B2):component (B3)=1 to 3:1:1 to 3, and even more preferably to the ratio of 2:1:2.

(2)-2 Weight Average Molecular Weight

Furthermore, it is preferable to adjust the weight average molecular weight of the component (B) to a value within the range of 3,000 to 20,000.

The reason for this is that when the weight average molecular weight of the component (B) is adjusted to a predetermined range, it is speculated that a predetermined difference is produced in the polymerization rates of the component (A) and the component (B), and copolymerizability of the two components can be decreased effectively.

As a result, when the composition for light diffusion film is photocured, a columnar structure in which plural pillar-shaped objects originating from the component (A) and having a relatively high refractive index are arranged to stand close together in a region originating from the component (B) and having a relatively low refractive index, can be formed efficiently.

That is, it is because if the weight average molecular weight of the component (B) has a value of below 3,000, the polymerization rate of the component (B) increases and becomes closer to the polymerization rate of the component (A), thus copolymerization with the component (A) is liable to occur, and as a result, it may be difficult to form a columnar structure efficiently. On the other hand, it is because if the weight average molecular weight of the component (B) has a value of above 20,000, it may be difficult to form a columnar structure, compatibility of the component (B) with the component (A) is excessively decreased, and thereby the component (A) may be precipitated out in the stage of application.

Therefore, it is more preferable to adjust the weight average molecular weight of the component (B) to a value within the range of 5,000 to 15,000, and even more preferable to adjust it to a value within the range of 7,000 to 13,000.

Meanwhile, the weight average molecular weight of the component (B) can be measured using gel permeation chromatography (GPC).

(2)-3 Single Use

Furthermore, for the component (B), two or more kinds having different molecular structures or weight average molecular weights may be used in combination; however, from the viewpoint of suppressing fluctuation in the refractive index of the region originating from the component (B) in the columnar structure, it is preferable to use only one kind.

That is, it is because when a plurality of compounds are used for the component (B), the refractive index for the region with comparatively low refractive index originating from the component (B) may fluctuate or increase, and the difference of refractive index with the region with comparatively high refractive index originating from the component (A) may become non-uniform or decrease excessively.

(2)-4 Refractive Index

Furthermore, it is preferable that the refractive index of the component (B) is adjusted to a value within the range of 1.4 to 1.55.

The reason for this is that when the refractive index of the component (B) is adjusted to a value within such a range, the difference between the refractive index of the regions originating from the component (A) and the refractive index of the region originating from the component (B) can be regulated more easily, and a light diffusion film having a columnar structure can be obtained more efficiently.

That is, it is because if the refractive index of the component (B) has a value of below 1.4, the difference between the refractive index of the component (B) and the refractive index of the component (A) becomes large; however, compatibility with the component (A) is extremely deteriorated, and there is a risk that a columnar structure may not be formed. On the other hand, it is because if the refractive index of the component (B) has a value of above 1.55, the difference between the refractive index of the component (B) and the refractive index of the component (A) becomes too small, and it may be difficult to obtain desired incident angle dependency.

Therefore, it is more preferable to adjust the refractive index of the component (B) to a value within the range of 1.45 to 1.54, and even more preferably to a value within the range of 1.46 to 1.52.

Meanwhile, the refractive index of the component (B) described above means the refractive index of the component (B) prior to photocuring.

The refractive index can be measured, for example, according to JIS K0062.

Furthermore, it is preferable to adjust the difference between the refractive indices of the component (A) and the component (B) to a value of 0.01 or more.

The reason for this is that, when such difference in refractive index is adjusted to a value in a predetermined range, a light diffusion film can be obtained, which has more satisfactory incident angle dependency in connection with the transmission and the diffusion of light, and has a broader light diffusion incident angle region.

That is, it is because if such a difference in the refractive index has a value of below 0.01, since the angle range of total reflection of incident light in the columnar structure is narrowed, the angle of aperture for light diffusion may be excessively narrowed. On the other hand, it is because such a difference in the refractive index has an excessively large value, compatibility between the component (A) and the component (B) is excessively deteriorated, and there is a risk that a columnar structure may not be formed.

Therefore, it is more preferable to adjust the difference between the refractive indices of the component (A) and the component (B) to a value within the range of 0.05 to 0.5, and even more preferable to adjust it to a value within the range of 0.1 to 0.2.

Meanwhile, the refractive indices of the component (A) and the component (B) mean the refractive indices of the component (A) and the component (B) prior to photocuring.

(2)-5 Content

Furthermore, it is preferable that the content of the component (B) in the composition for light diffusion film is adjusted to a value within the range of 10 parts to 80 parts by weight relative to 100 parts by weight of the total amount of the composition for light diffusion film.

The reason for this is that, if the content of the component (B) has a value of below 10 parts by weight, the existence ratio of the component (B) to the component (A) decreases, the width of the portion originating from the component (B) in the columnar structure becomes excessively smaller compared to the width of the portions originating from the component (A), and it may be difficult to obtain a columnar structure having a sufficient angle of aperture of diffused light even if a bending has been formed. On the other hand, it is because if the content of the component (B) has a value of above 80 parts by weight, the existence ratio of the component (B) to the component (A) increases, the width of the portion originating from the component (B) in the columnar structure becomes excessively larger compared to the width of the portions originating from the component (A), and it may be difficult to obtain a columnar structure having a sufficient angle of aperture of diffused light even if a bending has been formed.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for light diffusion film.

(3) Component (C)

(3)-1 Kind

Furthermore, the composition for light diffusion film according to the present invention is characterized by including a photopolymerization initiator as component (C).

The reason for this is that, when the composition for light diffusion film is irradiated with active energy radiation, a columnar structure in which plural pillar-shaped objects originating from the component (A) and having a relatively high refractive index are arranged to stand close together in a region originating from the component (B) and having a relatively low refractive index, can be formed efficiently.

Here, a photopolymerization initiator refers to a compound which generates a radical species when irradiated with active energy radiation such as ultraviolet radiation.

Such a photopolymerization initiator as the component (C) is preferably at least one selected from the group consisting of an α-hydroxyacetophenone type photopolymerization initiator, an α-aminoacetophenone type photopolymerization initiator, and an acylphosphine oxide type polymerization initiator.

The reason for this is that when such a photopolymerization initiator is used, since a bending can be produced in a more well-defined manner in the columnar structure, the angle of aperture of diffused light in the resulting light diffusion film can be expanded more effectively.

That is, it is because when such a photopolymerization initiator is used, it is assumed that on the occasion of forming a bent columnar structure, the photopolymerization initiator contributes to curing while promoting separation of these components so that the difference in the refractive index between the regions originating from the component (A) and the component (B) becomes larger.

Specific examples of the photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo[2-hydroxy-2-methyl-1-[4-(1-methylvinyl) phenyl]propane]. Among them, the α-hydroxyacetophenone type photopolymerization initiator is preferably 2-hydroxy-2-methyl-1-phenylpropan-1-one.

(3)-2 Content

Furthermore, the composition for light diffusion film is characterized in that the content of the component (C) in the composition is adjusted to a value within the range of 0.2 parts to 20 parts by weight relative to the total amount (100 parts by weight) of the component (A) and the component (B).

The reason for this is that, when the content of the component (C) is adjusted to a value within such a range, together with the action of the component (D) that will be described below, a bending can be produced in the columnar structure formed within the film without inhibiting curing of the composition for light diffusion film, and thereby, the angle of aperture of diffused light in the resulting light diffusion film can be expanded effectively.

That is, it is because if the content of the component (C) has a value of below 0.2 parts by weight, there are an insufficient number of polymerization initiation sites, and therefore, it may be difficult to cure the film sufficiently. On the other hand, it is because if the content of the component (C) has a value of above 20 parts by weight, the angle of aperture of diffused light can be expanded sufficiently, yellowing of the film or deterioration of durability is liable to occur. Furthermore, it is because ultraviolet absorption at the surface layer of the coating layer may be excessively intensified, and rather, there may be a problem such as that curing is inhibited, foul odor of the composition for light diffusion film becomes strong, or the initial yellow tinge in the resulting film may become intense.

Therefore, it is more preferable that the content of the component (C) is adjusted to a value within the range of 0.5 parts to 15 parts by weight, and even more preferably to a value within the range of 1 part to 10 parts by weight, relative to the total amount (100 parts by weight) of the component (A) and the component (B).

(4) Component (D)

(4)-1 Kind

Furthermore, the composition for light diffusion film according to the present invention is characterized by including an ultraviolet absorber as component (D).

The reason for this is that, when the composition includes an ultraviolet absorber as the component (D), the composition can absorb active energy radiation having a predetermined wavelength selectively to a predetermined extent, when active energy radiation is irradiated.

As a result, a bending can be produced in the columnar structure formed within the film as illustrated in FIGS. 3(a) and 3(b), without inhibiting curing of the composition for light diffusion film, and thereby, the angle of aperture of diffused light in the resulting light diffusion film can be expanded effectively.

Here, at the present moment, the specific mechanism by which an ultraviolet absorber produces bending in the columnar structure formed in the film is not sufficiently clearly known.

However, the mechanism is speculated to be as follows.

That is, empirically, it has been recognized that as the amount of addition of the ultraviolet absorber is smaller, the angle of bending becomes smaller, and the angle of aperture of diffused light becomes smaller.

Furthermore, it has been recognized that with an ultraviolet absorber having a peak at a site closer to the wavelength of 365 nm, which is the primary wavelength of a high pressure mercury lamp, bending is produced by a smaller amount of addition of the ultraviolet absorber.

Therefore, it is speculated that as the wavelength of the ultraviolet radiation emitted from a high pressure mercury lamp is more effectively controlled by the ultraviolet absorber, that is, as the intensity ratio of various wavelengths in the ultraviolet radiation emitted from a high pressure mercury lamp changes, the progress of polymerization in the lower part in the film thickness direction of the coating layer is delayed, and the direction of progress of polymerization changes at a depth at which polymerization has proceeded to a certain extent.

Meanwhile, the difference between the refractive indices of the component (A) and the component (B) may be considered as a factor that changes the direction of progress of polymerization; however, bending to an extent that can be actually recognized is not produced in such a difference in refractive index, according to calculations.

Therefore, it is urgently needed to elucidate the factors that change the direction of progress of polymerization.

Furthermore, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

The reason for this is that, when such an ultraviolet absorber is used, since bending can be produced in a more well-defined manner in the columnar structure, the angle of aperture of diffused light in the resulting light diffusion film can be expanded more effectively.

That is, this is because it has been confirmed that when such an ultraviolet absorber having a peak at a site closer to the wavelength of 365 nm, which is the primary wavelength of a high pressure mercury lamp, bending is produced by a smaller amount of addition of the ultraviolet absorber.
Furthermore, specific preferred examples of the hydroxyphenyltriazine-based ultraviolet absorber include compounds represented by the following formulas (5) to (9):
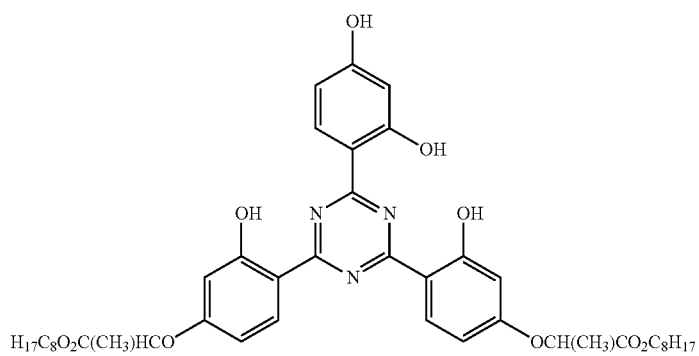
(5)
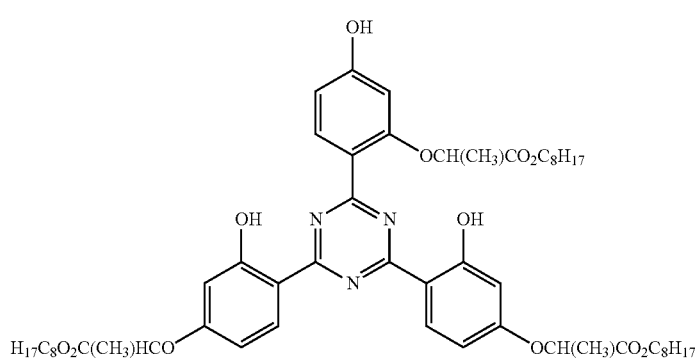
(6)
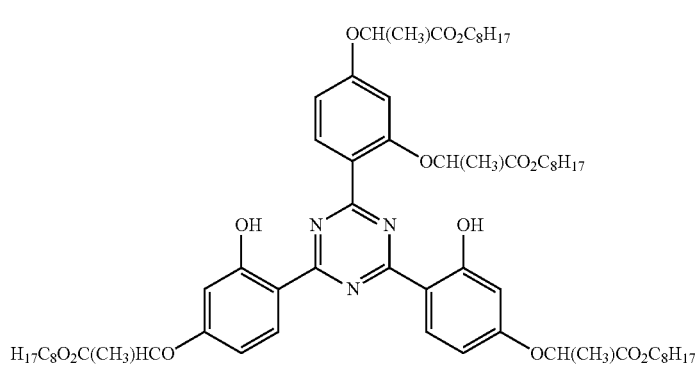
(7)
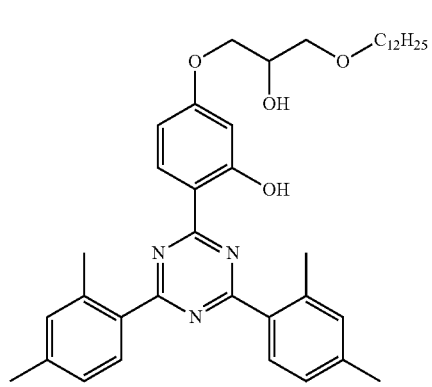
(8)
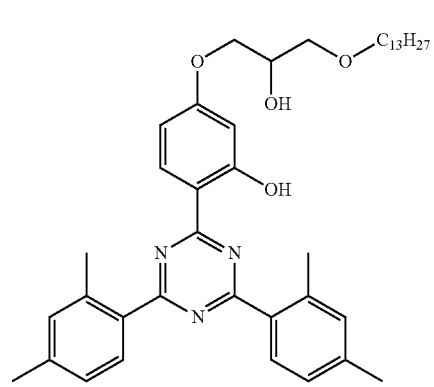
(9)

Furthermore, specific preferred examples of the benzotriazole-based ultraviolet absorber include compounds represented by the following Formula (10):

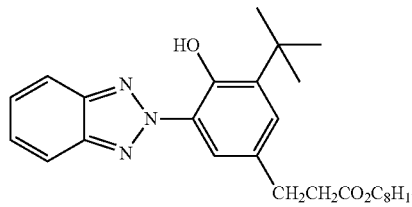

(10)

(4)-2 Absorption Wavelength

Furthermore, it is preferable that the component (D) has an absorption peak for a light having a wavelength of 330 nm to 380 nm.

The reason for this is that when the component (D) has such light absorption characteristics, since bending can be produced in a more well-defined manner in the columnar structure, the angle of aperture of diffused light in the resulting light diffusion film can be expanded more effectively.

That is, it is because if the absorption peak has a wavelength value of below 330 nm, the influence on the intensity ratio of various wavelengths in the ultraviolet radiation having a primary wavelength of 365 nm that is emitted from a high pressure mercury lamp is low, and it may be difficult of sufficiently achieve bending of the columnar structure, and also, the expansion of the angle of aperture of diffused light. On the other hand, it is because if the absorption peak has a wavelength value of above 380 nm, absorption over the entire wavelength region of ultraviolet radiation that is emitted from a high pressure mercury lamp is intensified, and it may be difficult to sufficiently cure the film.

Therefore, it is more preferable that the absorption peak of the component (D) is adjusted to a value within the wavelength range of 335 to 375 nm, and even more preferably to a value within the wavelength range of 340 to 370 nm.

(4)-3 Content

Furthermore, the composition for light diffusion film is characterized in that the content of the component (D) in the composition is adjusted to a value of below 2 parts by weight (provided that 0 parts by weight is excluded) relative to the total amount (100 parts by weight) of the component (A) and the component (B).

The reason for this is that, when the content of the component (D) is adjusted to a value within such a range, bending can be produced in the columnar structure formed in the film without inhibiting curing of the composition for light diffusion film, and thereby, the angle of aperture of diffused light in the resulting light diffusion film can be expanded effectively.

That is, it is because if the content of the component (D) has a value of 2 parts by weight or more, curing of the composition for light diffusion film may be inhibited, and thus contraction wrinkles may be generated on the film surface, or the composition may not be cured at all. On the other hand, it is because if the content of the component (D) is excessively small, it may be difficult to produce sufficient bending in the columnar structure formed in the film, and it may be difficult to effectively expand the angle of aperture of diffused light in the resulting light diffusion film.

Therefore, it is more preferable that the content of the component (D) is adjusted to a value within the range of 0.01 parts to 1.5 parts by weight, and even more preferably to a value within the range of 0.02 parts to 1 part by weight, relative to the total amount (100 parts by weight) of the component (A) and the component (B).

(5) Other Additives

Furthermore, additives other than the compounds described above can be appropriately added to the extent that the effect of the present invention is not impaired.

Examples of such additives include a hindered amine-based photostabilizer, an oxidation inhibitor, an antistatic agent, a polymerization accelerator, a polymerization inhibitor, an infrared absorber, a plasticizer, a diluent solvent, and a leveling agent.

Meanwhile, it is generally preferable that the content of such an additive is adjusted to a value within the range of 0.01 parts to 5 parts by weight, more preferably to a value within the range of 0.02 parts to 3 parts by weight, and even more preferably to a value within the range of 0.05 parts to 2 parts by weight, relative to the total amount (100 parts by weight) of the component (A) and the component (B).

2. Step (b): Application Step

Such a step is, as illustrated in FIG. 5(a), a step of applying the composition for light diffusion film on a process sheet 2, and forming a coating layer 1.

Regarding the process sheet, a plastic film and paper can all be used.

Among these, examples of plastic films include polyester-based films such as a polyethylene terephthalate film; polyolefin-based films such as a polyethylene film and a polypropylene film, cellulose-based films such as a triacetyl cellulose film, polyimide-based films, and the like.

Furthermore, examples of paper include glassine paper, coated paper, and laminate paper.

Furthermore, in consideration of the processes that will be described below, the process sheet 2 is preferably a plastic film that has excellent dimensional stability against heat or active energy radiation.

Preferred examples of such film include, among those described above, a polyester-based film, a polyolefin-based film, and a polyimide-based film.

Furthermore, in the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, an olefin-based release agent or the like.

Meanwhile, usually, the thickness of the process sheet is preferably adjusted to a value within the range of 25 μm to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, at this time, it is preferable that the film thickness of the coating layer is adjusted to a value within the range of 80 to 700 μm.

3. Step (c): Active Energy Ray Irradiation Step

Such a step is, as illustrated in FIG. 5(b), a step of subjecting the coating layer 1 to active energy ray irradiation, forming a bent columnar structure in the film, and obtaining a light diffusion film.

More specifically, in the active energy ray irradiation step, the coating layer formed on the process sheet is irradiated with parallel light having high parallelism of light rays.

Here, parallel light means a light in which the direction of emitted light is approximately parallel without any spreading when viewed from any direction.

Figure 6A:
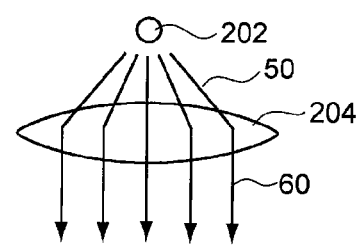
FIGS. 6(a) to 6(d) are diagrams provided to explain an active energy ray irradiation step.
Figure 6B:
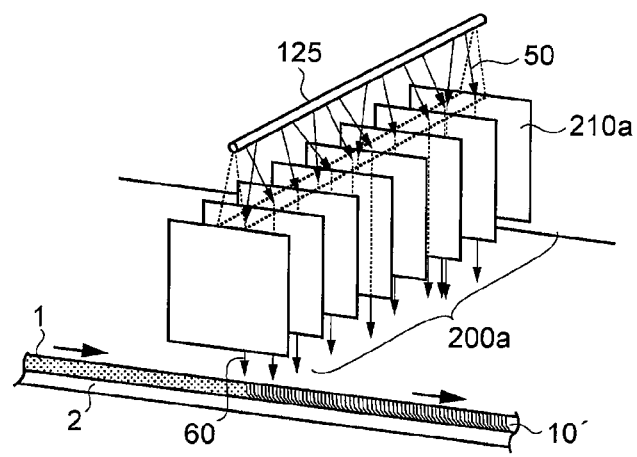
Figure 6C:
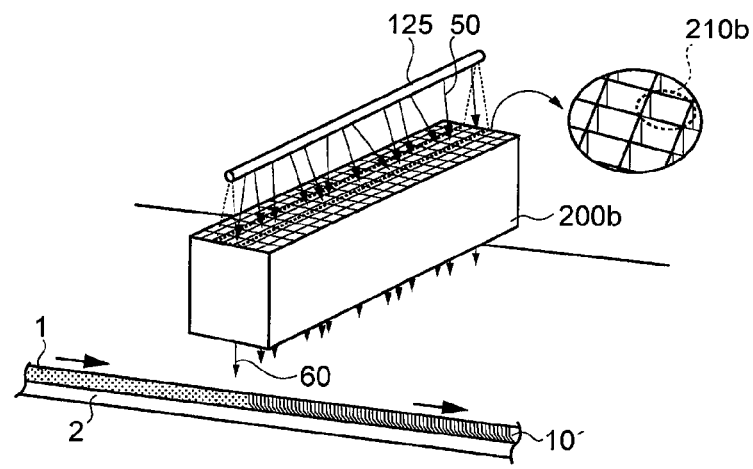

More specifically, for example, as illustrated in FIG. 6(a), it is preferable that irradiated light 50 coming from a point light source 202 is converted to parallel light 60 by means of a lens 204, and then the parallel light is irradiated to the coating layer, or as illustrated in FIGS. 6(b) and 6(c), irradiated light 50 coming from a linear light source 125 is converted to parallel light 60 by means of irradiated light parallelizing members 200 (200a, 200b), and then the parallel light is irradiated to the coating layer.

Figure 6D:
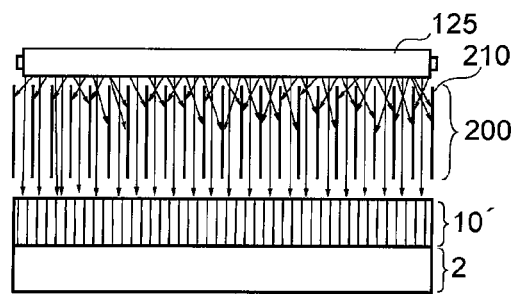

Meanwhile, as illustrated in FIG. 6(d), the irradiated light parallelizing members 200 can convert, among the direct light emitted by the linear light source 125, a direct light emitted by a linear light source 125 to parallel light, by unifying the direction of light using, for example, light blocking members 210 such as plate-shaped members 210a or cylindrical members 210b in a direction parallel to the axial line direction of the linear light source 125 whose direction of light is random.

More specifically, among the direct light emitted by the linear light source 125, light with low parallelism with respect to the light blocking members 210 such as plate-shaped members 210a or cylindrical members 210b, is brought into contact with these light blocking members and is absorbed.

Therefore, only light with high parallelism, that is, parallel light, with respect to the light blocking members 210 such as plate-shaped members 210a or cylindrical members 210b can pass through the irradiated light parallelizing members 200, and as a result, the direct light emitted by the linear light source 125 is converted to parallel light by the irradiated light parallelizing members 200.

Meanwhile, the material for the light blocking members 210 such as plate-shaped members 210a or cylindrical members 210b is not particularly limited as long as the material can absorb light with low parallelism with respect to the light blocking members 210, and for example, a heat resistant black-painted ulster steel sheet can be used.

It is also preferable that the parallelism of the irradiated light is adjusted to a value of 10° or less.

The reason for this is that when the parallelism of the irradiated light is adjusted to a value within such a range, the columnar structure can be formed efficiently and stably.

Therefore, it is more preferable that the parallelism of the irradiated light is adjusted to a value of 5° or less, and even more preferably to a value of 2° or less.

Figure 7:
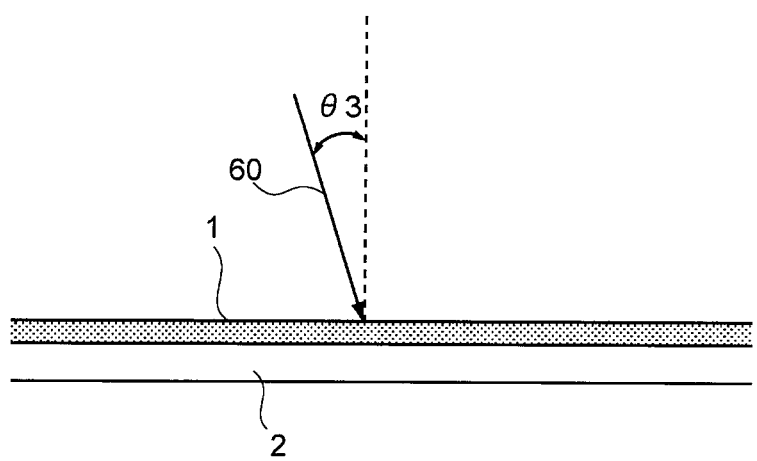
FIG. 7 is another diagram provided to explain the active energy ray irradiation step.

Furthermore, regarding the angle of irradiation of the irradiated light, as illustrated in FIG. 7, it is preferable that the angle of irradiation θ3 obtainable when the angle of the normal line with respect to the surface of the coating layer 1 is designated as 0°, is adjusted usually to a value within the range of −80° to 80°.

The reason for this is that when the angle of irradiation is adjusted to a value within the range of −80° to 80°, the influence of reflection or the like at the surface of the coating layer 1 is increased, and it may be difficult to form a satisfactory columnar structure.

Furthermore, regarding the irradiated light, it is preferable to use ultraviolet radiation.

The reason for this is that, in the case of an electron beam, since the polymerization rate is very fast, the component (A) and the component (B) may not undergo phase separation sufficiently during the course of polymerization, and it may be difficult to form a columnar structure. On the other hand, it is because when compared with visible light or the like, ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of ultraviolet radiation, it is preferable that the peak illuminance at the surface of the coating layer is adjusted to a value within the range of 0.5 to 10 mW/cm$^2$.

The reason for this is that, if such a peak illuminance has a value of below 0.5 mW/cm$^2$, since the composition for light diffusion film includes an ultraviolet absorber, ultraviolet absorption occurs at the coating layer surface, the formation of a columnar structure caused by polymerization does not proceed from the upper part toward the lower part along the film thickness direction, and it may be difficult to cure the film. On the other hand, it is because, if such a peak illuminance has a value of above 10 mW/cm$^2$, the formation of a columnar structure caused by polymerization instantaneously proceeds from the upper part toward the lower part along the film thickness direction, and bending may not be produced.

Therefore, it is more preferable that the peak illuminance at the coating layer surface upon ultraviolet irradiation is adjusted to a value within the range of 0.5 to 8 mW/cm$^2$, and even more preferably to a value within the range of 0.7 to 6 mW/cm$^2$.

Furthermore, it is preferable that the cumulative amount of light at the coating layer surface upon ultraviolet irradiation is adjusted to a value within the range of 10 to 200 mJ/cm$^2$.

The reason for this is that, if such a cumulative amount of light has a value of below 10 mJ/cm$^2$, the coating layer may not be cured due to insufficiency of the amount of light, or the formation of a columnar structure caused by polymerization does not sufficiently proceed from the upper part toward the lower part along the film thickness direction, and predetermined bending may not be obtained. On the other hand, it is because, if such a cumulative amount of light has a value of above 200 mJ/cm$^2$, ultraviolet radiation is irradiated excessively, and the film may undergo yellowing deterioration, that is, yellow tinge of the film may become intense.

Therefore, it is more preferable that the cumulative amount of light at the coating layer surface upon ultraviolet irradiation is adjusted to a value within the range of 15 to 150 mJ/cm$^2$, and even more preferably to a value within the range of 20 to 100 mJ/cm$^2$.

Furthermore, it is preferable that at the time of ultraviolet irradiation, the coating layer formed on the process sheet is moved at a speed of 0.1 to 10 m/min.

The reason for this is that, if such a speed has a value of below 0.1 m/min, mass productivity may be deteriorated excessively. On the other hand, it is because if such a speed has a value of above 10 m/min, the speed may be faster than the speed of curing of the coating layer, in other words, formation of the columnar structure, and the incident angle of ultraviolet radiation with respect to the coating layer changes, so that the formation of the columnar structure may be insufficiently achieved.

Therefore, it is more preferable that at the time of ultraviolet irradiation, the coating layer formed on the process sheet is moved at a speed within the range of 0.2 to 5 m/min, and it is even more preferable that the coating layer is moved at a speed within the range of 0.3 to 3 m/min.

Furthermore, it is also preferable that ultraviolet radiation is irradiated while the temperature of the coating layer is controlled to a value within the range of 0° C. to 60° C.

The reason for this is that when the temperature of the coating layer is controlled, the component (D) can be completely dissolved in the composition for light diffusion film, and the resulting internal structure can be bent to a larger extent.

Therefore, it is more preferable that the temperature of the coating layer is adjusted to a value within the range of 5° C. to 50° C., and even more preferably to a value within the range of 15° C. to 30° C.

Meanwhile, the light diffusion film after the ultraviolet irradiation step is finally brought to a state of being usable, by detaching the process sheet.

Here, according to the present invention, since the composition for light diffusion film includes a predetermined amount of an ultraviolet absorber as the component (D), when the composition is irradiated with ultraviolet radiation, the composition can absorb active energy radiation having a predetermined wavelength selectively to a predetermined extent.

Therefore, according to the present invention, for example, it is not necessary to regulate the wavelength distribution for the ultraviolet radiation using a band pass filter or the like.

Therefore, according to the present invention, it is preferable to irradiate the coating layer directly with a light irradiated from an ultraviolet light source, without using a band pass filter or the like.

That is, since band pass filters generally use quartz glass as a substrate so as to be able to withstand active energy ray irradiation for a long time, and also have multilayer sputtered layers, band pass filters are very expensive.

Furthermore, on the occasion of forming a columnar structure having a bending, plural band pass filters should be tested in a stage of inspecting the optimal conditions, and thus it is even more economically disadvantageous.

On the other hand, when a columnar structure having a bending is formed using an ultraviolet absorber, the ultraviolet absorber is markedly inexpensive compared to band pass filters, and the optimal conditions can be examined more easily by regulating the combinations of the kind and the amount of addition. Thus, it is significantly economically advantageous to use an ultraviolet absorber.

Furthermore, it is also contemplated to control the wavelength of ultraviolet radiation by means of both a band pass filter and an ultraviolet absorber; however, in that case, the control of wavelength may be excessive, and it may be difficult to obtain an illuminance and an amount of light sufficient for curing the coating layer.

Also, increasing the light source intensity in order to supplement the illuminance and the amount of light of ultraviolet radiation, leads to a large energy loss and an increase in production cost.

Therefore, since there are not enough advantages of using both a band pass filter and an ultraviolet absorber, it is preferable to form a columnar structure having a bending by considering the wavelength of the ultraviolet radiation and the absorption wavelength of the photopolymerization initiator or other components, and then optimizing the kind and the amount of addition of the ultraviolet absorber, without using a band pass filter.

EXAMPLES

Hereinafter, the present invention will be explained in more detail by way of Examples.

Example 1

1. Synthesis of Low-Refractive Index Polymerizable Compound (B) Component

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the compounds were reacted according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:
GPC analyzer: manufactured by Tosoh Corp., HLC-8020
GPC column: manufactured by Tosoh Corp. (hereinafter, described in order of passage)
TSK GUARD COLUMN HXL-H
TSK GEL GMHXL (×2)
TSK GEL G2000HXL
Measurement solvent: Tetrahydrofuran
Measurement temperature: 40° C.

2. Preparation of Composition for Light Diffusion Film

Subsequently, a composition for light diffusion film was obtained by mixing 100 parts by weight of a polyether urethane methacrylate having a weight average molecular weight of 9,900 as the component (B) thus obtained, with 150 parts by weight of o-phenylphenoxy ethoxyethyl acrylate represented by the above Formula (3) and having a molecular weight of 268 (manufactured by Shin Nakamura Chemical Co., Ltd., NK ESTER A-LEN-10) as the component (A), 0.25 parts by weight (0.1 parts by weight relative to the total amount (100 parts by weight) of the component (A) and the component (B)) of a mixture of the ultraviolet absorbers represented by the above formulas (5) to (7) (manufactured by BASF SE, TINUVIN 477) as the component (D), and 20 parts by weight (8 parts by weight relative to the total amount (100 parts by weight) of the component (A) and the component (B)) of 2-hydroxy-2-methyl-1-phenylpropan-1-one as the component (C), and then heating and mixing the mixture under the conditions of 80° C.

Meanwhile, the refractive indices of the component (A) and the component (B) were measured according to JIS K0062 using an Abbe refractometer (manufactured by Atago Co., Ltd., ABBE REFRACTOMETER DR-M2, Na light source, and wavelength 589 nm), and the refractive indices were 1.58 and 1.46, respectively.

Furthermore, the light absorption characteristics of the various components that constituted the composition for light diffusion film were measured.

That is, the transmittances (%) or absorbances (–) for various wavelengths (nm) of the component (A), component (B), component (C), and component (D) were measured using an ultraviolet-visible-near infrared spectrophotometer (manufactured by Shimadzu Corp., UV-3600). The wavelength-transmittance charts or wavelength-absorbance charts thus obtained are presented in FIGS. 8 to 10.

Figure 8:
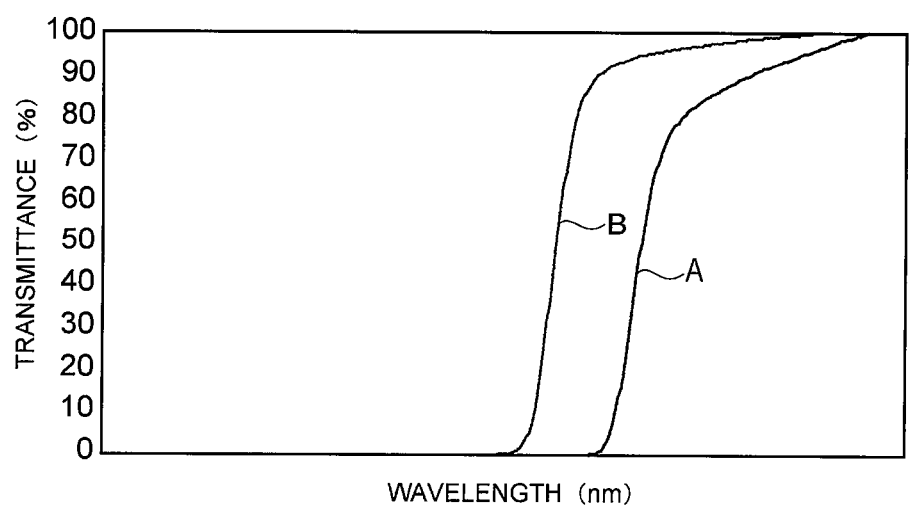
FIG. 8 is a diagram provided to show a wavelength-transmittance chart of the component (A) and the component (B).
Figure 9:
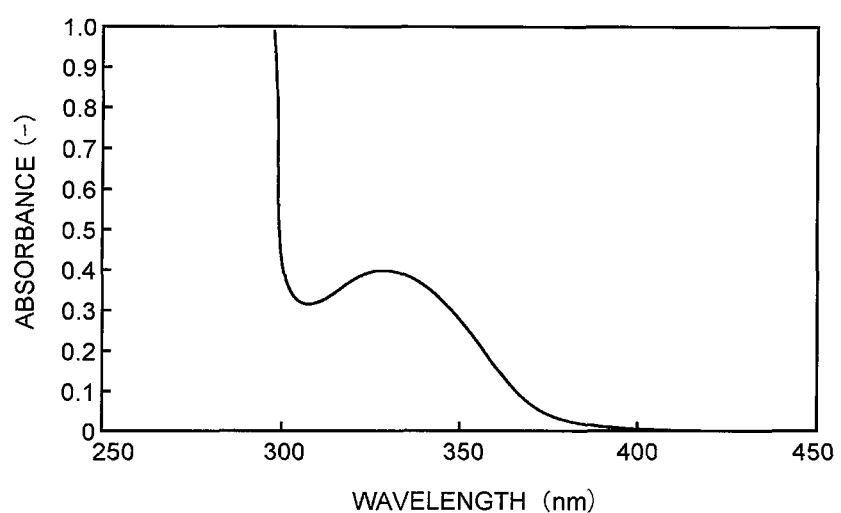
FIG. 9 is a diagram provided to show a wavelength-absorbance chart of the component (C).
Figure 10A:
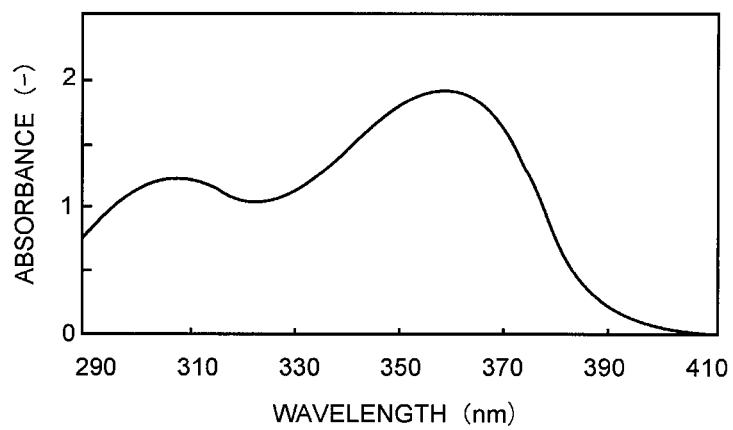
FIGS. 10(a) to 10(c) are diagrams provided to show wavelength-absorbance charts of the component (D).

Meanwhile, in FIG. 8, the characteristic curve A is a wavelength-transmittance chart for the component (A) used, and the characteristic curve B is a wavelength-transmittance chart for the component (B) used. FIG. 9 is a wavelength-absorbance chart for the component (C) used, and FIG. 10(a) is a wavelength-absorbance chart for the component (D) used.

Figure 10B:
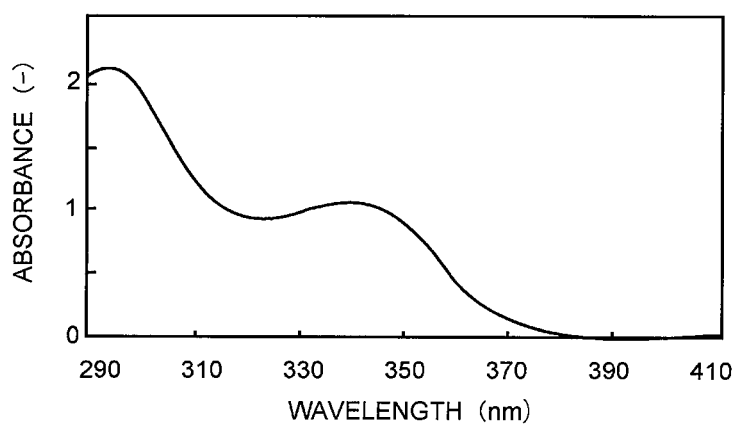
Figure 10C:
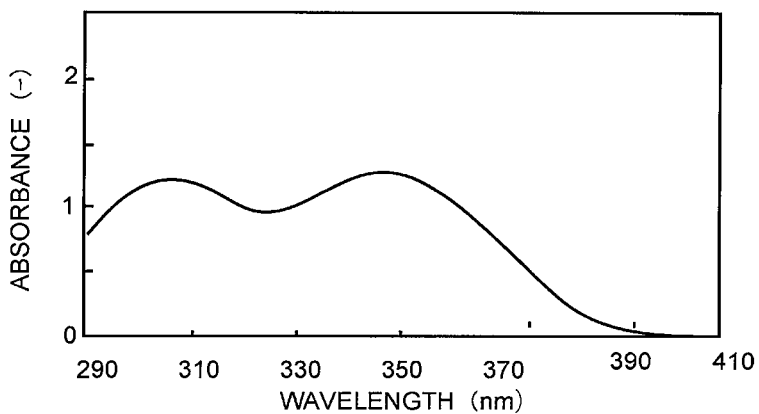

Furthermore, FIG. 10(b) is a wavelength-absorbance chart for the component (D) used in Examples 4 and 5, and FIG. 10(c) is a wavelength-absorbance chart for the component (D) used in Examples 6 and 7.

3. Application Step

Subsequently, the composition for light diffusion film thus obtained was applied on a film-like transparent polyethylene terephthalate (hereinafter, referred to as PET) as a process sheet, and a coating layer having a film thickness of 170 μm was formed.

4. Active Energy Ray Irradiation

Next, while the coating layer was moved in the B-direction as shown in FIG. 5(b), the coating layer was irradiated with parallel light having a parallelism of 2° or less (ultraviolet radiation emitted from a high pressure mercury lamp, having a primary peak wavelength at 365 nm, and other peaks at 254, 303 and 313 nm) such that the angle of irradiation (θ3 in FIG. 7) would be almost 10°, using an ultraviolet spot parallel light source (manufactured by Japan Technology System Corp.) having the central ray parallelism controlled to ±3° or less.

The peak illuminance at that time was set to 2.00 mW/cm$^2$, the cumulative amount of light was set to 53.13 mJ/cm$^2$, the lamp height was set to 240 mm, and the travel speed of the coating layer was set to 0.2 m/min.

Meanwhile, at this time, the temperature of the coating layer was maintained at 23° C.

Subsequently, in order to promote reliable curing, the exposed surface side of the coating layer was laminated with an ultraviolet-transmissive peeling film having a thickness of 38 μm (manufactured by Lintec Corp., SP-PET382050; center line average roughness at the surface on the side irradiated with ultraviolet radiation: 0.01 μm, haze value: 1.80%, image definition: 425, and transmittance for the wavelength of 360 nm: 84.3%).

Subsequently, the coating layer was completely cured by irradiating the coating layer, from above the peeling film, with a scattered light produced by making the direction of propagation of the above-mentioned parallel light random under the conditions of a peak illuminance of 10 mW/cm$^2$ and a cumulative amount of light of 150 mJ/cm$^2$, and thus a light diffusion film in which the film thickness excluding the process sheet and the peeling film was 170 μm, was obtained.

Meanwhile, the peak illuminance and the cumulative amount of light described above were measured by installing a UV METER (manufactured by Eye Graphics Co., Ltd., EYE ultraviolet cumulative illuminometer UVPF-A1) equipped with a light receiver at the position of the coating layer.

Furthermore, the film thickness of the light diffusion film thus obtained was measured using a constant pressure thickness meter (manufactured by Takara Co., Ltd., TECLOCK PG-02J).

Figure 11A:
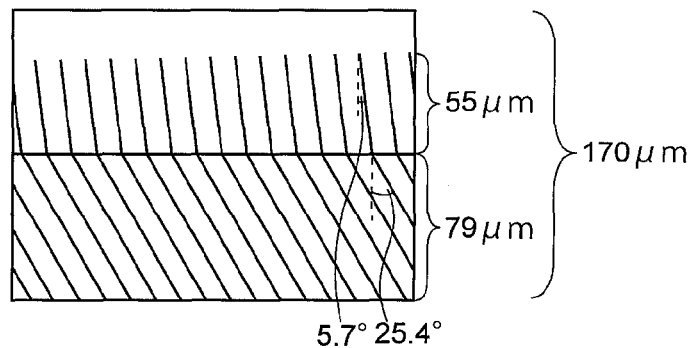
FIGS. 11(a) to 11(c) are a schematic diagram and photographs provided to show a cross-section of the light diffusion film of Example 1.
Figure 11B:
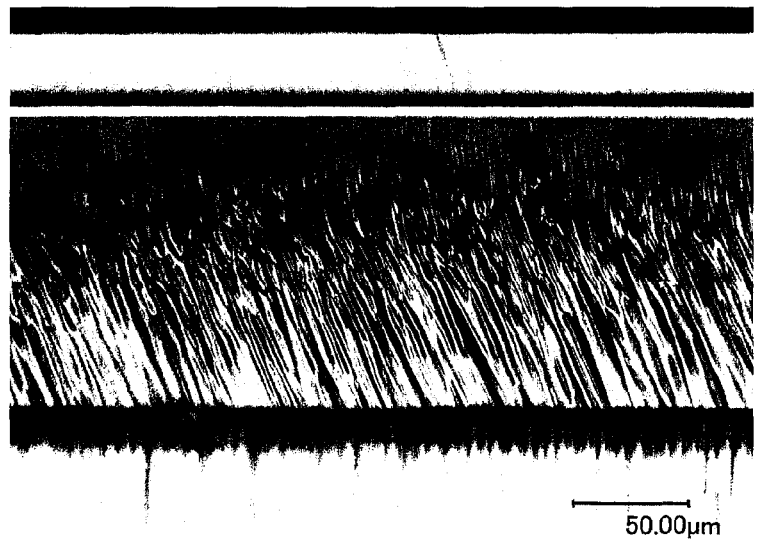

Furthermore, a schematic diagram of a cross-section obtained by cutting the light diffusion film thus obtained, at a plane that is parallel to the traveling direction of the coating layer and intersects with the film plane, is shown in FIG. 11(a), and a photograph of the cross-section is presented in FIG. 11(b).

Figure 11C:
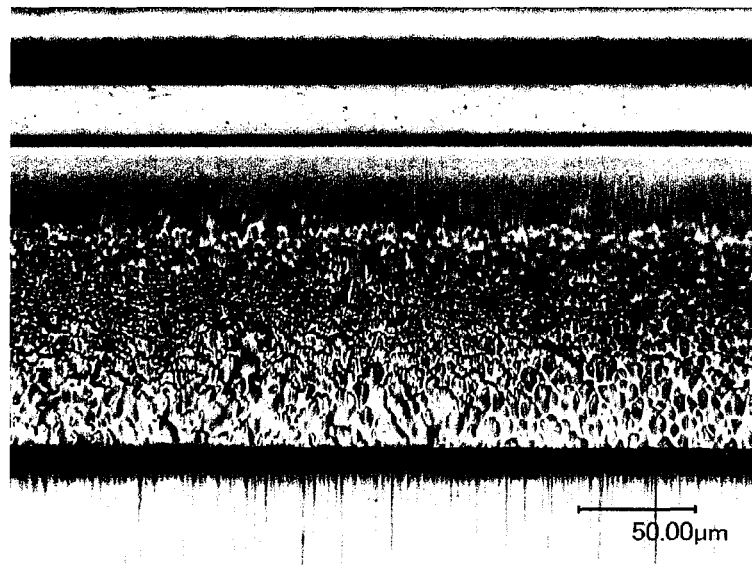

Furthermore, a cross-sectional photograph of a cross-section obtained by cutting the light diffusion film thus obtained, at a plane that is perpendicular to the traveling direction of the coating layer and intersects with the film plane, is presented in FIG. 11(c).

Figure 12A:
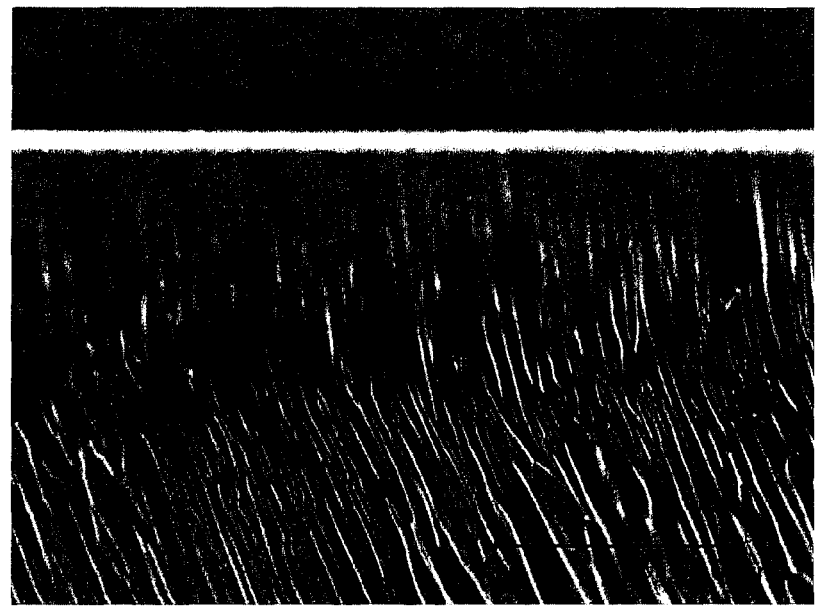
FIGS. 12(a) and 12(b) are photographs provided to show a cross-section of the light diffusion film of Example 1.
Figure 12B:
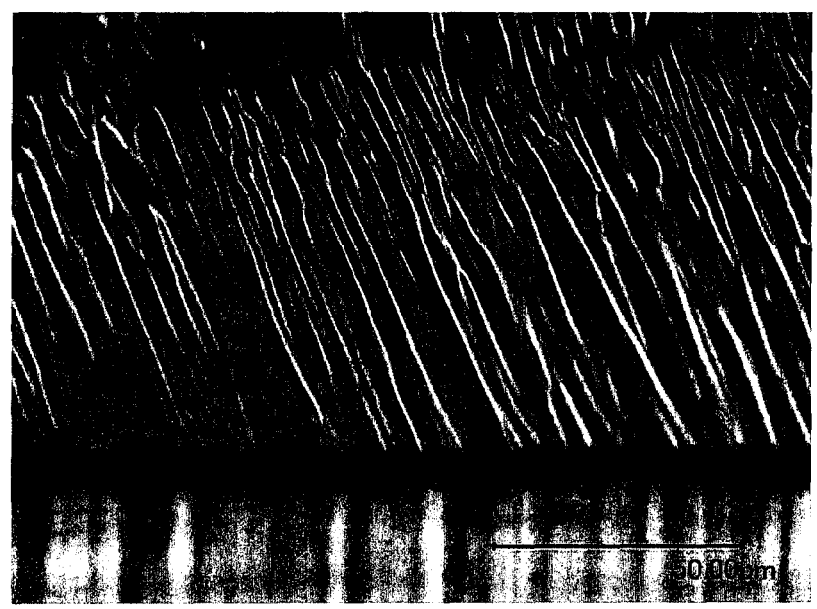

Furthermore, a photograph of a magnified view of the vicinity of the bent part in the cross-sectional photograph shown in FIG. 11(b) is presented in FIG. 12(a), and a photograph of a magnified view of the lower portion below the bent part is presented in FIG. 12(b).

Meanwhile, cutting of the light diffusion film was carried out using a razor, and image capturing of the cross-sections was carried out by reflective observation using a digital microscope (manufactured by Keyence Corp., VHX-2000).

5. Evaluation of Light Diffusion Characteristics

The light diffusion characteristics of the light diffusion films thus obtained were evaluated.

That is, an adhesive layer was provided on the PET surface of a light diffusion film obtained in a state being sandwiched between a PET and a peeling film, and the light diffusion film was pasted to a soda glass plate having a thickness of 1.1 mm. This was used as a specimen for evaluation.

Figure 13:
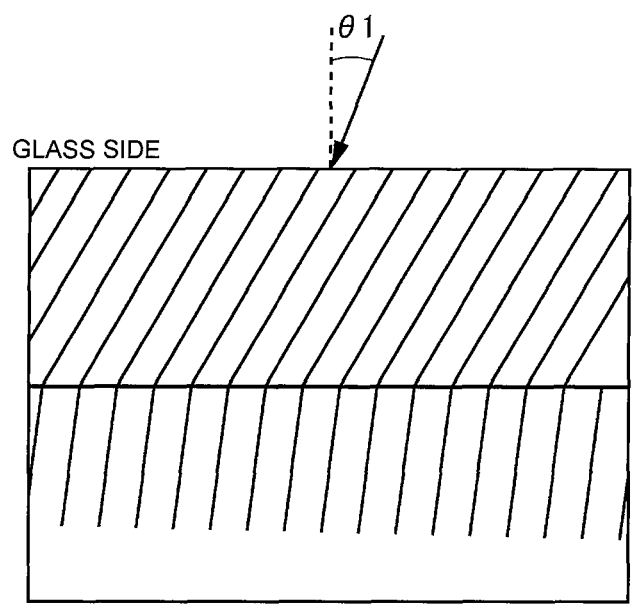
FIG. 13 is a diagram provided to explain the incident angle θ1 in the light diffusion film when light diffusion characteristics are measured.
Figure 14A:
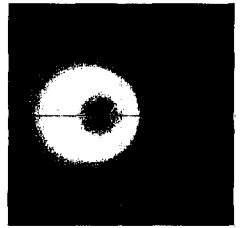
FIGS. 14(a) to 14(p) are photographs provided to compare the light diffusion characteristics of the light diffusion films of Examples 1 to 3 and Comparative Example 1.
Figure 14B:
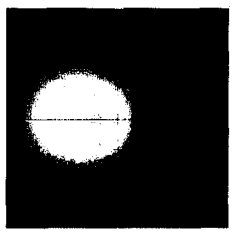
Figure 14C:
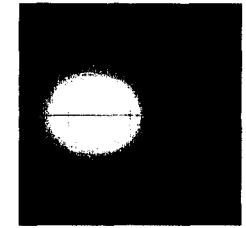
Figure 14D:
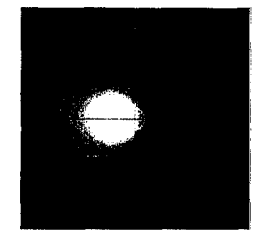
Figure 14E:
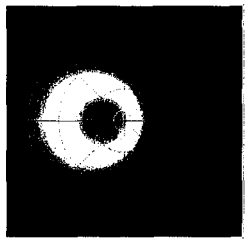
Figure 14F:
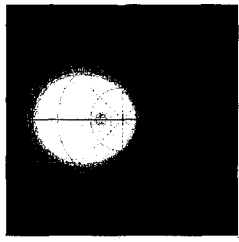
Figure 14G:
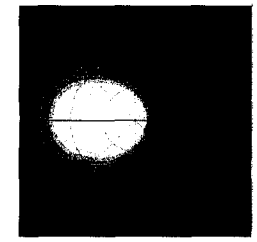
Figure 14H:
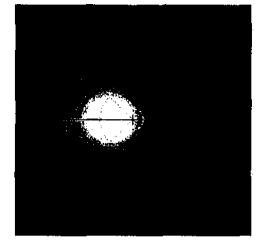
Figure 14I:
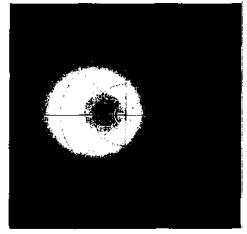
Figure 14J:
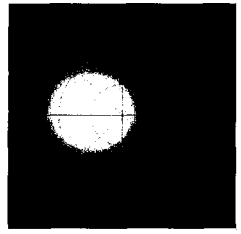
Figure 14K:
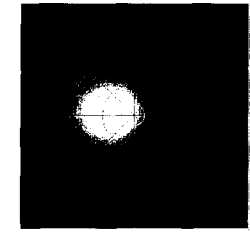
Figure 14L:
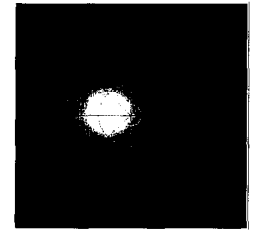
Figure 14M:
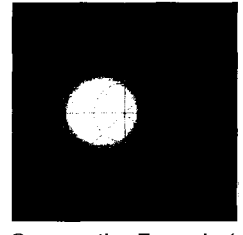
Figure 14N:
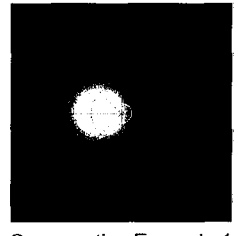
Figure 14O:
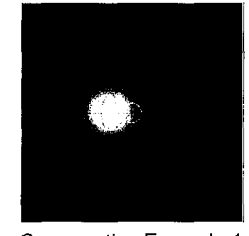
Figure 14P:
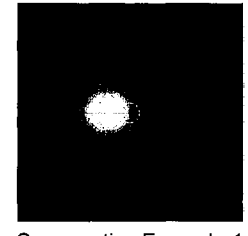
Figure 15A:
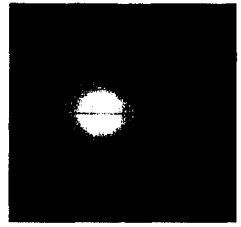
FIGS. 15(a) to 15(p) are other photographs provided to compare the light diffusion characteristics of the light diffusion films of Examples 1 to 3 and Comparative Example 1.
Figure 15B:
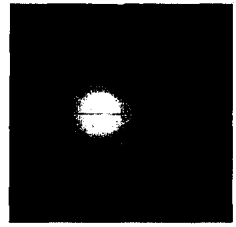
Figure 15C:
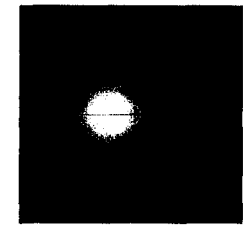
Figure 15D:
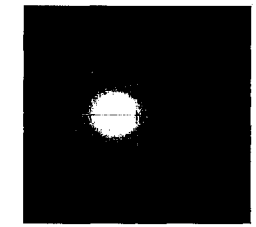
Figure 15E:
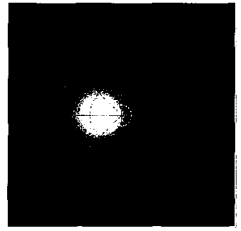
Figure 15F:
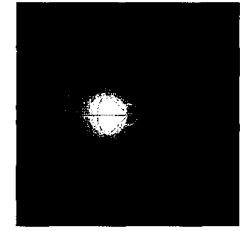
Figure 15G:
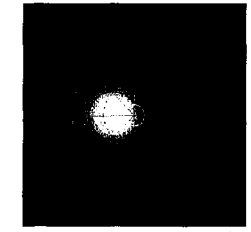
Figure 15H:
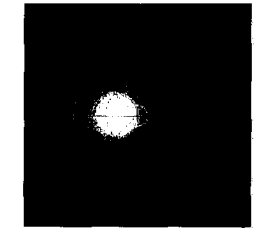
Figure 15I:
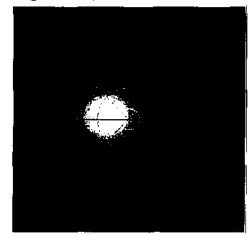
Figure 15J:
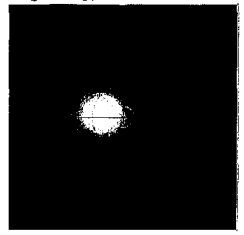
Figure 15K:
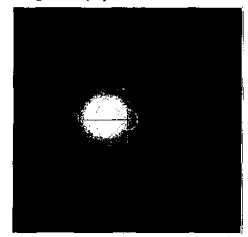
Figure 15L:
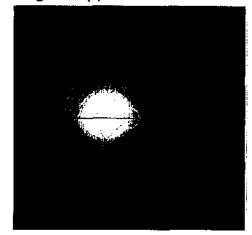
Figure 15M:
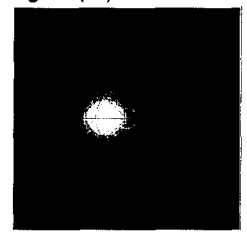
Figure 15N:
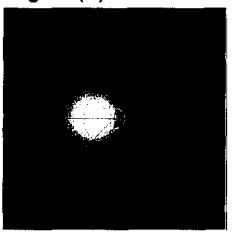
Figure 15O:
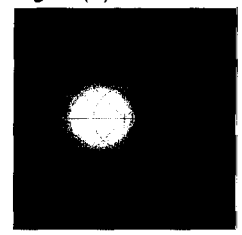
Figure 15P:
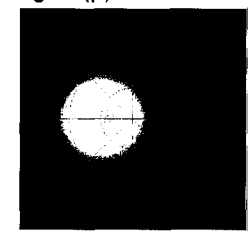
Figure 16A:
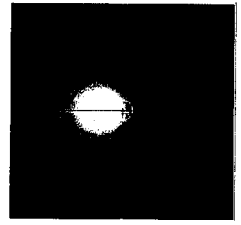
FIGS. 16(a) to 16(p) are still other photographs provided to compare the light diffusion characteristics of the light diffusion films of Examples 1 to 3 and Comparative Example 1.
Figure 16B:
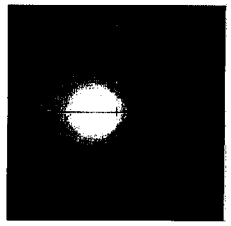
Figure 16C:
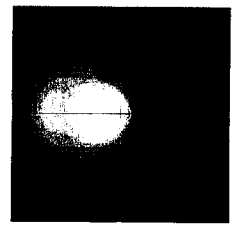
Figure 16D:
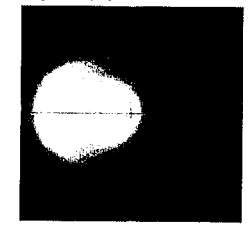
Figure 16E:
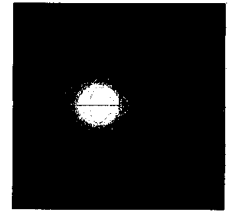
Figure 16F:
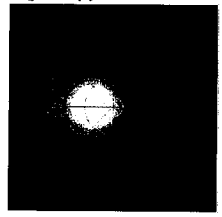
Figure 16G:
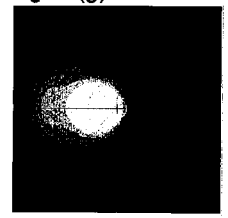
Figure 16H:
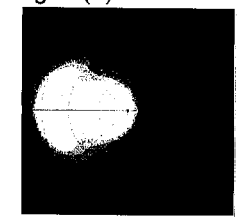
Figure 16I:
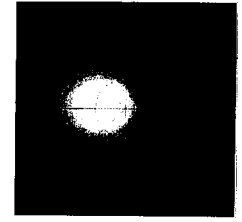
Figure 16J:
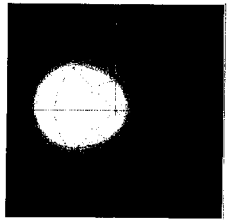
Figure 16K:
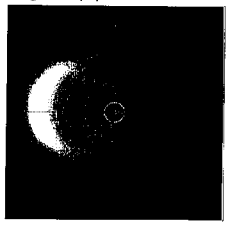
Figure 16L:
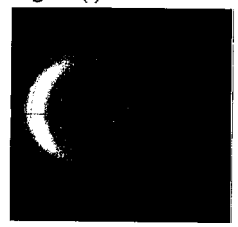
Figure 16M:
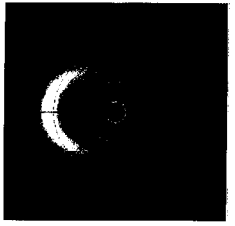
Figure 16N:
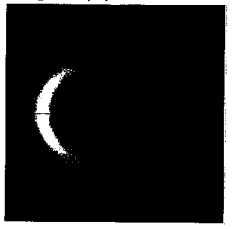
Figure 16O:
Figure 16P:
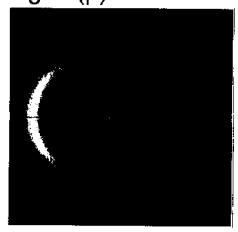

Subsequently, as illustrated in FIG. 13, light was caused to enter through the glass side of the specimen using a conoscope (manufactured by Autronic-Melchers GmbH) such that the incident angle θ1)(°) was varied to 0°, 5°, 10°, 15°, 20°, 25°, 30°, 35°, 40°, 45°, 50°, and 55° with respect to the light diffusion film. The conoscopic images thus obtained are presented in FIGS. 14(a) to 14(d), FIGS. 15(a) to 15(d), and FIGS. 16(a) to 16(d).

Furthermore, for a comparison, conoscopic images of Example 2 (amount of addition of the component (D): 0.067 parts by weight relative to 100 parts by weight of the total amount of the component (A) and the component (B)) are presented in FIGS. 14(e) to 14(h), FIGS. 15(e) to 15(h), and FIGS. 16(e) to 16(h); conoscopic images of Example 3 (amount of addition of the component (D): 0.33 parts by weight relative to 100 parts by weight of the total amount of the component (A) and the component (B)) are presented in FIGS. 14(i) to 14(l), FIGS. 15(i) to 15(l), and FIGS. 16(i) to 16(l)); and conoscopic images of Comparative Example 1 (amount of addition of the component (D): 0 parts by weight) are presented in FIGS. 14(m) to 14(p), FIGS. 15(m) to 15(p), and FIGS. 16(m) to 16(p).

Furthermore, luminance (cd/cm$^2$) corresponding to the emission angle)(°) of diffused light in the case of light entering at an incident angle θ1 of 5°, was measured using a conoscope. An emission angle-luminance chart thus obtained is presented in FIG. 17.

Figure 17:
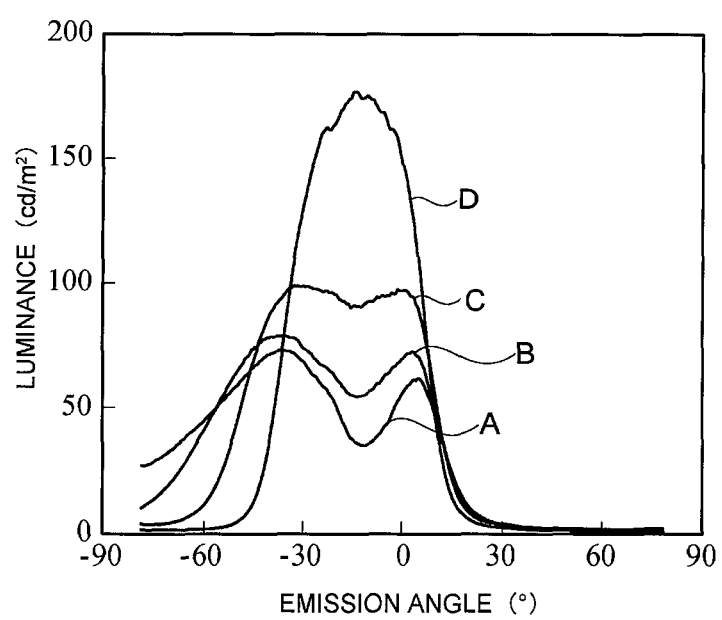
FIG. 17 is a diagram provided to compare the light diffusion characteristics of the light diffusion films of Examples 1 to 3 and Comparative Example 1.

Meanwhile, the characteristic curve A in FIG. 17 is an emission angle-luminance chart for Example 1 (amount of addition of component (D): 0.1 parts by weight relative to 100 parts by weight of the total amount of the component (A) and the component (B)); the characteristic curve B is an emission angle-luminance chart for Example 2 (amount of addition of component (D): 0.067 parts by weight relative to 100 parts by weight of the total amount of the component (A) and the component (B)); the characteristic curve C is an emission angle-luminance chart for Example 3 (amount of addition of component (D): 0.033 parts by weight relative to 100 parts by weight of the total amount of the component (A) and the component (B)); and the characteristic curve D is an emission angle-luminance chart for Comparative Example 1 (amount of addition of component (D): 0 parts by weight).

Meanwhile, the amount of addition of the ultraviolet absorber, the conditions for film production, and the kind of the internal structure formed in the film, for various Examples and Comparative Examples are presented in Table 1.

Example 2

In Example 2, a light diffusion film was produced in the same manner as in Example 1, except that when the composition for light diffusion film was prepared, the amount of addition of the ultraviolet absorber as the component (D) was changed to 0.167 parts by weight (0.067 parts by weight relative to the total amount (100 parts by weight) of the component (A) and the component (B)), and the light diffusion film was evaluated. The results thus obtained are presented in Table 1, FIGS. 18 and 19, and FIGS. 14 to 17.

Figure 18A:
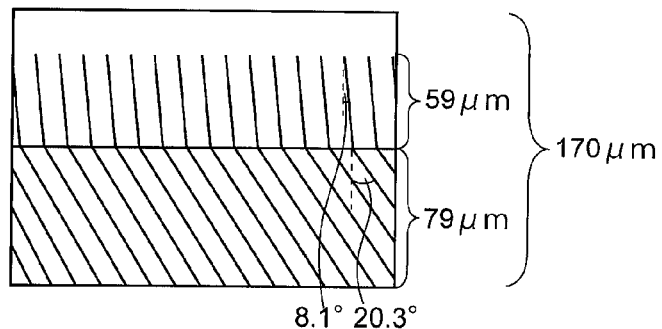
FIGS. 18(a) to 18(c) are a schematic diagram and photographs provided to show a cross-section of the light diffusion film of Example 2.
Figure 18B:
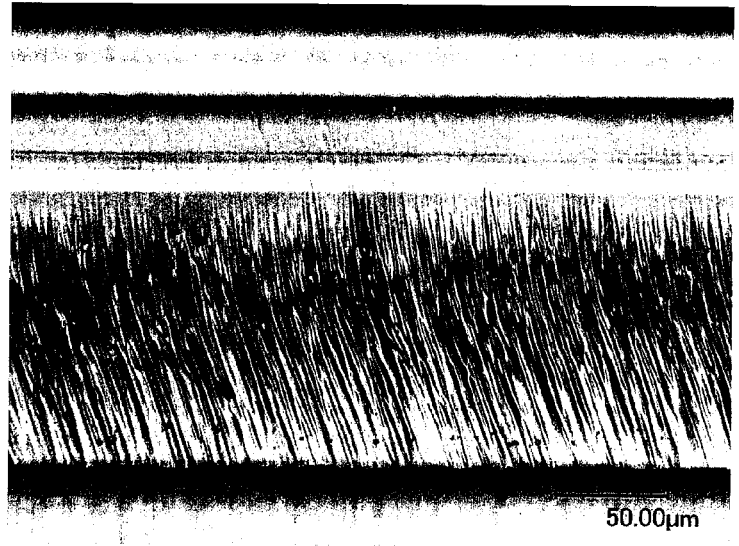

Meanwhile, FIG. 18(a) is a schematic diagram of a cross-section obtained by cutting the light diffusion film thus obtained, at a plane that is parallel to the traveling direction of the coating layer and intersects with the film plane, and FIG. 18(b) is a photograph of the cross-section.

Figure 18C:
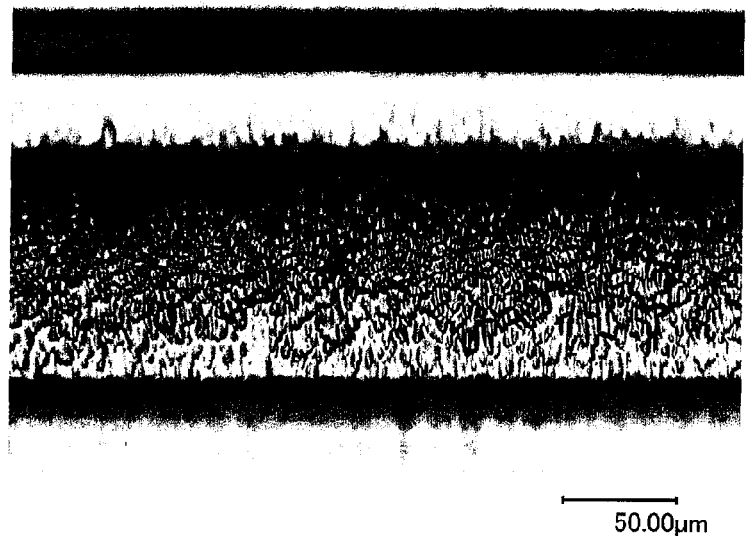

Also, FIG. 18(c) is a cross-sectional photograph of a cross-section obtained by cutting the light diffusion film thus obtained, at a plane that is perpendicular to the traveling direction of the coating layer and intersects with the film plane.

Figure 19A:
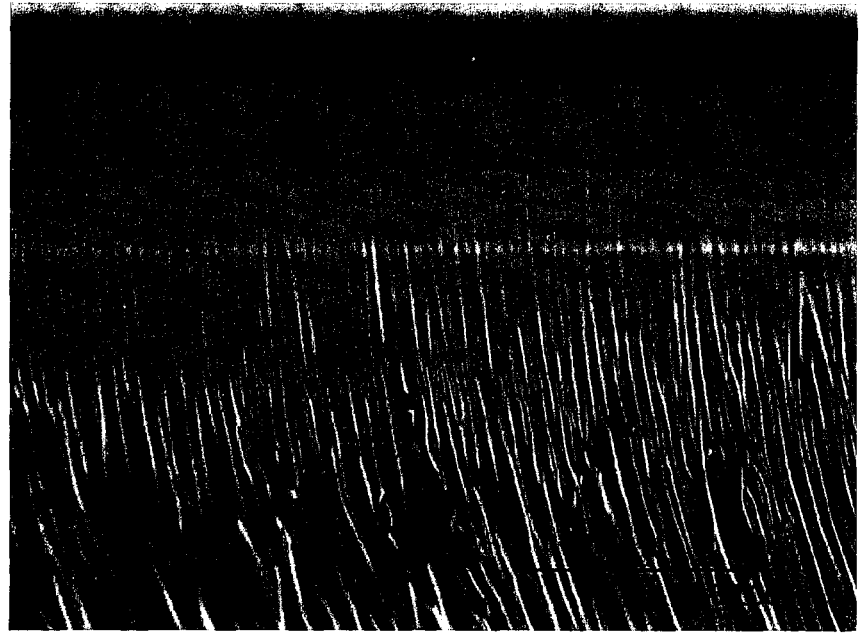
FIGS. 19(a) and 19(b) are photographs provided to show a cross-section of the light diffusion film of Example 2.
Figure 19B:
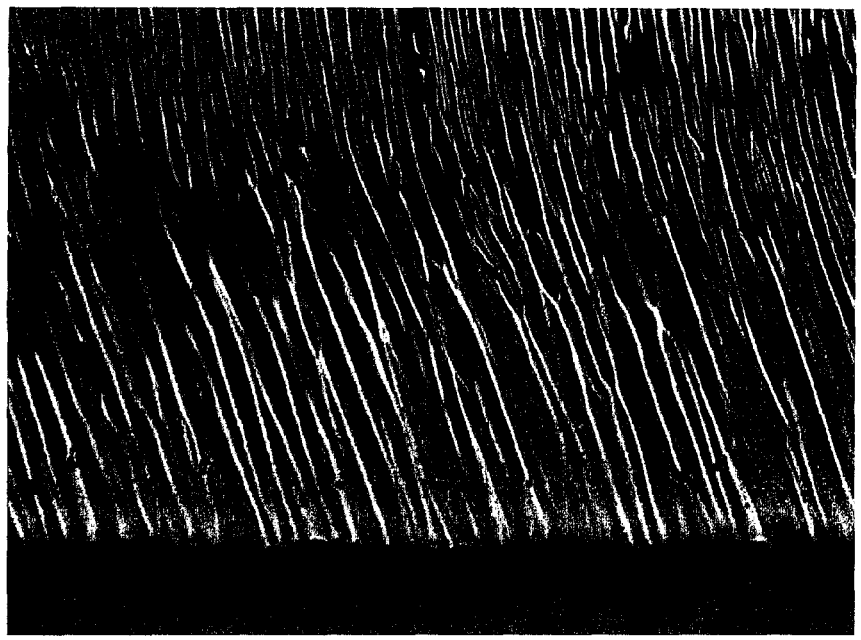

Furthermore, FIG. 19(a) is a photograph of a magnified view of the vicinity of the bent part in the cross-sectional photograph shown in FIG. 18(b), and FIG. 19(b) is a photograph of a magnified view of the lower portion below the bent part.

FIGS. 14(e) to 14(h), FIGS. 15(e) to 15(h), and FIGS. 16(e) to 16(h) are conoscopic images for Example 2, and the characteristic curve B in FIG. 17 is an emission angle-luminance chart for Example 2.

Example 3

In Example 3, a light diffusion film was produced in the same manner as in Example 1, except that when the composition for light diffusion film was prepared, the amount of addition of the ultraviolet absorber as the component (D) was changed to 0.083 parts by weight (0.033 parts by weight relative to the total amount (100 parts by weight) of the component (A) and the component (B)), and the light diffusion film was evaluated. The results thus obtained are presented in Table 1, FIGS. 20 and 21, and FIGS. 14 to 17.

Figure 20A:
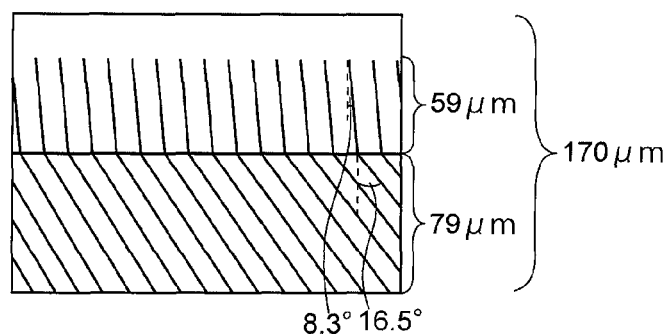
FIGS. 20(a) to 20(c) are a schematic diagram and photographs provided to show a cross-section of the light diffusion film of Example 3.
Figure 20B:
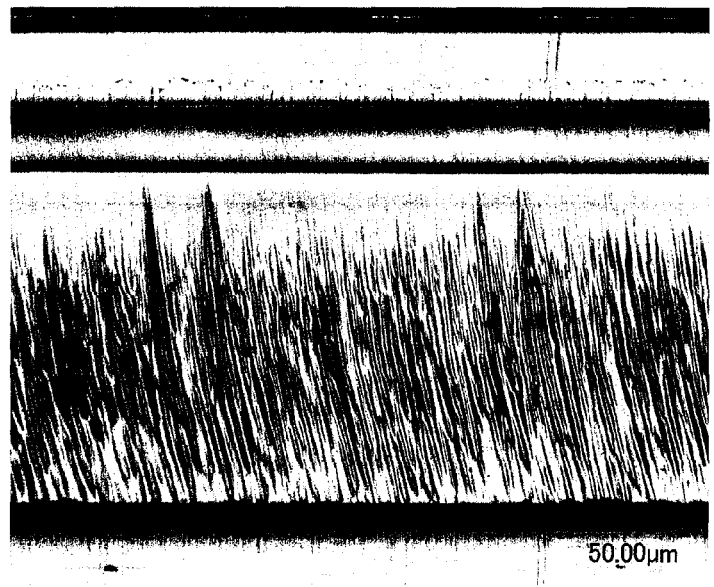

Meanwhile, FIG. 20(a) is a schematic diagram of a cross-section obtained by cutting the light diffusion film thus obtained, at a plane that is parallel to the traveling direction of the coating layer and intersects with the film plane, and FIG. 20(b) is a photograph of the cross-section.

Figure 20C:
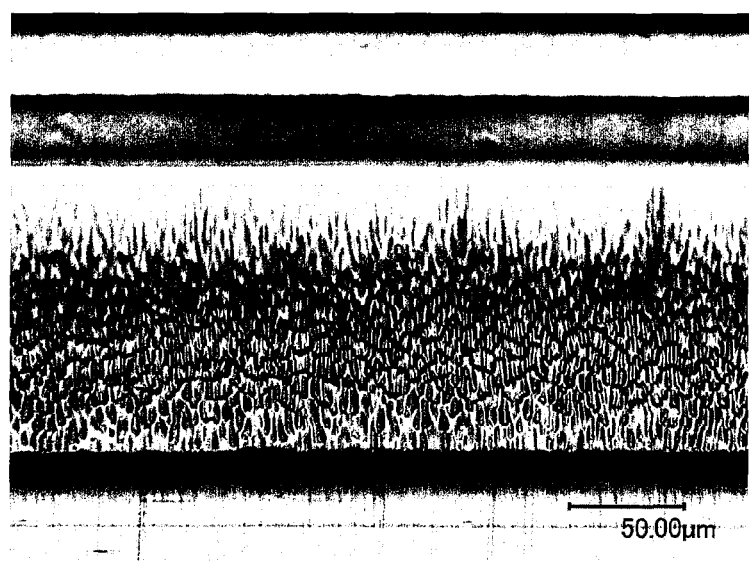

Also, FIG. 20(c) is a cross-sectional photograph of a cross-section obtained by cutting the light diffusion film thus obtained, at a plane that is perpendicular to the traveling direction of the coating layer and intersects with the film plane.

Figure 21A:
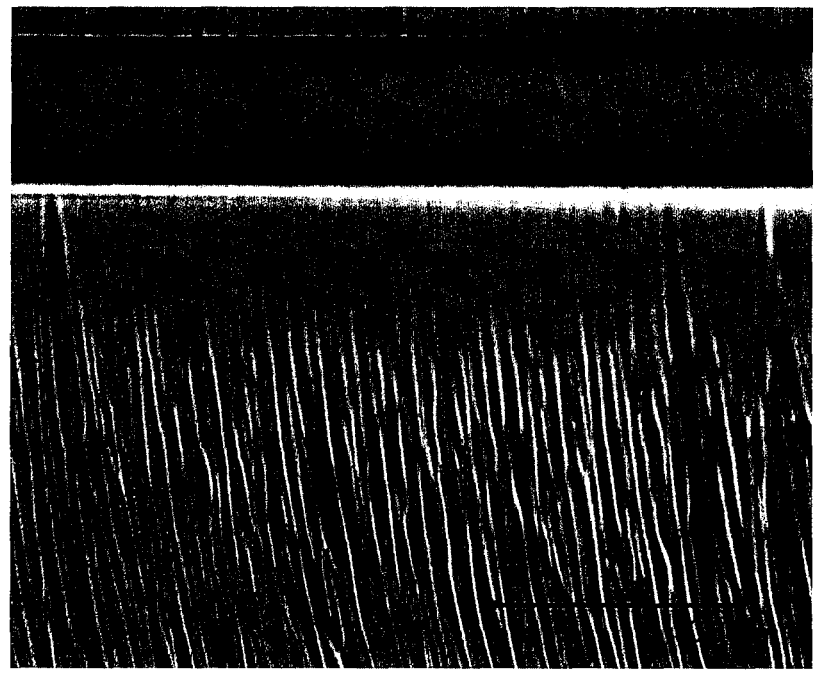
FIGS. 21(a) and 21(b) are photographs provided to show a cross-section of the light diffusion film of Example 3.
Figure 21B:
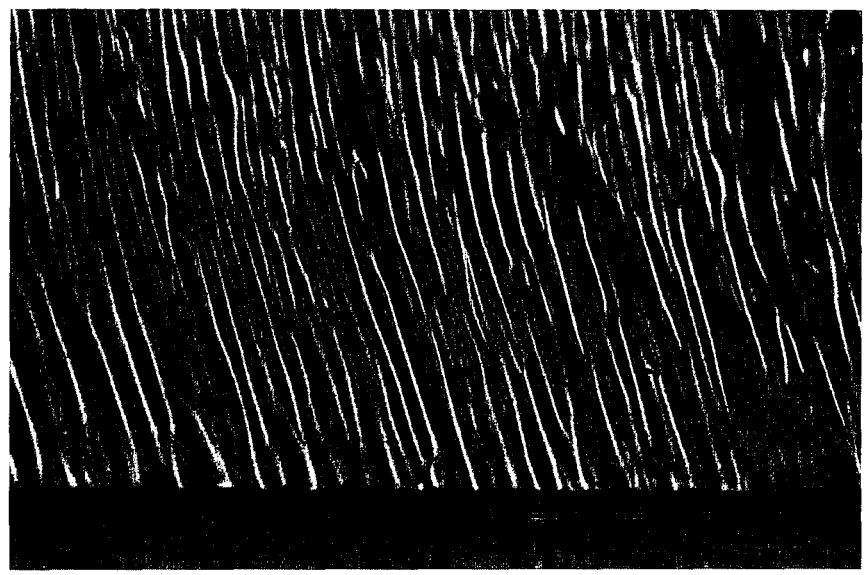

Furthermore, FIG. 21(a) is a photograph of a magnified view of the vicinity of the bent part in the cross-sectional photograph shown in FIG. 20(b), and FIG. 21(b) is a photograph of a magnified view of the lower portion below the bent part.

FIGS. 14(i) to 14(l), FIGS. 15(i) to 15(l), and FIGS. 16(i) to 16(l) are conoscopic images for Example 3, and the characteristic curve C in FIG. 17 is an emission angle-luminance chart for Example 3.

Example 4

In Example 4, a light diffusion film was produced in the same manner as in Example 1, except that when the composition for light diffusion film was prepared, the ultraviolet absorber as the component (D) was changed to TINUVIN 400 manufactured by BASF SE, which is a mixture of compounds represented by the above formulas (8) and (9), and also, the amount of addition of the ultraviolet absorber was changed to 1.5 parts by weight (0.6 parts by weight relative to the total amount (100 parts by weight) of the component (A) and the component (B)), and the light diffusion film was evaluated. The results thus obtained are presented in Table 1 and FIGS. 22 to 27.

Figure 22A:
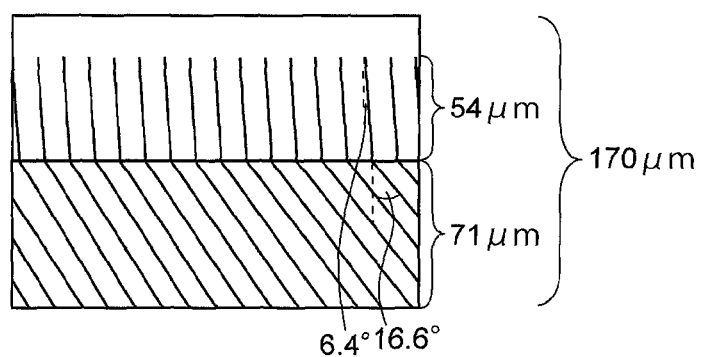
FIGS. 22(a) to 22(c) are a schematic diagram and photographs provided to show a cross-section of the light diffusion film of Example 4.
Figure 22B:
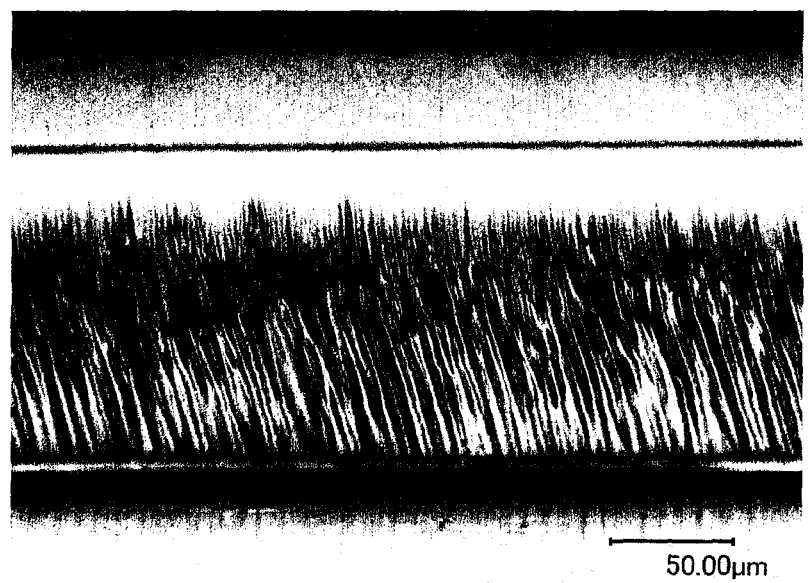

Meanwhile, FIG. 22(a) is a schematic diagram of a cross-section obtained by cutting the light diffusion film thus obtained, at a plane that is parallel to the traveling direction of the coating layer and intersects with the film plane, and FIG. 22(b) is a photograph of the cross-section.

Figure 22C:
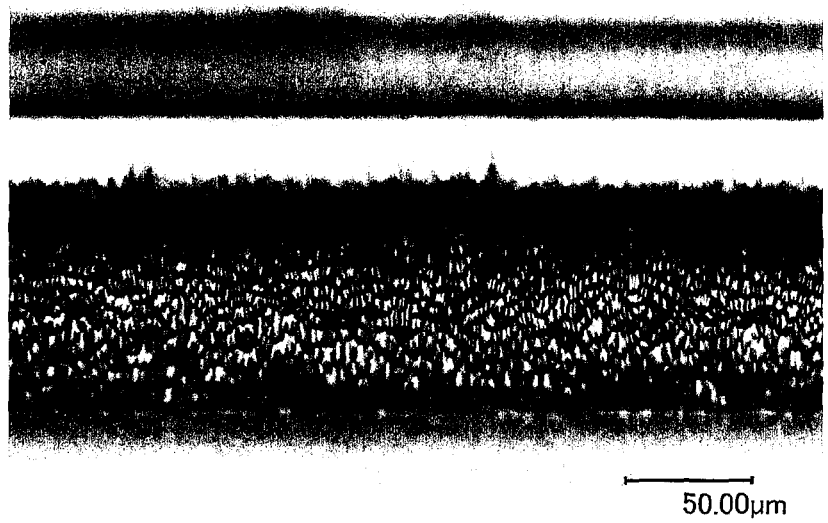

Also, FIG. 22(c) is a cross-sectional photograph of a cross-section obtained by cutting the light diffusion film thus obtained, at a plane that is perpendicular to the traveling direction of the coating layer and intersects with the film plane.

Figure 23A:
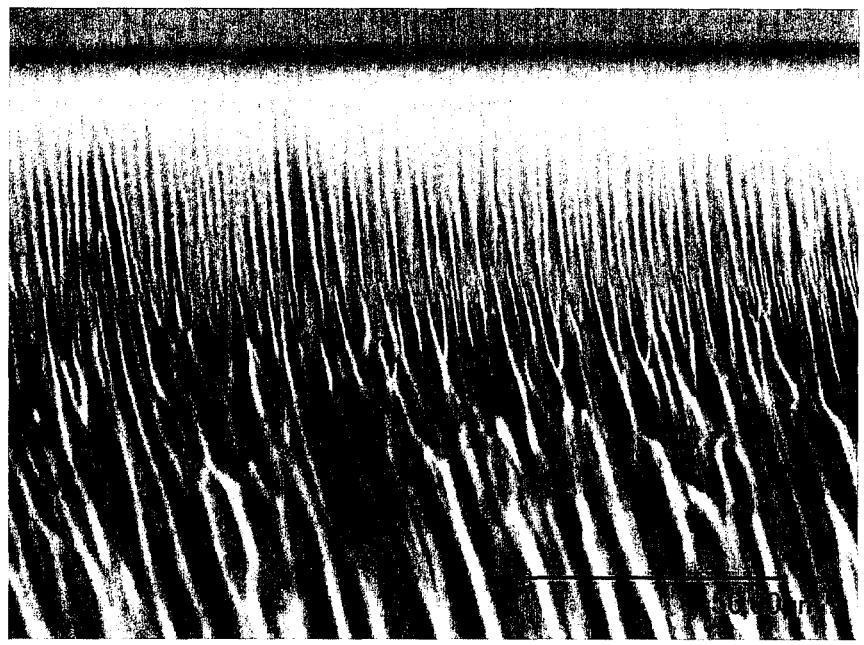
FIGS. 23(a) and 23(b) are photographs provided to show a cross-section of the light diffusion film of Example 4.
Figure 23B:
Figure 24A:
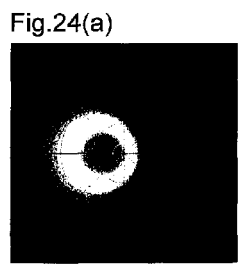
FIGS. 24(a) to 24(l) are photographs provided to compare the light diffusion characteristics of the light diffusion films of Examples 4 and 5 and Comparative Example 1.
Figure 24B:
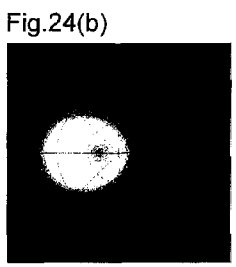
Figure 24C:
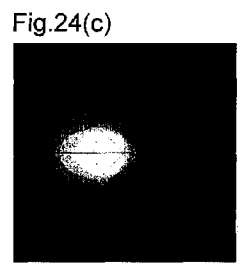
Figure 24D:
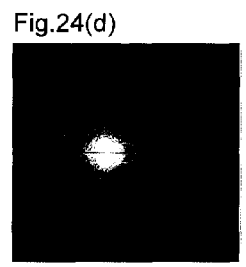
Figure 24E:
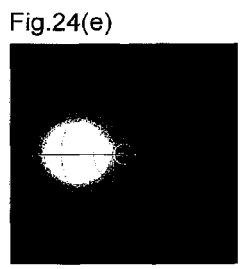
Figure 24F:
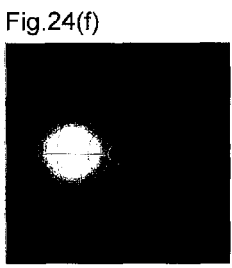
Figure 24G:
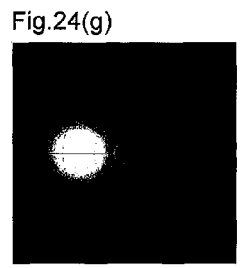
Figure 24H:
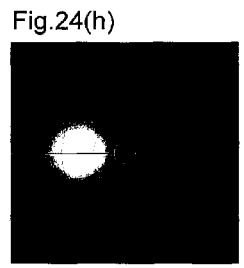
Figure 24I:
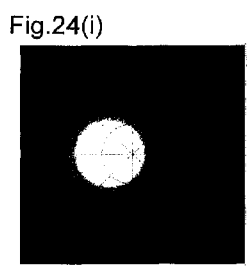
Figure 24J:
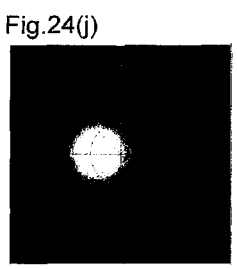
Figure 24K:
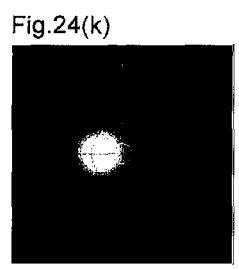
Figure 24L:
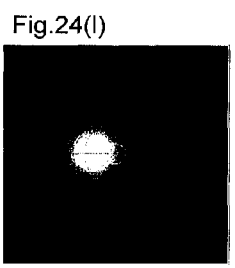
Figure 25A:
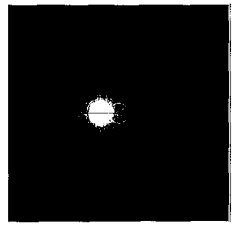
FIGS. 25(a) to 25(l) are other photographs provided to compare the light diffusion characteristics of the light diffusion films of Examples 4 and 5 and Comparative Example 1.
Figure 25B:
Figure 25C:
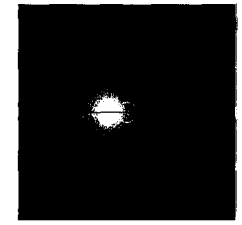
Figure 25D:
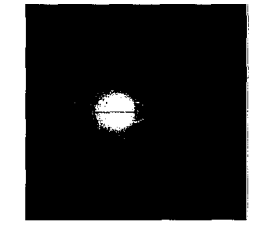
Figure 25E:
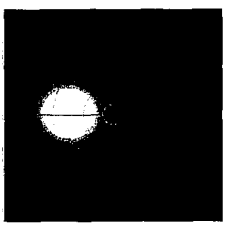
Figure 25F:
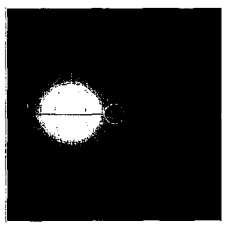
Figure 25G:
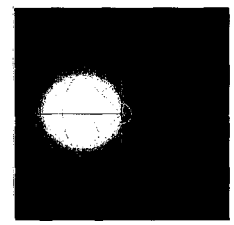
Figure 25H:
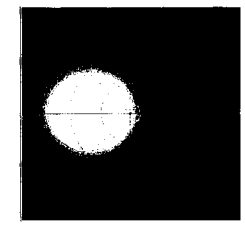
Figure 25I:
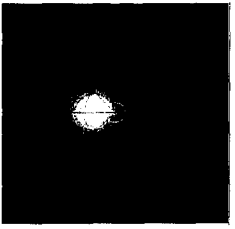
Figure 25J:
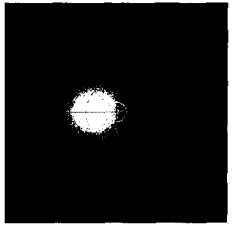
Figure 25K:
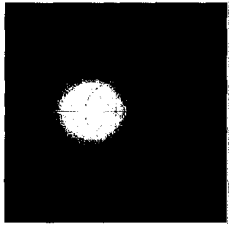
Figure 25L:
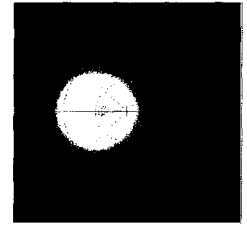
Figure 26A:
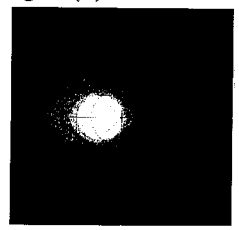
FIGS. 26(a) to 26(l) are still other photographs provided to compare the light diffusion characteristics of the light diffusion films of Examples 4 and 5 and Comparative Example 1.
Figure 26B:
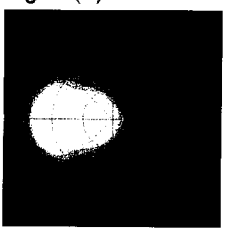
Figure 26C:
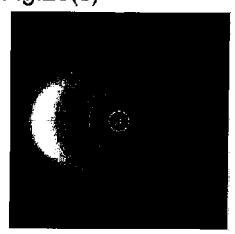
Figure 26D:
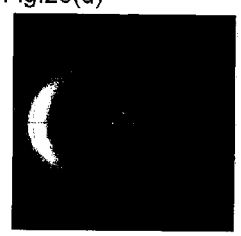
Figure 26E:
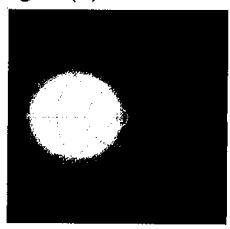
Figure 26F:
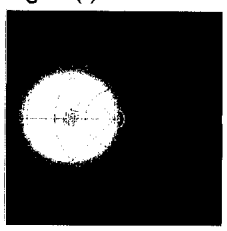
Figure 26G:
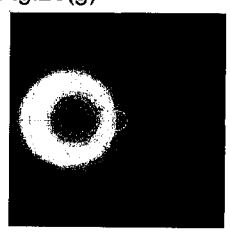
Figure 26H:
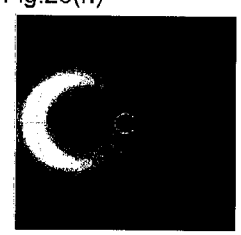
Figure 26I:
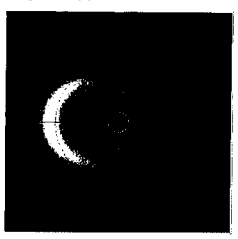
Figure 26J:
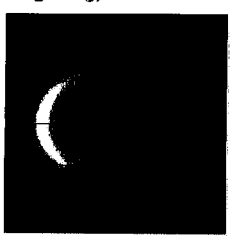
Figure 26K:
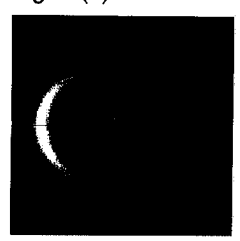
Figure 26L:
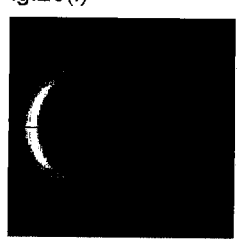

Furthermore, FIG. 23(a) is a photograph of a magnified view of the vicinity of the bent part in the cross-sectional photograph shown in FIG. 22(b), and FIG. 23(b) is a photograph of a magnified view of the lower portion below the bent part.

FIGS. 24(a) to 24(d), FIGS. 25(a) to 25(d), and FIGS. 26(a) to 26(d) are conoscopic images for Example 4.

Also, for a comparison, conoscopic images of Example 5 (amount of addition of component (D): 0.3 parts by weight relative to 100 parts by weight of the total amount of the component (A) and the component (B)) are presented in FIGS. 24(e) to 24(h), FIGS. 25(e) to 25(h), and FIGS. 26(e) to 26(h), and conoscopic images of Comparative Example 1 (amount of addition of component (D): 0 parts by weight) are presented in FIGS. 24(i) to 24(l), FIGS. 25(i) to 25(l), and FIGS. 26(i) to 26(l).

Figure 27:
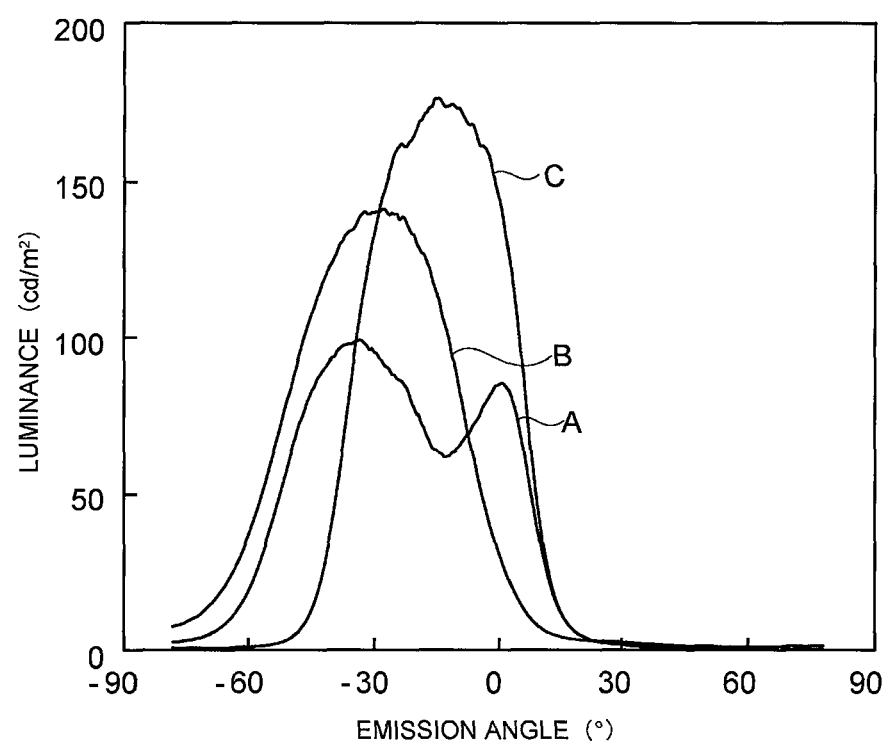
FIG. 27 is a diagram provided to compare the light diffusion characteristics of the light diffusion films of Examples 4 and 5 and Comparative Example 1.

Furthermore, the characteristic curve A in FIG. 27 is an emission angle-luminance chart for Example 4 (amount of addition of component (D): 0.6 parts by weight relative to 100 parts by weight of the total amount of the component (A) and the component (B)); the characteristic curve B is an emission angle-luminance chart for Example 5 (amount of addition of component (D): 0.3 parts by weight relative to 100 parts by weight of the total amount of the component (A) and the component (B)); and the characteristic curve C is an emission angle-luminance chart for Comparative Example 1 (amount of addition of component (D): 0 parts by weight).

Example 5

In Example 5, a light diffusion film was produced in the same manner as in Example 1, except that when the composition for light diffusion film was prepared, the ultraviolet absorber as the component (D) was changed to TINUVIN 400 manufactured by BASF SE, which is a mixture of compounds represented by the above formulas (8) and (9), and also, the amount of addition of the ultraviolet absorber was changed to 0.75 parts by weight (0.3 parts by weight relative to the total amount (100 parts by weight) of the component (A) and the component (B)), and the light diffusion film was evaluated. The results thus obtained are presented in Table 1, FIGS. 28 and 29, and FIGS. 24 to 27.

Figure 28A:
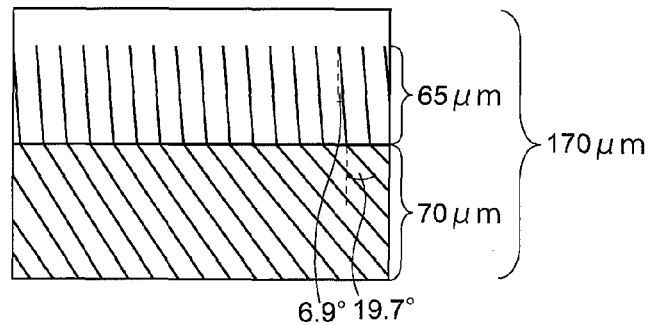
FIGS. 28(a) to 28(c) are a schematic diagram and photographs provided to show a cross-section of the light diffusion film of Example 5.
Figure 28B:
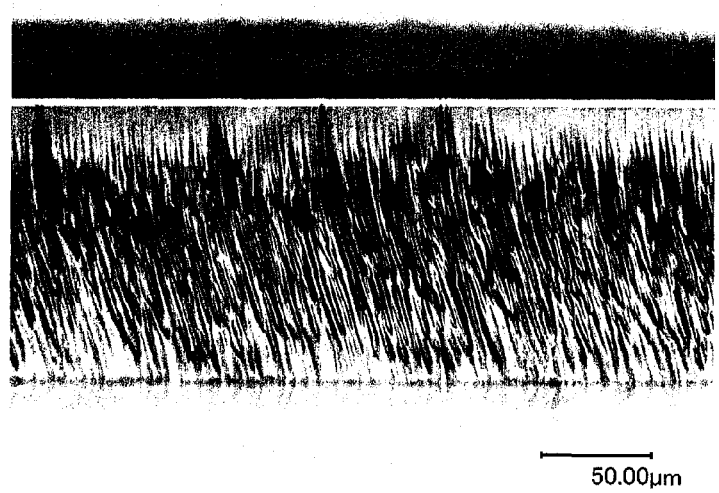

Meanwhile, FIG. 28(a) is a schematic diagram of a cross-section obtained by cutting the light diffusion film thus obtained, at a plane that is parallel to the traveling direction of the coating layer and intersects with the film plane, and FIG. 28(b) is a photograph of the cross-section.

Figure 28C:
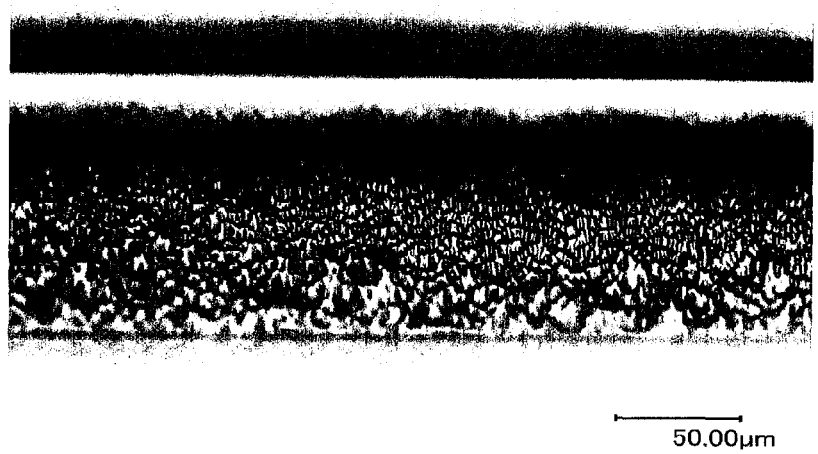

Also, FIG. 28(c) is a cross-sectional photograph of a cross-section obtained by cutting the light diffusion film thus obtained, at a plane that is perpendicular to the traveling direction of the coating layer and intersects with the film plane.

Figure 29A:
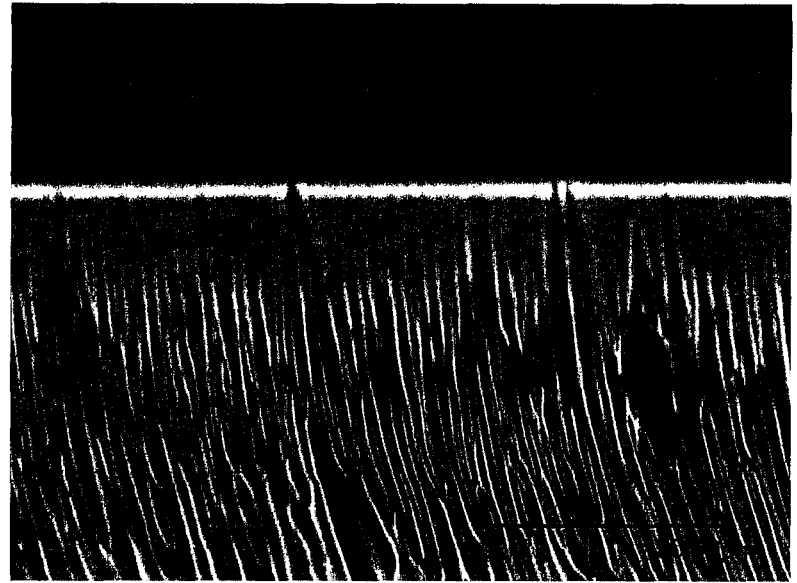
FIGS. 29(a) and 29(b) are photographs provided to show a cross-section of the light diffusion film of Example 5.
Figure 29B:
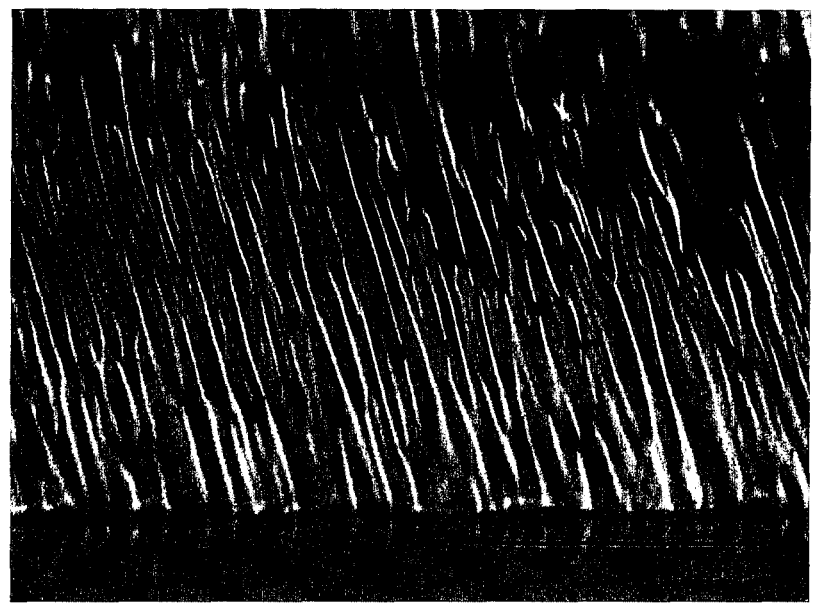

Furthermore, FIG. 29(a) is a photograph of a magnified view of the vicinity of the bent part in the cross-sectional photograph shown in FIG. 28(b), and FIG. 29(b) is a photograph of a magnified view of the lower portion below the bent part.

FIGS. 24(e) to 24(h), FIGS. 25(e) to 25(h), and FIGS. 26(e) to 26(h) are conoscopic images for Example 5, and the characteristic curve B in FIG. 27 is an emission angle-luminance chart for Example 5.

Example 6

In Example 6, a light diffusion film was produced in the same manner as in Example 1, except that when the composition for light diffusion film was prepared, the ultraviolet absorber as the component (D) was changed to TINUVIN 384-2 manufactured by BASF SE, which is represented by the above Formula (10), and also, the amount of addition of the ultraviolet absorber was changed to 0.5 parts by weight (0.2 parts by weight relative to the total amount (100 parts by weight) of the component (A) and the component (B)), and the light diffusion film was evaluated. The results thus obtained are presented in Table 1 and FIGS. 30 to 35.

Figure 30A:
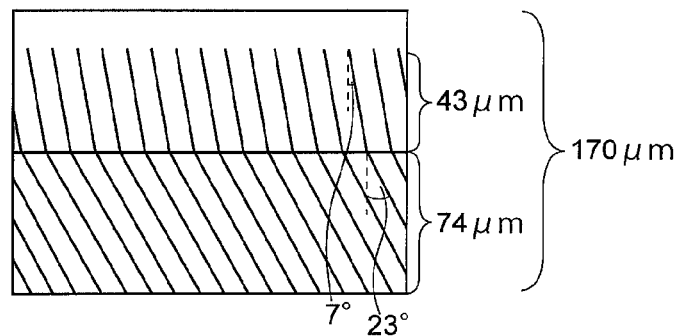
FIGS. 30(a) to 30(c) are a schematic diagram and photographs provided to show a cross-section of the light diffusion film of Example 6.
Figure 30B:
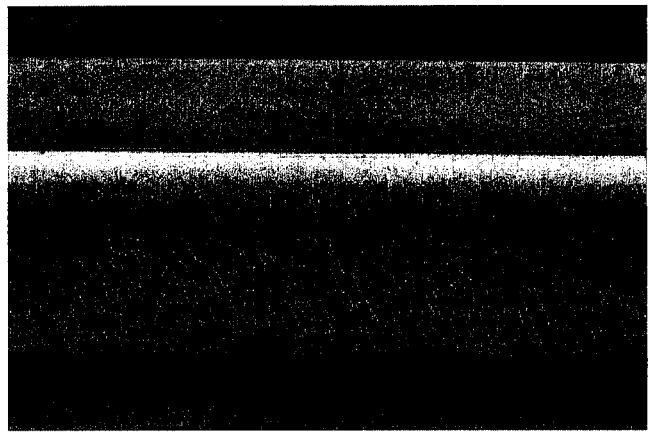

Meanwhile, FIG. 30(a) is a schematic diagram of a cross-section obtained by cutting the light diffusion film thus obtained, at a plane that is parallel to the traveling direction of the coating layer and intersects with the film plane, and FIG. 30(b) is a photograph of the cross-section.

Figure 30C:
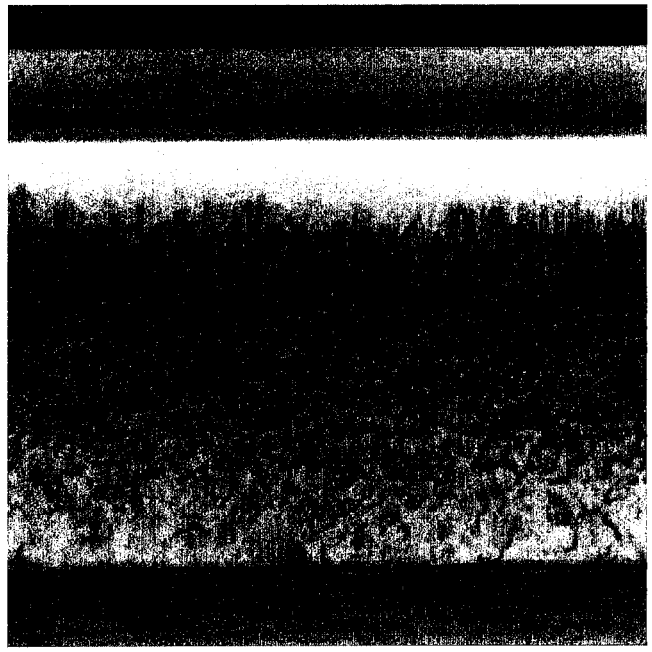

Also, FIG. 30(c) is a cross-sectional photograph of a cross-section obtained by cutting the light diffusion film thus obtained, at a plane that is perpendicular to the traveling direction of the coating layer and intersects with the film plane.

Figure 31A:
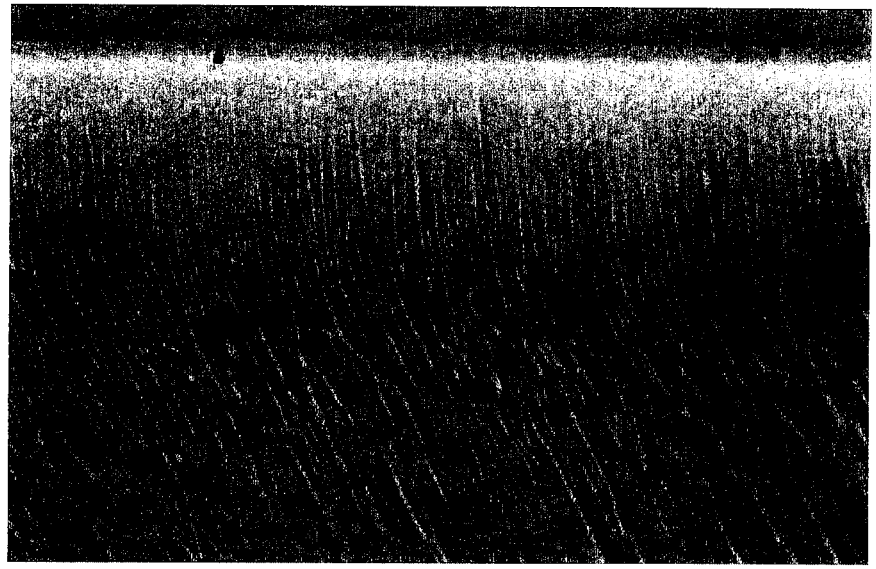
FIGS. 31(a) and 31(b) are photographs provided to show a cross-section of the light diffusion film of Example 6.
Figure 31B:
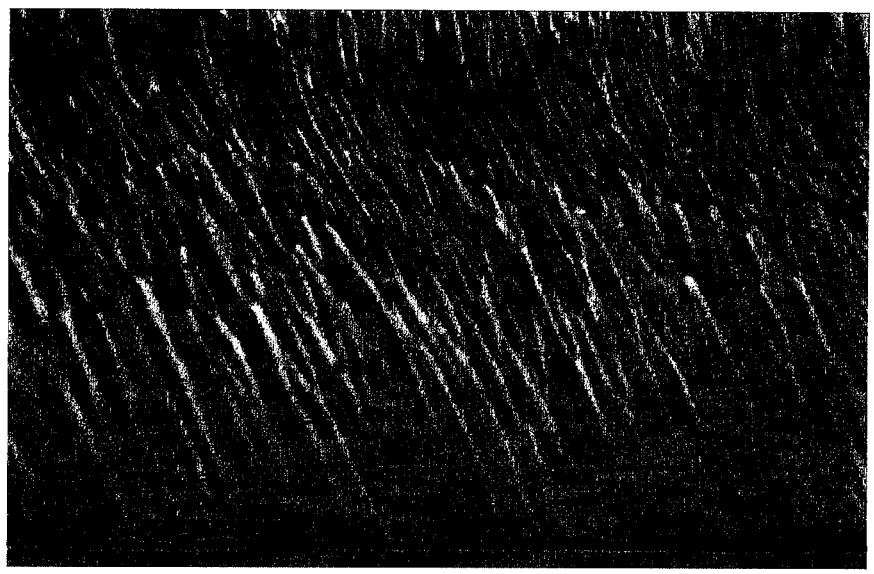
Figure 32A:
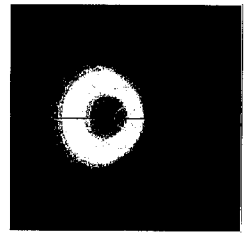
FIGS. 32(a) to 32(l) are photographs provided to compare the light diffusion characteristics of the light diffusion films of Examples 6 and 7 and Comparative Example 1.
Figure 32B:
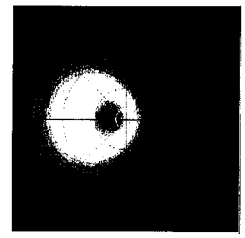
Figure 32C:
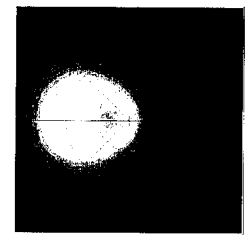
Figure 32D:
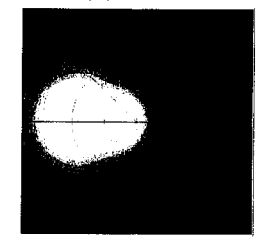
Figure 32E:
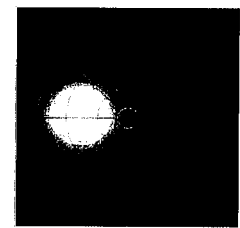
Figure 32F:
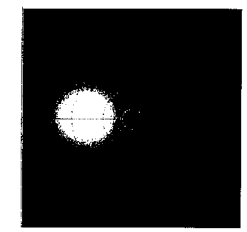
Figure 32G:
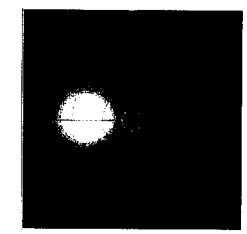
Figure 32H:
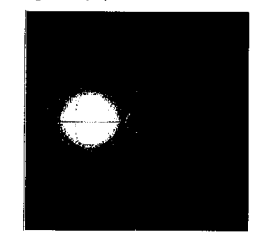
Figure 32I:
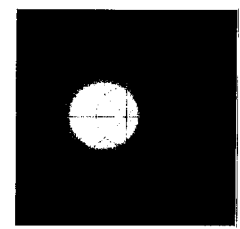
Figure 32J:
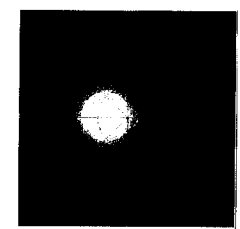
Figure 32K:
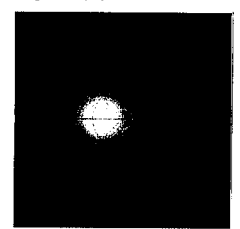
Figure 32L:
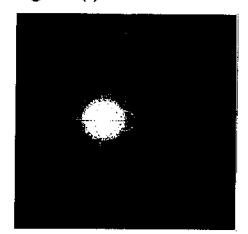
Figure 33A:
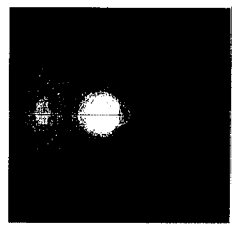
FIGS. 33(a) to 33(l) are other photographs provided to compare the light diffusion characteristics of the light diffusion films of Examples 6 and 7 and Comparative Example 1.
Figure 33B:
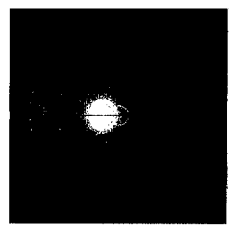
Figure 33C:
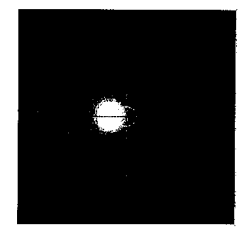
Figure 33D:
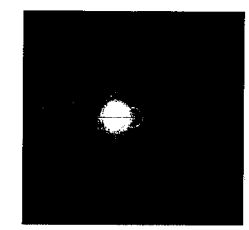
Figure 33E:
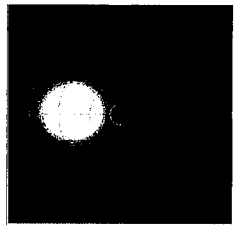
Figure 33F:
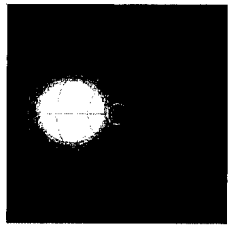
Figure 33G:
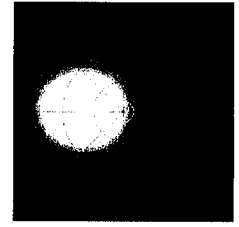
Figure 33H:
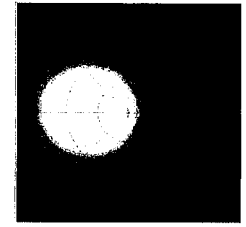
Figure 33I:
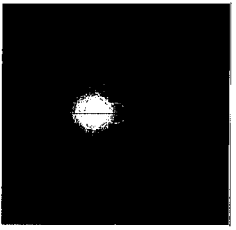
Figure 33J:
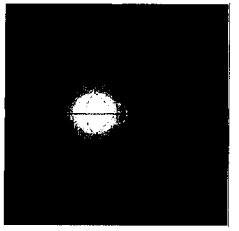
Figure 33K:
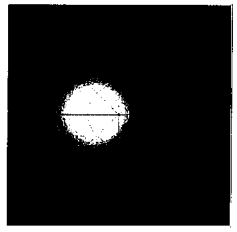
Figure 33L:
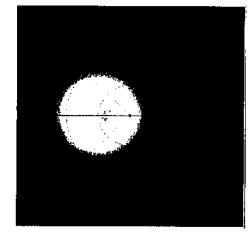
Figure 34A:
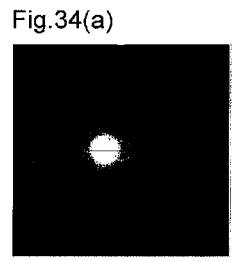
FIGS. 34(a) to 34(l) are still other photographs provided to compare the light diffusion characteristics of the light diffusion films of Examples 6 and 7 and Comparative Example 1.
Figure 34B:
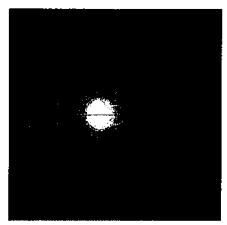
Figure 34C:
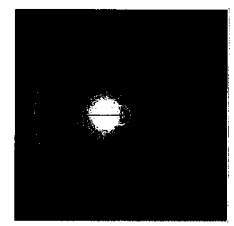
Figure 34D:
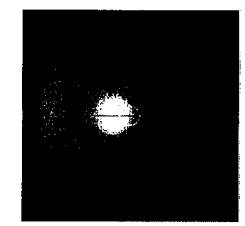
Figure 34E:
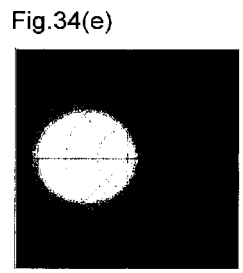
Figure 34F:
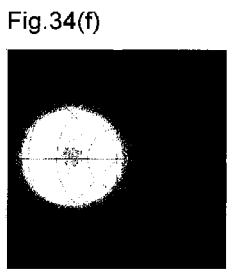
Figure 34G:
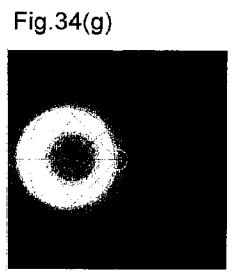
Figure 34H:
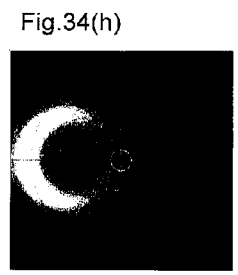
Figure 34I:
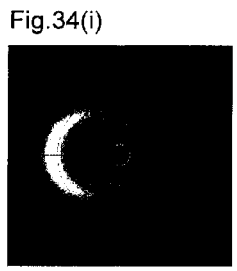
Figure 34J:
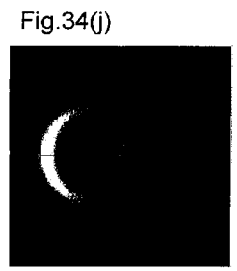
Figure 34K:
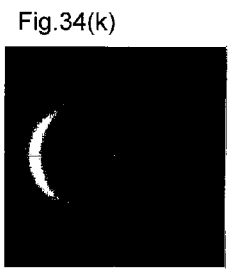
Figure 34L:
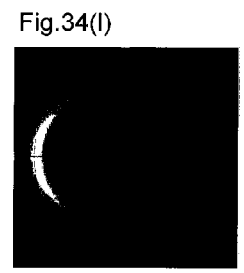

Furthermore, FIG. 31(a) is a photograph of a magnified view of the vicinity of the bent part in the cross-sectional photograph shown in FIG. 30(b), and FIG. 31(b) is a photograph of a magnified view of the lower portion below the bent part.

FIGS. 32(a) to 32(d), FIGS. 33(a) to 33(d), and FIGS. 34(a) to 34(d) are conoscopic images for Example 6.

Also, for a comparison, conoscopic images of Example 7 (amount of addition of component (D): 0.1 parts by weight relative to 100 parts by weight of the total amount of the component (A) and the component (B)) are presented in FIGS. 32(e) to 32(h), FIGS. 33(e) to 33(h), and FIGS. 34(e) to 34(h); and conoscopic images of Comparative Example 1 (amount of addition of component (D): 0 parts by weight) are presented in FIGS. 32(i) to 32(l), FIGS. 33(i) to 33(l), and FIGS. 34(i) to 34(l).

Figure 35:
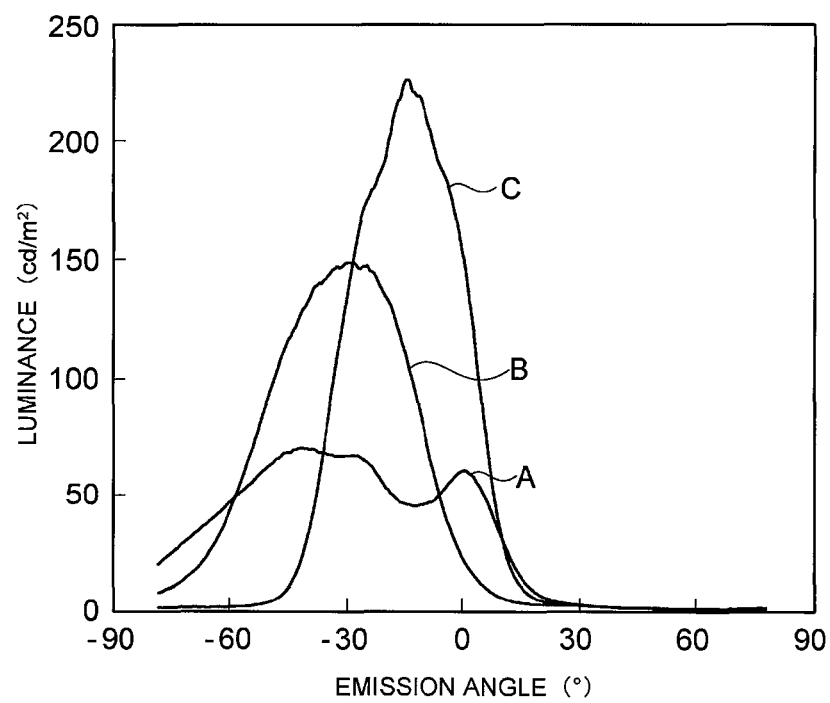
FIG. 35 is a diagram provided to compare the light diffusion characteristics of Examples 6 and 7 and Comparative Example 1.

Furthermore, the characteristic curve A in FIG. 35 is an emission angle-luminance chart for Example 6 (amount of addition of component (D): 0.2 parts by weight relative to 100 parts by weight of the total amount of the component (A) and the component (B)); the characteristic curve B is an emission angle-luminance chart for Example 7 (amount of addition of component (D): 0.1 parts by weight relative to 100 parts by weight of the total amount of the component (A) and the component (B)); and the characteristic curve C is an emission angle-luminance chart for Comparative Example 1 (amount of addition of component (D): 0 parts by weight).

Meanwhile, the emission angle-luminance chart presented in FIG. 35 was measured by changing the incident angle $\theta_1$ to 10°.

Example 7

In Example 7, a light diffusion film was produced in the same manner as in Example 1, except that when the composition for light diffusion film was prepared, the ultraviolet absorber as the component (D) was changed to TINUVIN 384-2 manufactured by BASF SE, which is represented by the above Formula (10), and also, the amount of addition of the ultraviolet absorber was changed to 0.25 parts by weight (0.1% by weight relative to the total amount (100% by weight) of the component (A) and the component (B)), and the light diffusion film was evaluated. The results thus obtained are presented in Table 1, FIGS. 36 and 37, and FIGS. 32 to 35.

Figure 36A:
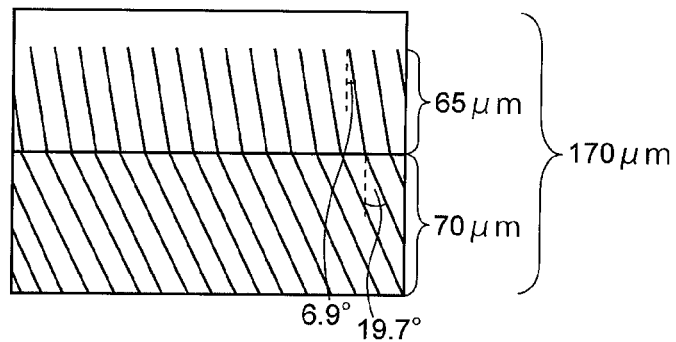
FIGS. 36(a) to 36(c) are a schematic diagram and photographs provided to show a cross-section of the light diffusion film of Example 7.
Figure 36B:
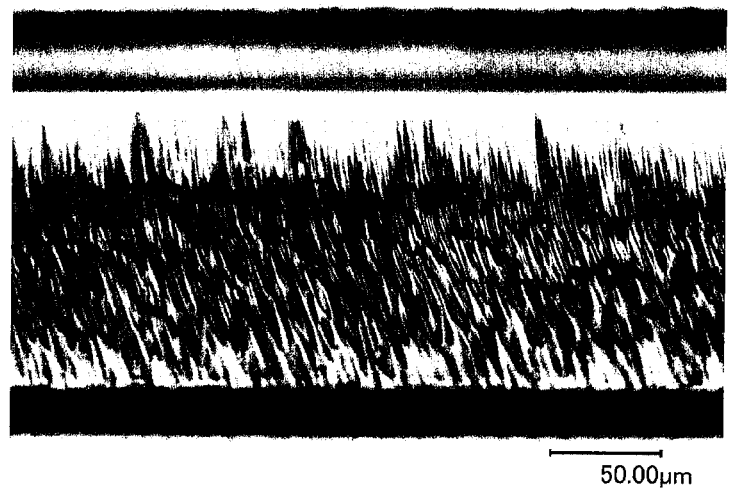

Meanwhile, FIG. 36(a) is a schematic diagram of a cross-section obtained by cutting the light diffusion film thus obtained, at a plane that is parallel to the traveling direction of the coating layer and intersects with the film plane, and FIG. 36(b) is a photograph of the cross-section.

Figure 36C:
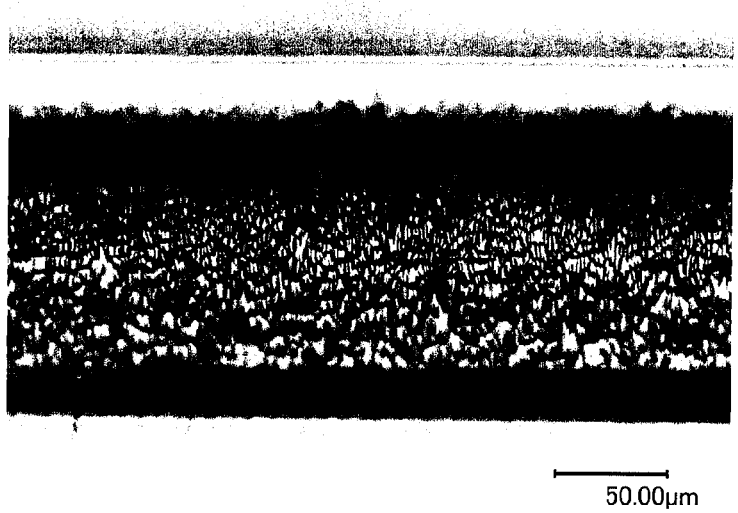

Also, FIG. 36(c) is a cross-sectional photograph of a cross-section obtained by cutting the light diffusion film thus obtained, at a plane that is perpendicular to the traveling direction of the coating layer and intersects with the film plane.

Figure 37A:
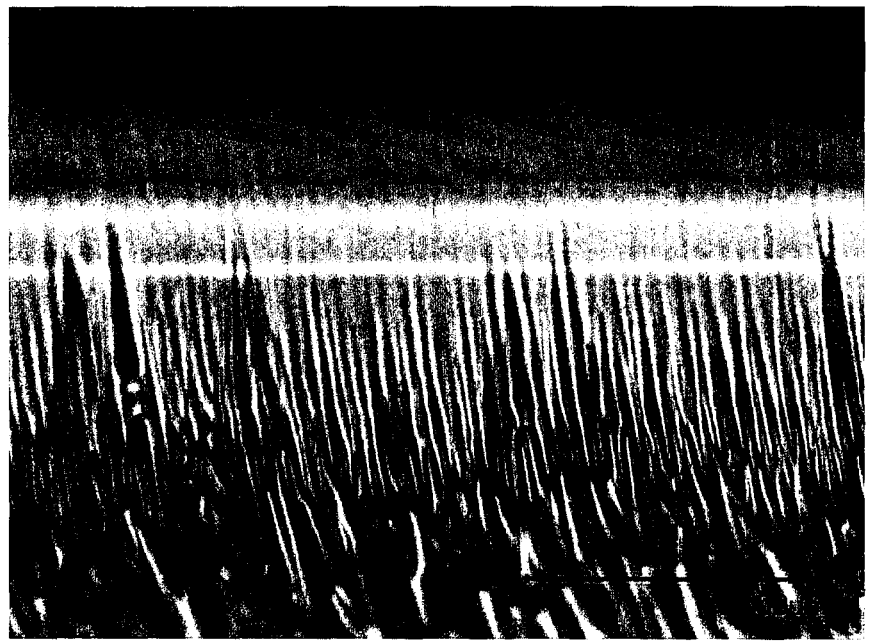
FIGS. 37(a) and 37(b) are photographs provided to show a cross-section of the light diffusion film of Example 7.
Figure 37B:
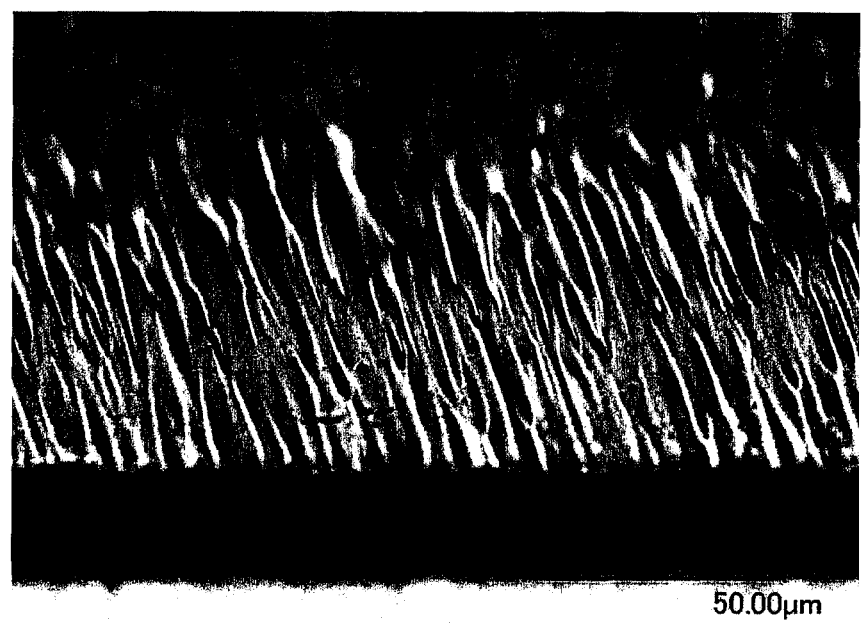

Furthermore, FIG. 37(a) is a photograph of a magnified view of the vicinity of the bent part in the cross-sectional photograph shown in FIG. 36(b), and FIG. 37(b) is a photograph of a magnified view of the lower portion below the bent part.

FIGS. 32(e) to 32(h), FIGS. 33(e) to 33(h), and FIGS. 34(e) to 34(h) are conoscopic images for Example 7, and the characteristic curve B in FIG. 35 is an emission angle-luminance chart for Example 7.

Example 8

In Example 8, a light diffusion film was produced in the same manner as in Example 1, except that the coating layer was left to stand for 15 minutes in an environment at 5° C. before the coating layer was irradiated with active energy radiation, and thereafter, the coating layer in a state of being cooled to 5° C. was immediately irradiated with active energy radiation, and the light diffusion film was evaluated. The results thus obtained are presented in Table 1 and FIGS. 38 to 41.

Figure 38A:
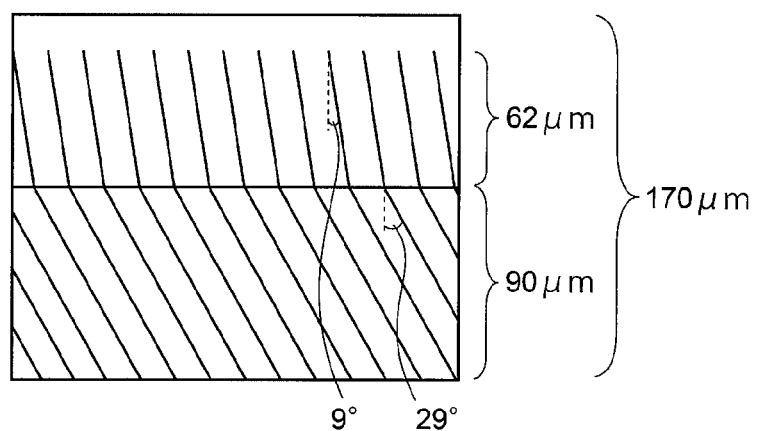
FIGS. 38(a) and 38(b) are a schematic diagram and a photograph provided to show a cross-section of the light diffusion film of Example 8.
Figure 38B:
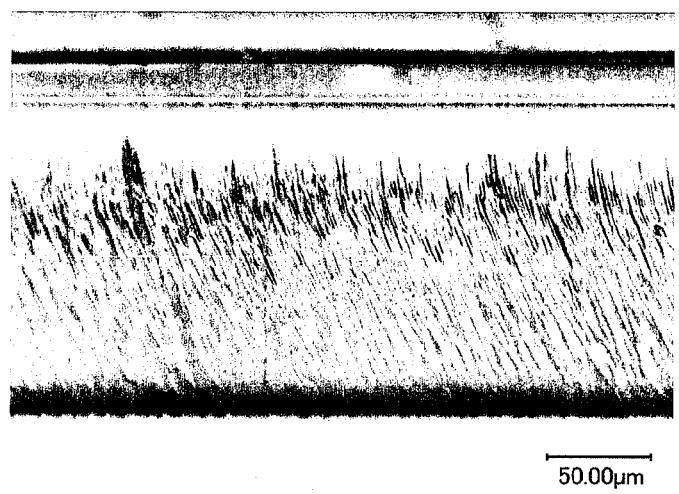
Figure 39A:
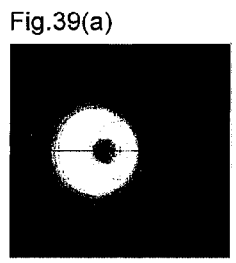
FIGS. 39(a) to 39(l) are photographs provided to compare the light diffusion characteristics of the light diffusion films of Example 8, Example 1, and Comparative Example 1.
Figure 39B:
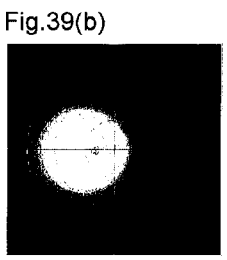
Figure 39C:
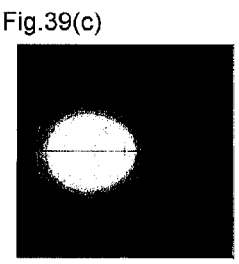
Figure 39D:
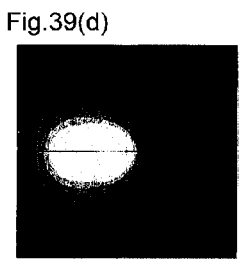
Figure 39E:
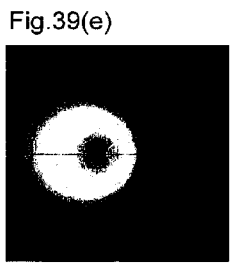
Figure 39F:
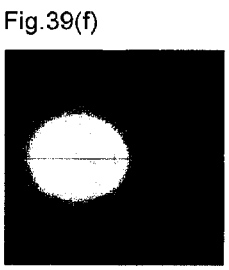
Figure 39G:
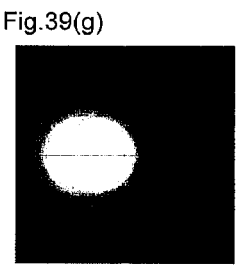
Figure 39H:
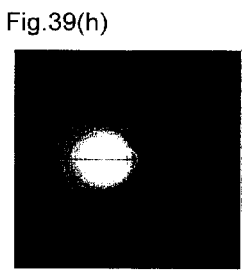
Figure 39I:
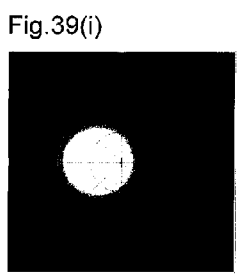
Figure 39J:
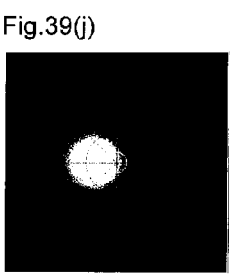
Figure 39K:
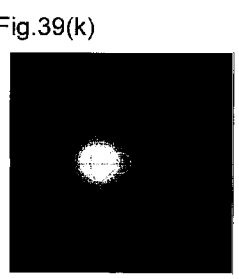
Figure 39L:
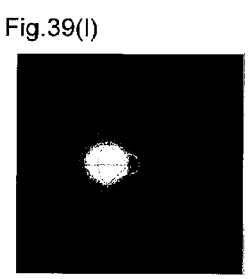
Figure 40A:
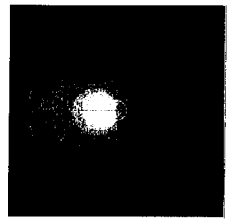
FIGS. 40(a) to 40(l) are other photographs provided to compare the light diffusion characteristics of the light diffusion films of Example 8, Example 1, and Comparative Example 1.
Figure 40B:
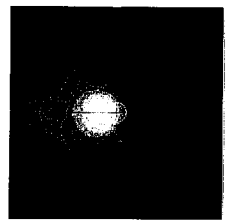
Figure 40C:
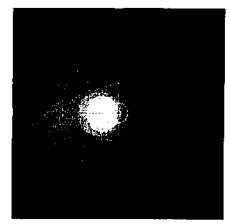
Figure 40D:
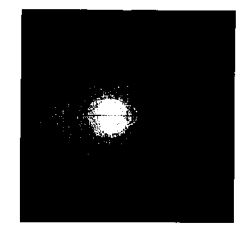
Figure 40E:
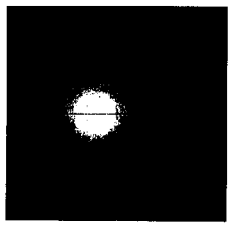
Figure 40F:
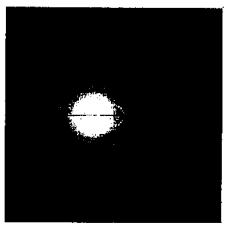
Figure 40G:
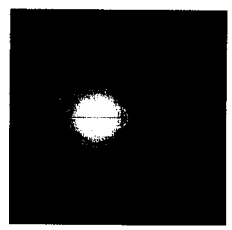
Figure 40H:
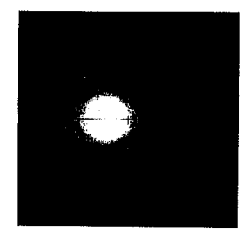
Figure 40I:
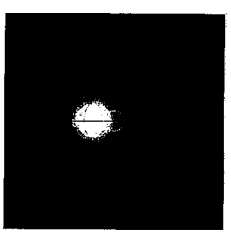
Figure 40J:
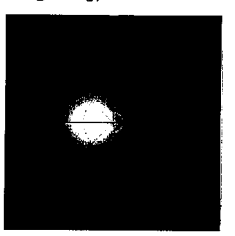
Figure 40K:
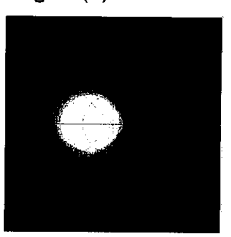
Figure 40L:
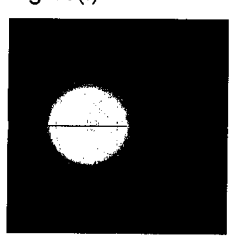

Meanwhile, FIG. 38(a) is a schematic diagram of a cross-section obtained by cutting the light diffusion film thus obtained, at a plane that is parallel to the traveling direction of the coating layer and intersects with the film plane, and FIG. 38(b) is a photograph of the cross-section.

FIGS. 39(a) to 39(d), FIGS. 40(a) to 40(d), and FIGS. 41(a) to 41(d) are conoscopic images for Example 8.

Also, for a comparison, conoscopic images of Example 1 (amount of addition of component (D): 0.1 parts by weight relative to 100 parts by weight of the total amount of the component (A) and the component (B)) are presented in FIGS. 39(e) to 39(h), FIGS. 40(e) to 40(h), and FIGS. 41(e) to 41(h); and conoscopic images of Comparative Example 1 (amount of addition of component (D): 0 parts by weight) are presented in FIGS. 39(i) to 39(l), FIGS. 40(i) to 40(l), and FIGS. 41(i) to 41(l).

Comparative Example 1

In Comparative Example 1, a light diffusion film was produced in the same manner as in Example 1, except that an ultraviolet absorber as the component (D) was not added when the composition for light diffusion film was prepared, and the light diffusion film was evaluated. The results thus obtained are presented in Table 1, FIG. 42, FIGS. 14 to 17, FIGS. 24 to 27, FIGS. 32 to 35, and FIGS. 39 to 41.

Figure 42A:
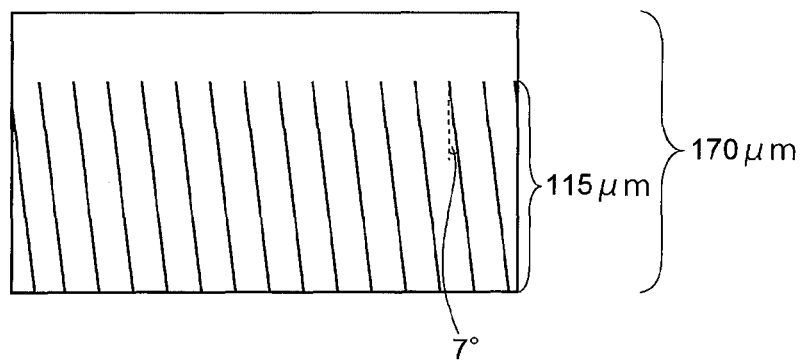
FIGS. 42(a) to 42(c) are a schematic diagram and photographs provided to show a cross-section of the light diffusion film of Comparative Example 1.
Figure 42B:
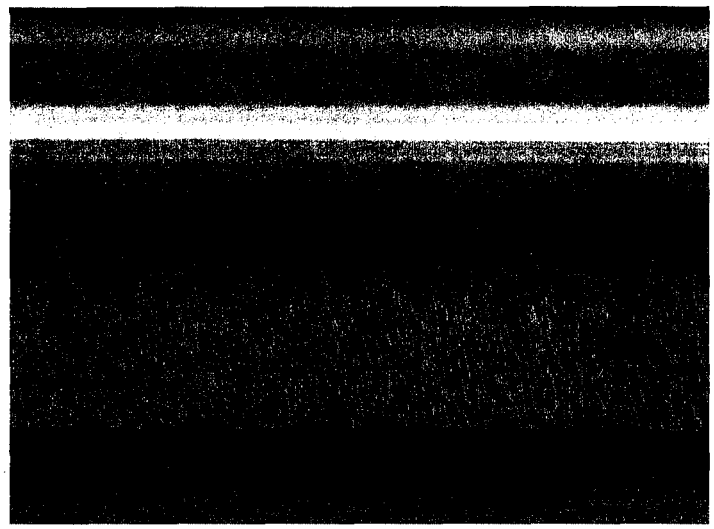

Meanwhile, FIG. 42(a) is a schematic diagram of a cross-section obtained by cutting the light diffusion film thus obtained, at a plane that is parallel to the traveling direction of the coating layer and intersects with the film plane, and FIG. 42(b) is a photograph of the cross-section.

Figure 42C:
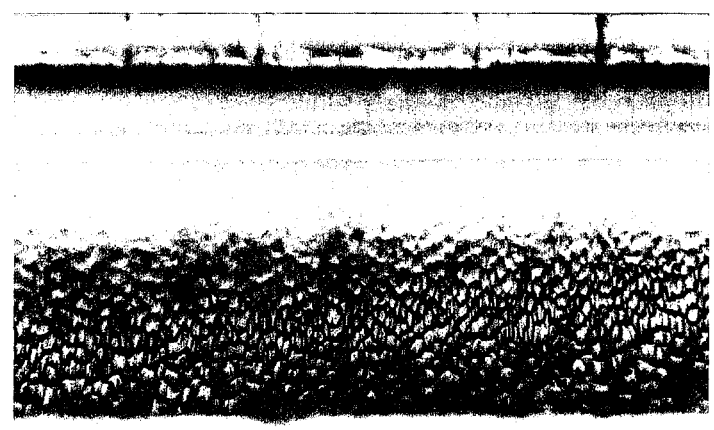

Also, FIG. 42(c) is a cross-sectional photograph of a cross-section obtained by cutting the light diffusion film thus obtained, at a plane that is perpendicular to the traveling direction of the coating layer and intersects with the film plane.

Furthermore, FIGS. 14(m) to 14(p), FIGS. 15(m) to 15(p), FIGS. 16(m) to 16(p), FIGS. 24(i) to 24(l), FIGS. 25(i) to 25(l), FIGS. 26(i) to 26(l), FIGS. 32(i) to 32(l), FIGS. 33(i) to 33(l), FIGS. 34(i) to 34(l), FIGS. 39(i) to 39(l), FIGS. 40(i) to 40(l), FIGS. 41(i) to 41(l), and the like are conoscopic images for Comparative Example 1, and the characteristic curve D in FIG. 17, the characteristic curve C in FIG. 27, and the characteristic curve C in FIG. 35 are emission angle-luminance charts for Comparative Example 1.

Comparative Example 2

In Comparative Example 2, production of a light diffusion film was attempted in the same manner as in Example 1, except that when the composition for light diffusion film was prepared, the amount of addition of the ultraviolet absorber as the component (D) was changed to 7.5 parts by weight (3 parts by weight relative to the total amount (100 parts by weight) of the component (A) and the component (B)).

As a result, the film was not cured at all.

Comparative Example 3

In Comparative Example 3, a light diffusion film was produced in the same manner as in Comparative Example 1, except that when the coating layer was irradiated with active energy radiation, a band pass filter having a characteristic of transmitting only an ultraviolet radiation having a wavelength of near 370 nm (manufactured by Edmund Optics, Inc., B-370) was disposed between an ultraviolet spot parallel light source and the coating layer, and the coating layer was irradiated with active energy radiation, and the light diffusion film was evaluated. The results thus obtained are presented in Table 1 and FIGS. 43 to 46.

Figure 43A:
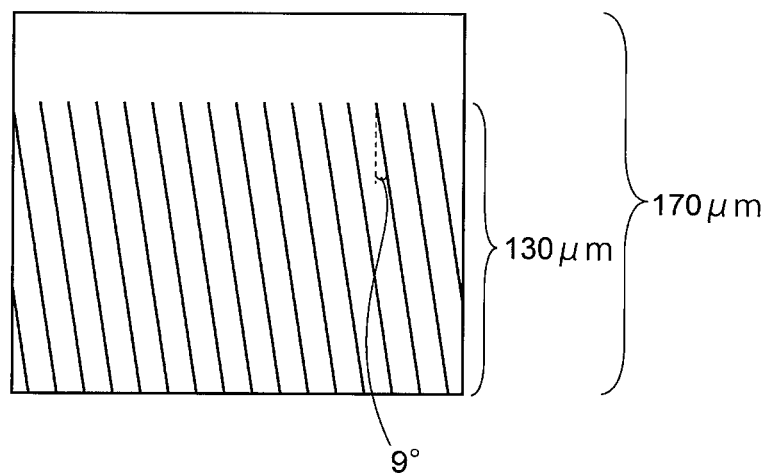
FIGS. 43(a) and 43(b) are a schematic diagram and a photograph provided to show a cross-section of the light diffusion film of Comparative Example 3.
Figure 43B:
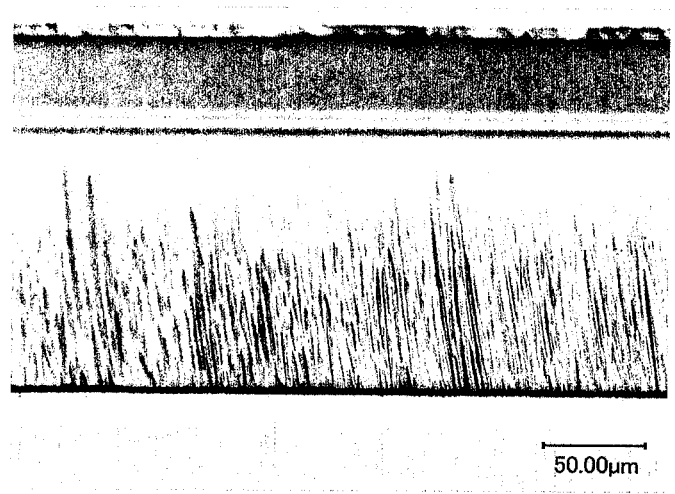
Figure 44A:
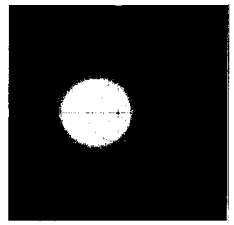
FIGS. 44(a) to 44(l) are photographs provided to compare the light diffusion characteristics of the light diffusion films of Comparative Example 3, Example 1, and Comparative Example 1.
Figure 44B:
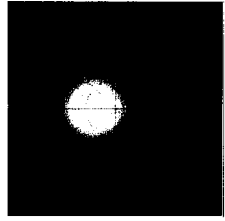
Figure 44C:
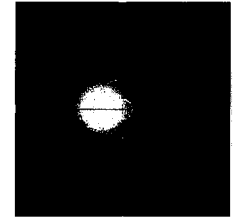
Figure 44D:
Figure 44E:
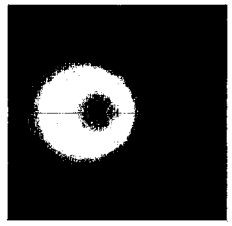
Figure 44F:
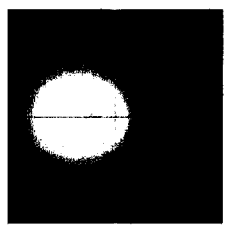
Figure 44G:
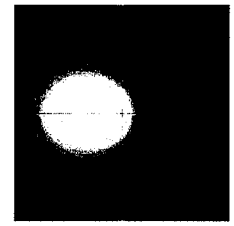
Figure 44H:
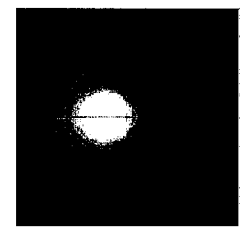
Figure 44I:
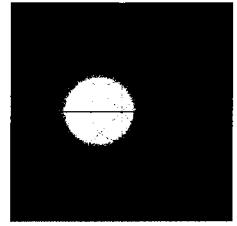
Figure 44J:
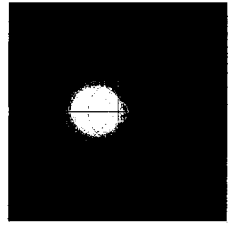
Figure 44K:
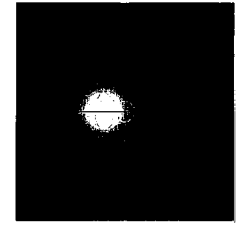
Figure 44L:
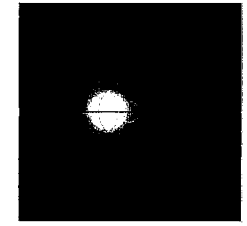
Figure 45A:
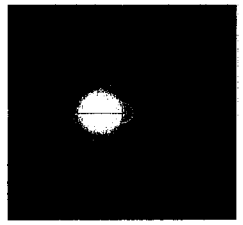
FIGS. 45(a) to 45(l) are other photographs provided to compare the light diffusion characteristics of the light diffusion films of Comparative Example 3, Example 1, and Comparative Example 1.
Figure 45B:
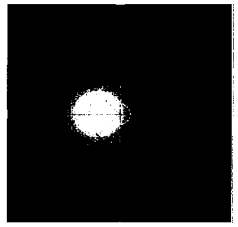
Figure 45C:
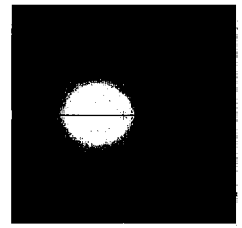
Figure 45D:
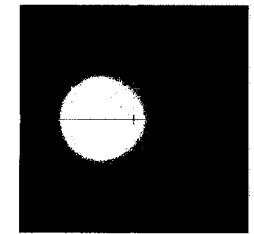
Figure 45E:
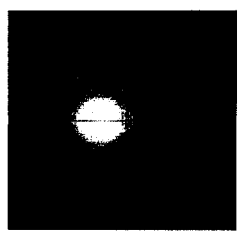
Figure 45F:
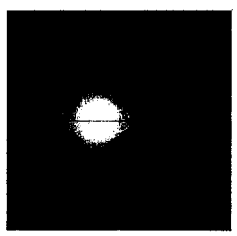
Figure 45G:
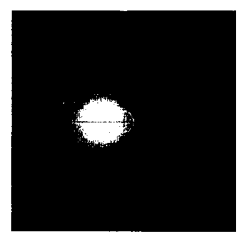
Figure 45H:
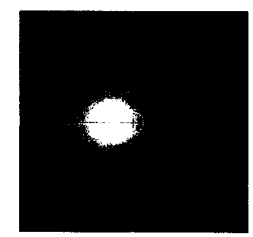
Figure 45I:
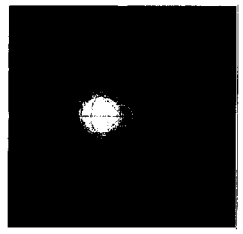
Figure 45J:
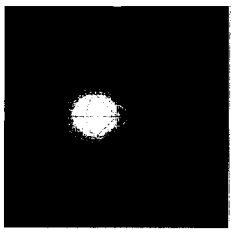
Figure 45K:
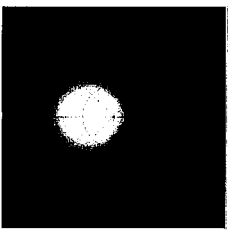
Figure 45L:
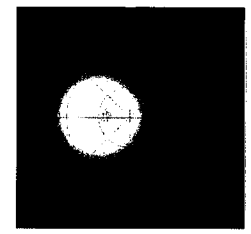
Figure 46A:
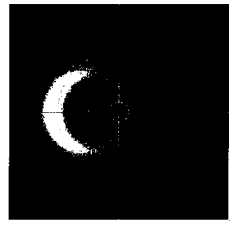
FIGS. 46(a) to 46(l) are still other photographs provided to compare the light diffusion characteristics of the light diffusion films of Comparative Example 3, Example 1, and Comparative Example 1.
Figure 46B:
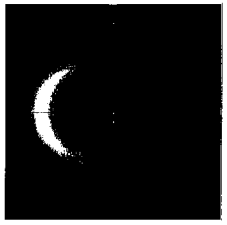
Figure 46C:
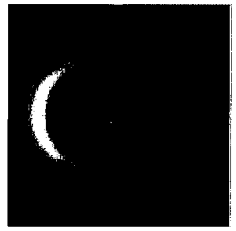
Figure 46D:
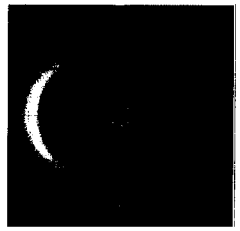
Figure 46E:
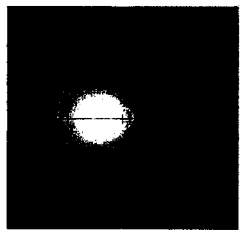
Figure 46F:
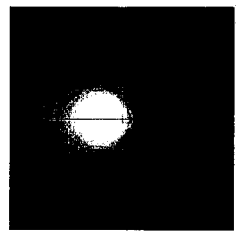
Figure 46G:
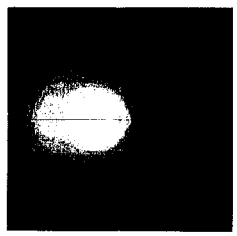
Figure 46H:
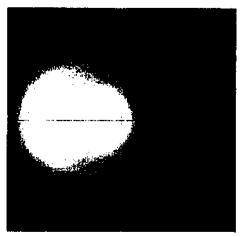
Figure 46I:
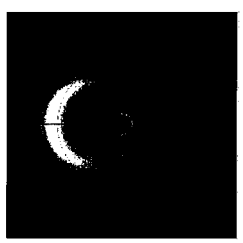
Figure 46J:
Figure 46K:
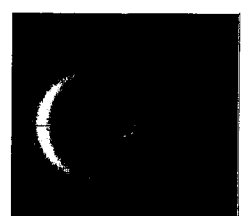
Figure 46L:
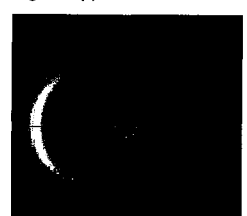

Meanwhile, FIG. 43(a) is a schematic diagram of a cross-section obtained by cutting the light diffusion film thus obtained, at a plane that is parallel to the traveling direction of the coating layer and intersects with the film plane, and FIG. 43(b) is a photograph of the cross-section.

Furthermore, FIGS. 44(a) to 44(d), FIGS. 45(a) to 45(d), and FIGS. 46(a) to 46(d) are conoscopic images for Comparative Example 3.

Also, for a comparison, conoscopic images of Example 1 (amount of addition of component (D): 0.1 parts by weight relative to 100 parts by weight of the total amount of the component (A) and the component (B)) are presented in FIGS. 44(e) to 44(h), FIGS. 45(e) to 45(h), and FIGS. 46(e) to 46(h); and conoscopic images of Comparative Example 1 (amount of addition of component (D): 0 parts by weight) are presented in FIGS. 44(i) to 44(l), FIGS. 45(i) to 45(l), and FIGS. 46(i) to 46(l).

Figure 47:
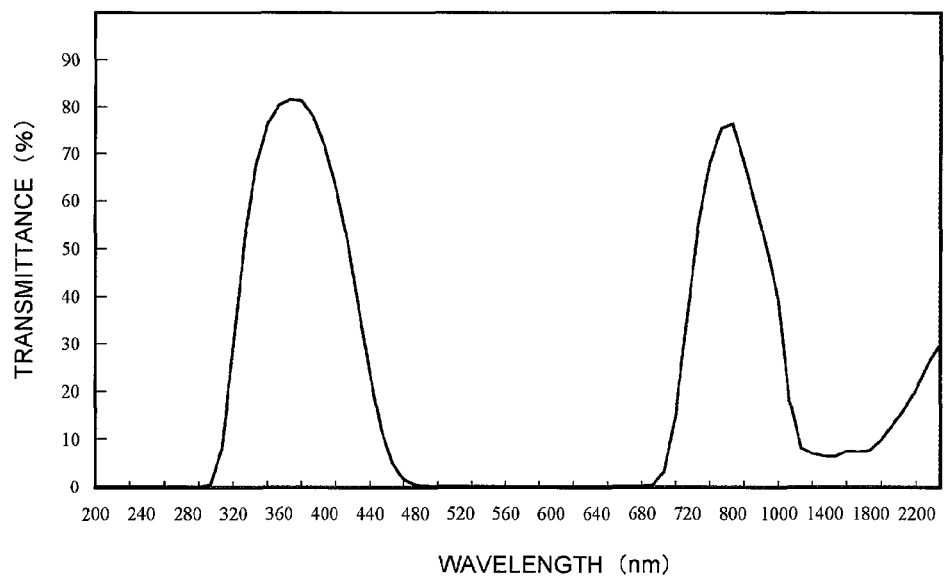
FIG. 47 is a diagram provided to show a wavelength-transmittance chart of a band pass filter.

Furthermore, a wavelength-transmittance chart showing the light transmission characteristics of the band pass filter used is presented in FIG. 47.

Comparative Example 4

In Comparative Example 4, a light diffusion film was produced in the same manner as in Example 1, except that when the coating layer was irradiated with active energy radiation, a band pass filter having a characteristic of transmitting only an ultraviolet radiation having a wavelength of near 370 nm (manufactured by Edmund Optics, Inc., B-370) was disposed between an ultraviolet spot parallel light source and the coating layer, and the coating layer was irradiated with active energy radiation.

Figure 48:
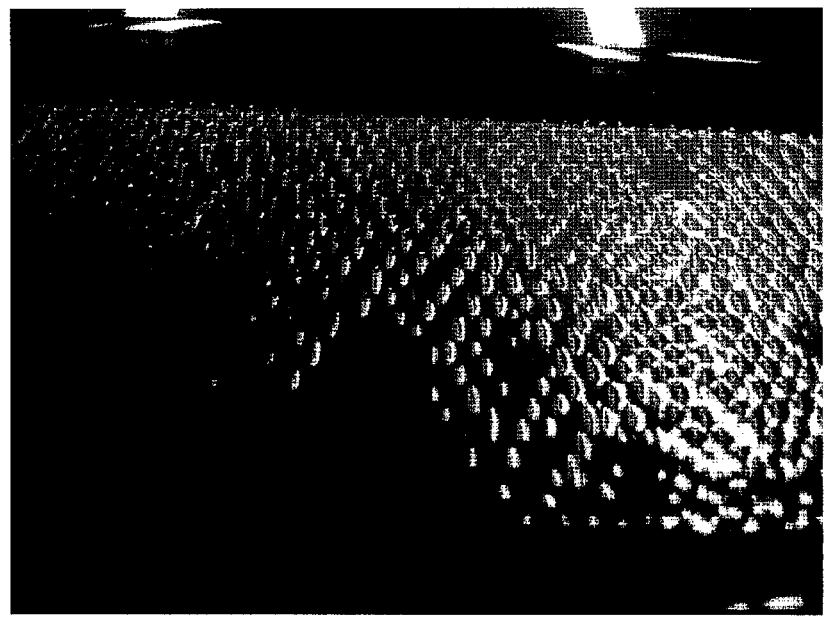
FIG. 48 is a photograph provided to explain the appearance of the light diffusion film of Comparative Example 4.

As a result, as illustrated in FIG. 48, only the surface of the film was cured, and contraction wrinkles were generated. A columnar structure was not formed in the film.

Reference Example 1

In Reference Example 1, the irradiation of the coating layer with active energy radiation was carried out as follows, using a linear high pressure mercury lamp instead of an ultraviolet spot parallel light source.

That is, an ultraviolet irradiating apparatus (manufactured by Eye Graphics Co., Ltd., ECS-4011GX) in which a linear high pressure mercury lamp was provided with a cold mirror for light collection was prepared.

Next, a light blocking plate was installed on a heat wire cut-off filter frame, and the ultraviolet radiation irradiated to the surface of the coating layer was set up such that when the normal line of the coating layer surface as viewed from the major axis direction of the linear light source was designated as 0°, the angle of irradiation of direct ultraviolet radiation emitted from the linear light source (θ3 in FIG. 7) would be 16°.

At this time, the height from the coating layer surface to the linear light source was set to 500 mm, the peak illuminance was set to 2.0 mW/cm$^2$, and the cumulative amount of light was set to 50 mJ/cm$^2$.

Furthermore, in order to prevent the light reflected at the light blocking plate or the like, from becoming stray light inside the irradiator and affecting the photocuring of the coating layer, a light blocking plate was also provided near the conveyor, and the apparatus was set up such that only the ultraviolet radiation emitted directly from the linear light source would be irradiated to the coating layer.

Subsequently, the coating layer was irradiated with ultraviolet radiation while the coating layer was moved by a conveyor at a speed of 0.2 m/min.

Other than those, production of a light diffusion film was carried out in the same manner as in Example 1, and the light diffusion film was evaluated. The results thus obtained are presented in Table 1 and FIGS. 49 to 51.

Figure 49A:
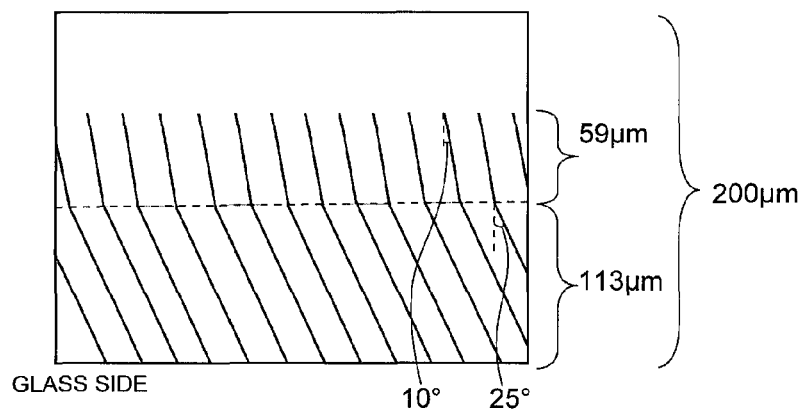
FIGS. 49(a) to 49(c) are a schematic diagram and photographs provided to show a cross-section of the light diffusion film of Reference Example 1.
Figure 49B:
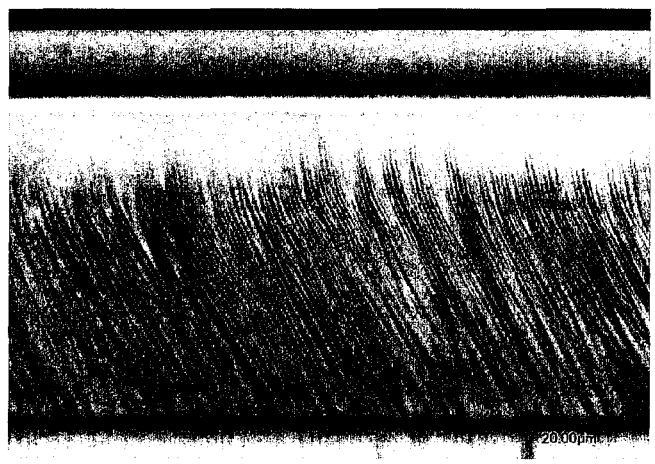
Figure 49C:
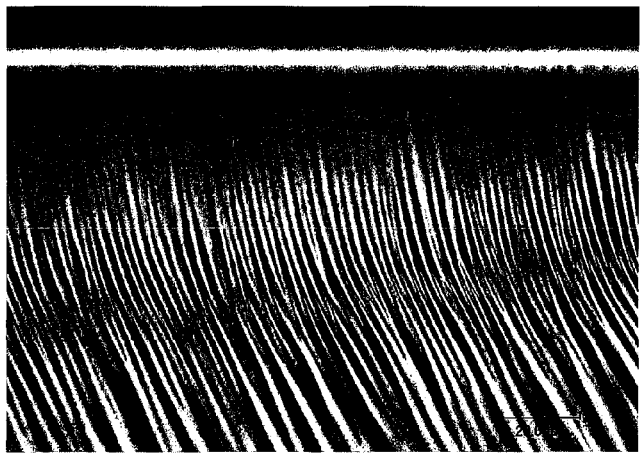
Figure 50A:
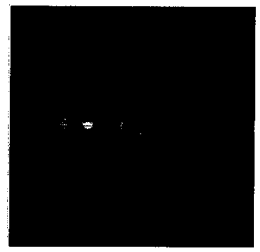
FIGS. 50(a) to 50(f) are photographs provided to compare the light diffusion characteristics of the light diffusion films of Reference Example 1 and Example 1.
Figure 50B:
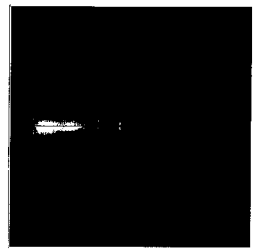
Figure 50C:
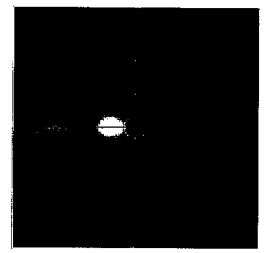
Figure 50D:
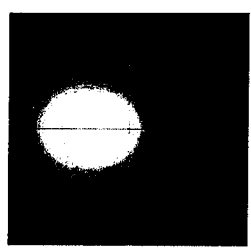
Figure 50E:
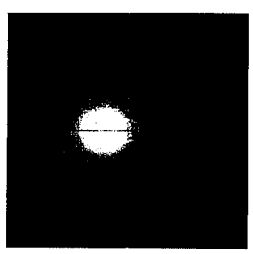
Figure 50F:
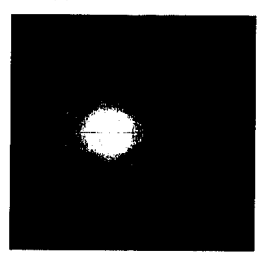
Figure 51A:
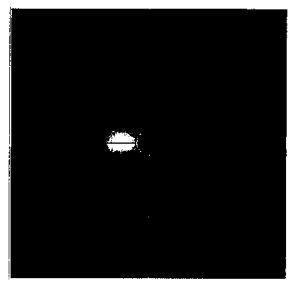
FIGS. 51(a) to 51(d) are other photographs provided to compare the light diffusion characteristics of the light diffusion film of Reference Example 1 and Example 1.
Figure 51B:
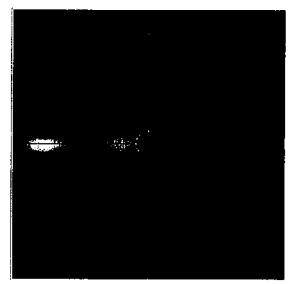
Figure 51C:
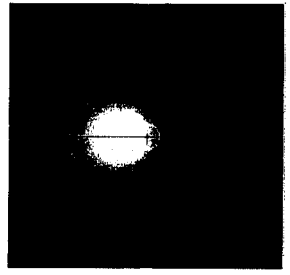
Figure 51D:
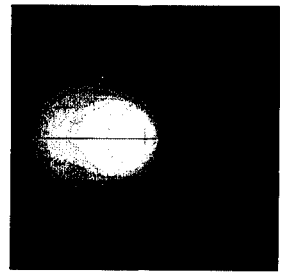

Meanwhile, FIG. 49(*a*) is a schematic diagram of a cross-section obtained by cutting the light diffusion film thus obtained, at a plane that is parallel to the traveling direction of the coating layer and intersects with the film plane; FIG. 49(*b*) is a photograph of the cross-section; and FIG. 49(*c*) is a photograph of a magnified view of the vicinity of the bent part in the cross-sectional photograph shown in FIG. 49(*b*).

absorber is added to a predetermined extent to a predetermined composition for light diffusion film, a predetermined columnar structure composed of pillar-shaped objects or the like having a bent part can be formed, and further, a light diffusion film in which the angle of aperture of diffused light has been effectively expanded can be obtained.

Furthermore, it is understood from Comparative Examples 3 and 4 that when ultraviolet radiation is irradiated using a band pass filter, a predetermined columnar structure composed of pillar-shaped objects or the like having a bent part may not be formed.

Furthermore, it is understood from Reference Example 1 that in a light diffusion film obtained by forming a predetermined louver structure composed of plate-shaped regions having a bent part, the angle of aperture of diffused light can be expanded effectively; however, sharp switching in the diffusion condition of light occurs between a light diffusion incident angle region and a non-light diffusion incident angle region, and also, the angle of aperture of diffused light in the direction in which plate-shaped regions are extended is markedly decreased.

TABLE 1

| | Composition for light diffusion film Ultraviolet absorber | | Temperature of coating layer | Use of band pass filter | Internal structure | θa | θb | θb − θa | La | Lb | La/Lb |
|---|---|---|---|---|---|---|---|---|---|---|---|
| | Kind | Amount of addition | (° C.) | filter | formed | (°) | (°) | (°) | (μm) | (μm) | (—) |
| Example 1 | TINUVIN 477 | 0.25 *1(0.1) | 23 | No | Bent columnar structure | 5.7 | 25.4 | 19.7 | 55 | 79 | 0.696 |
| Example 2 | | 0.167 (0.067) | | | | 8.1 | 20.3 | 12.2 | 59 | 79 | 0.747 |
| Example 3 | | 0.083 (0.033) | | | | 8.3 | 16.5 | 8.2 | 59 | 79 | 0.747 |
| Example 4 | TINUVIN 400 | 1.5 (0.6) | | | | 6.4 | 16.6 | 10.2 | 54 | 71 | 0.761 |
| Example 5 | | 0.75 (0.3) | | | | 6.9 | 19.7 | 12.8 | 65 | 70 | 0.929 |
| Example 6 | TINUVIN 384-2 | 0.5 (0.2) | | | | 7 | 23 | 16 | 43 | 74 | 0.581 |
| Example 7 | | 0.25 (0.1) | | | | 6.9 | 19.7 | 12.8 | 65 | 70 | 0.929 |
| Example 8 | TINUVIN 477 | 0.25 (0.1) | 5 | | | 9 | 29 | 20 | 62 | 90 | 0.689 |
| Comparative Example 1 | — | 0 (0) | 23 | | Columnar structure | — | 7 | — | — | 115 | — |
| Comparative Example 2 | TINUVIN 477 | 7.5 (3) | | | *2— | — | — | — | — | — | — |
| Comparative Example 3 | — | 0 (0) | | Yes | Columnar structure | — | 9 | — | — | 130 | — |
| Comparative Example 4 | TINUVIN 477 | 0.25 (0.1) | | | *3— | — | — | — | — | — | — |
| Reference Example 1 | TINUVIN 477 | 0.25 (0.1) | | No | Bent louver structure | 10 | 25 | 15 | 59 | 113 | 0.522 |

*1 The values in the parentheses represent the amounts of addition (parts by weight) of the component (D) relative to the total amount (100 parts by weight) of the component (A) and the component (B).
*2 In Comparative Example 2, the coating layer was not cured even if irradiated with active energy radiation, and a film was not obtained.
*3 In Comparative Example 4, only the surface of the film was cured, contraction wrinkles were generated, and a film was not obtained.

Furthermore, FIGS. 50(*a*) to 50(*c*) and FIGS. 51(*a*) and 51(*b*) are conoscopic images for Reference Example 1.

These conoscopic images were obtained by causing light to enter a light diffusion film while the incident angle θ1 (°) was varied to 10°, 20°, 30°, 40°, and 50°.

Also, for a comparison, conoscopic images of Example 1 (amount of addition of the component (D): 0.1 parts by weight relative to 100 parts by weight of the total amount of the component (A) and the component (B)) are presented in FIGS. 50(*d*) to 50(*f*) and FIGS. 51(*c*) to 51(*d*).

From Examples 1 to 9 and Comparative Examples 1 and 2 described above, it is understood that when an ultraviolet

INDUSTRIAL APPLICABILITY

As discussed above, according to the present invention, when a predetermined columnar structure composed of pillar-shaped objects or the like having a bent is formed within a film, a light diffusion film in which the angle of aperture of diffused light has been expanded effectively can be obtained.

Therefore, the light diffusion film or the like of the present invention can be applied to a light control film for a reflective type liquid crystal display devices, as well as a viewing angle control film, a viewing angle expansion film, and a screen for projection, and it is expected that the light diffusion film can contribute markedly to an enhancement of the product quality of these devices.

EXPLANATIONS OF LETTERS OR NUMERALS

1: Coating layer
2: Process sheet
10: Isotropic light diffusion film
10': Isotropic light diffusion film having a bent columnar structure
12: Pillar-shaped object having a relatively high refractive index
13: Columnar structure
13': Bent columnar structure
13a: Boundary surface of columnar structure
14: Region having a relatively low refractive index
50: Light irradiated from a light source
60: Parallel light
125: Linear light source
200: Irradiated light parallelizing member
202: Point light source
204: Lens
210: Light blocking member
210a: Plate-shaped member
210b: Cylindrical member

The invention claimed is:

1. A light diffusion film comprising a columnar structure in which plural pillar-shaped objects having a relatively high refractive index are arranged to stand close together in a film thickness direction in a region having a relatively low refractive index,
wherein the plural pillar-shaped objects having a relatively high refractive index have a bent part in the middle of the pillar-shaped objects to provide a first angle of inclination θa and a second angle of inclination θb, with the bent part serving as the boundary between said first and second angles,
wherein if θa, expressed in °, is the angle of inclination of the pillar-shaped objects with respect to the normal line of the film plane in an upper portion above the bent part, and if θb, expressed in °, is the angle of inclination of the pillar-shaped objects with respect to the normal line of the film plane in the lower portion below the bent part, the angles of inclination θa and θb satisfy the following relationship (1):

$$1° \leq \theta b - \theta a | \leq 30° \quad (1)$$

if La, expressed in μm, is a length of the pillar-shaped objects in the upper portion above the bent part, and if Lb, expressed in μm, is a length of the pillar-shaped objects in the lower portion below the bent part, the lengths La and Lb satisfy the following relationship (2):

$$0.01 \leq La/Lb \leq 10 \quad (2)$$

and wherein the columnar structure is formed within a single-layered film.

2. The light diffusion film according to claim 1, wherein the angle of inclination θa is adjusted to a value within the range of 0° to 30°, and the angle of inclination θb is adjusted to a value within the range of 1° to 60°.

3. The light diffusion film according to claim 1, wherein the thickness L of the columnar structure is adjusted to a value within the range of 50 to 700 μm.

4. The light diffusion film according to claim 1, wherein the length La is adjusted to a value within the range of 5 to 200 μm, and the length Lb is adjusted to a value within the range of 20 to 400 μm.

* * * * *